(12) United States Patent
Fukuya

(10) Patent No.: US 7,885,857 B1
(45) Date of Patent: Feb. 8, 2011

(54) APPEAREL PRODUCTION METHOD AND SYSTEM

(76) Inventor: Kaoru Fukuya, 2868 Waialae Ave., A-3, Honolulu, HI (US) 96826

( * ) Notice: Subject to any disclaimer, the term of this patent is extended or adjusted under 35 U.S.C. 154(b) by 1451 days.

(21) Appl. No.: 11/280,143

(22) Filed: Nov. 15, 2005

Related U.S. Application Data

(60) Provisional application No. 60/628,250, filed on Nov. 15, 2004.

(51) Int. Cl.
*G06Q 30/00* (2006.01)
(52) U.S. Cl. .......................... 705/26; 705/27
(58) Field of Classification Search .............. 705/26, 705/27
See application file for complete search history.

(56) References Cited

U.S. PATENT DOCUMENTS

| | | | |
|---|---|---|---|
| 5,101,352 A | 3/1992 | Rembert | |
| 5,819,232 A | 10/1998 | Shipman | |
| 6,611,727 B2 | 8/2003 | Bickley et al. | |
| 6,615,092 B2 | 9/2003 | Bickley et al. | |
| 6,711,798 B2 | 3/2004 | Sanders et al. | |
| 6,741,904 B1 * | 5/2004 | Gage | 700/132 |
| 2002/0123813 A1 | 9/2002 | Bickley et al. | |
| 2002/0123918 A1 | 9/2002 | Brown et al. | |
| 2002/0128890 A1 | 9/2002 | Dick et al. | |
| 2002/0138314 A1 * | 9/2002 | Brown et al. | 705/7 |
| 2002/0138320 A1 | 9/2002 | Robertson et al. | |
| 2002/0138324 A1 | 9/2002 | Zarefoss et al. | |
| 2003/0033180 A1 | 2/2003 | Shekar et al. | |
| 2003/0061081 A1 | 3/2003 | Kellond et al. | |
| 2003/0074247 A1 | 4/2003 | Dick et al. | |
| 2003/0125972 A1 * | 7/2003 | Luce et al. | 705/1 |
| 2003/0139840 A1 | 7/2003 | Magee et al. | |
| 2003/0149603 A1 | 8/2003 | Ferguson et al. | |
| 2003/0171962 A1 | 9/2003 | Hirth et al. | |
| 2003/0171963 A1 | 9/2003 | Kurihara et al. | |
| 2003/0172007 A1 | 9/2003 | Helmolt et al. | |
| 2003/0208389 A1 | 11/2003 | Kurihara et al. | |
| 2003/0208392 A1 | 11/2003 | Shekar et al. | |
| 2004/0039627 A1 | 2/2004 | Palms et al. | |
| 2005/0131571 A1 * | 6/2005 | Costin | 700/132 |
| 2005/0240416 A1 * | 10/2005 | Schindler et al. | 705/1 |

OTHER PUBLICATIONS www.lectra.com accessed via the Internet Archive dated Oct. 2003.*

* cited by examiner

*Primary Examiner*—Jason Dunham
(74) *Attorney, Agent, or Firm*—Robert M. Hunter

(57) ABSTRACT

A computer-implemented system and method for coordinating apparel production. In preferred embodiments, the invention is a business model and system for the apparel industry in which production channels and marketing channels are comprehensively coordinated by a central operating center via the Internet. By interacting with a website, registered clients (e.g., apparel businesses, wholesalers, retailers, etc.) articulate what their specific detailed requirements are in terms of production, delivery and other aspects. Then, data on these clients' orders are forwarded to each of the production channels through the central operation center which performs the tasks of comprehensive coordination, management and business operation.

2 Claims, 31 Drawing Sheets

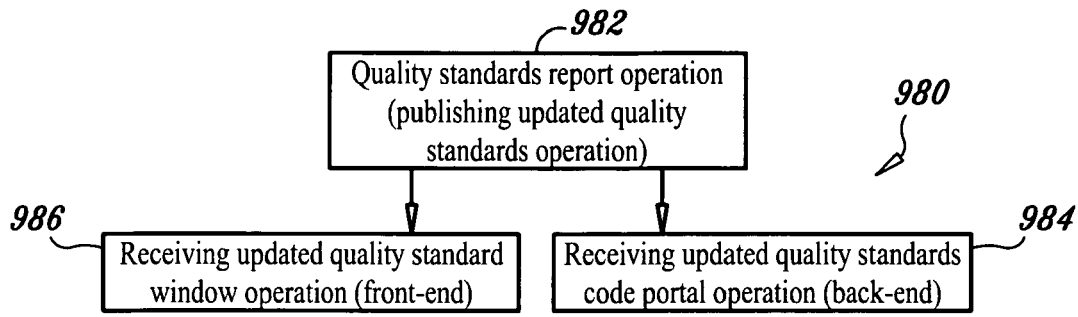

FIG. 61

| Task Code | Name | Drawing | Photograph |
|---|---|---|---|
| SEW 40001-A | Eyelet Button Holing | Sketch of example | Photograph of example |
| SEW 40001-B | Eyelet Button Holing/Bartacking | Sketch of example | Photograph of example |
| SEW 40002 | Straight Button Holing | Sketch of example | Photograph of example |

FIG. 62

| Fault Code | Name | Description |
|---|---|---|
| EN8001 | Missing stitch | A seam separates from cloth |
| EN8002 | Skipping stitch | Thread does not pass in middle of the seam |
| EN8006 | Hitch stitch | Upper thread is twisted and becomes entangled with lower thread |

FIG. 63

APPEAREL PRODUCTION METHOD AND SYSTEM

CROSS-REFERENCE TO RELATED APPLICATIONS

This application claims the benefit of U.S. Provisional Patent Application No. 60/628,250, filed Nov. 15, 2004, now pending, the disclosure of which patent application is incorporated by reference as if fully set forth herein.

A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyrights whatsoever.

STATEMENT REGARDING FEDERALLY SPONSORED RESEARCH OR DEVELOPMENT

Not Applicable

BACKGROUND OF THE INVENTION

This invention relates to computer-implemented business methods and systems. In particular, the invention relates to an apparel production method and system.

Background art production systems employed by the apparel fashion industry are clearly outdated. This has led to inventory problems, overstocking and untimely/sluggish responses to the consumer, culminating in profit losses. Businesses that can find solutions to these problems and are able to maintain growth are ones whose marketing channel and production channel are synergistic.

Another concern is that, because of the shortcomings of background art systems, revenues are not circulating industry-wide. In 2005, a World Trade Organization (WTO) agreement will ban import quotas on textiles and textile products and the apparel and textile industry will witness further globalization. Domestic apparel and textile manufacturers are facing tough choices ahead. Unless innovations are implemented, apparel/textile makers, especially in industrialized countries, will decline. The key factors to business success include marketing team's proposals, consumer choice, consumer feedback on preferences, coordination of the marketing channel and the production channel to enable rapid response, and production volumes that reflect the demand.

At a background art apparel/textile company, the process occurs in phases. First, is an idea-proposal phase during which the company makes a selection from numerous textile designs and materials (and these selections are broken down into categories). The selections are then brought to exhibits, trade shows, etc., at which the company receives orders for merchandise from wholesalers and retailers. Given the minimum order quantity stipulated by each factory, the company makes a sales forecast for each item on to be sold that season. From these forecasts, the company determines the quantity to order for the season, and dispatches the order to the production line. After that, the factory goes into production (with the reasons for this being factory scheduling, cost-cutting, etc.). This happens about six months prior to the season, including lead-time (in a Make-to-Order Manufacturing process). Placing reorders or issuing stylistic changes to the production line mid-season is something that is almost never done. It cannot be done cost effectively—is the truth of it. This is the fashion world, known for mercurial fast changes, and yet the present situation does not permit a company to improvise as the situation demands.

The background art is characterized by U.S. Pat. Nos. 5,101,352; 5,819,232; 6,615,092; 6,611,727 and 6,711,798 and U.S. Patent Application Nos. 2002/0123813; 2002/0123918; 2002/0128890; 2002/0138314; 2002/0138320; 2002/0138324; 2003/0061081; 2003/0074247; 2003/0139840; 2003/0149603; 2003/0171962; 2003/0171963; 2003/0172007; 2003/0208389; 2003/0208392; 2003/0033180; 2004/0039627 and 2004/0010334; the disclosures of which patents and patent applications are incorporated by reference as if fully set forth herein.

BRIEF SUMMARY OF THE INVENTION

The purpose of the invention is to provide coordination of the apparel production process. One advantage of the invention is that it allows rapid response to changes in requirements. Another advantage is that it minimizes cost and maximizes profits.

In preferred embodiments, the invention is a business model and system for the apparel textile industry in which production channels and marketing channels are comprehensively coordinated via the Internet. By interacting with a website, registered clients (e.g., apparel businesses, wholesalers, retailers, etc.) articulate what their specific detailed requirements are in terms of production, delivery and other aspects. Then, data on these clients' orders are preferably forwarded to each of the production channels through a central operation center which performs the tasks of comprehensive coordination, management and business operation. In this embodiment of the business model, the system is structured so that the central operation center acts as the pillar, with a front-end and back-end working around it.

In a preferred embodiment, the inventions is an apparel production method comprising: accepting registration information from a client and assigning to the client a client number; interacting with the client, said interacting step comprising displaying to the client a product quality standard, displaying to the client a plurality of task codes that characterize the features of a product, displaying to the client a textile materials inventory, accepting from the client a specification for a desired original textile, accepting from the client a specification for a desired garment, displaying to the client a simulated sample of the desired garment, displaying to the client an estimate of the amount of material required to produce the desired garment, displaying to the client when capacity is available for production of the desired garment, displaying to the client information on the availability of accessories and accepting selections of desired accessories for the desired garment from the client, displaying to the client digital garment patterns, displaying to the client information on the availability of secondary processes and accepting selections of secondary processes for the desired garment from the client, displaying to the client information on the availability of product packaging and accepting selections of product packaging for the desired garment from the client, displaying to the client information on the availability of hung tags and badges and accepting selections of hug tags and badges for the desired garment from the client, displaying to the client information on the availability of hangers and accepting selections of hangers for the desired garment from the client, displaying to the client information on the availability of product transportation options and accepting selections of a product transportation option for the desired garment from the client, displaying to the client information on the availability of special inspection options and accepting selections of a special inspection option for the desired garment from the client, displaying to the client information on the availability of product finishing options and accepting selections of a product finishing option for the desired garment from the client, accepting from the client an order for the desired garment and displaying to the client an initial estimate of the cost of the ordered garment, displaying to the client information on the availability of replenishment stock, displaying to the client information on the availability of prepackaged products and accepting a specification from the client to add a distinctive feature to the desired garment, displaying to the client help information on use of the method, displaying to the client information on a selected order, and displaying to the client area block maps; interacting with a supplier of products and product components, said interacting with a supplier step comprising displaying to the supplier the plurality of task codes, accepting input from the supplier concerning the status of each order the supplier is producing, accepting input from a supplier of textile materials concerning the availability of the textile materials, accepting input from a supplier of accessories concerning the availability of the accessories, accepting input from a supplier of secondary processes concerning the availability of the secondary processes, accepting input from a supplier of hung tags and badges concerning the availability of the hung tags and badges, accepting input from a supplier of hangers concerning the availability of the hangers, accepting input from a supplier of packaging concerning the availability of the packaging, accepting input from a supplier of special inspection services concerning the availability and performance of the special inspection services, accepting input from a supplier of product transportation services concerning the availability and performance of the transportation services, and accepting input from a supplier of production services concerning the availability and performance of the production services; and performing central processing of information, said performing central processing step comprising managing information on the availability of production capacity, managing product quality standards, managing information in a supplier database, managing the production of each ordered product, managing information on raw materials and stock, managing information on the textile material inventory, managing accessories availability information, managing packaging availability information, managing hung tags and badges availability information, managing hangers availability information, managing secondary processes availability information, managing a master schedule, managing alterations and changes in each ordered product, managing prepackaged products information, managing product transportation information, managing cost information, and managing client data.

In another preferred embodiment, the invention is a computer-implemented method for operating an apparel production business, said method comprising: displaying choices about a plurality of garment attributes to a client on one or more front-end windows and accepting selections regarding those choices from said client on said one or more front-end windows, each of said garment attributes being identified by a task code; processing said selections within a central operation center, simulating the appearance of a specified garment that reflects said selections and displaying a simulated garment to said client on one of said front-end windows and, after said client confirms said selections, requesting proposals from a plurality of garment producers for production of said specified garment; accepting from a garment producer on one or more back-end windows a proposal to produce said specified garment; authorizing said garment producer to produce said specified garment in accordance with said proposal; maintaining a master schedule that reflects the production of said specified garment; and maintaining a database containing information on the capacity of said plurality of garment producers to produce garments having at least some of said plurality of garment attributes. Preferably, the method further comprises displaying to the client each category of said apparel attributes on a different one of said one or more front-end windows. Preferably, said categories include textiles, garments, accessories, secondary processes, hung tags/badges, hangers, packaging, inspection, transportation, and product finish. Preferably, the method is implemented over a network. More preferably, the method is implemented over the Internet. Preferably, the method further comprises organizing said capacity information by area blocks. Preferably, the method further comprises displaying said capacity information to said client on another of said one or more front-end windows.

In another preferred embodiment, the invention is a computer-implemented method for operating an apparel production business, said method comprising: displaying choices about a plurality of garment attributes and accepting selections regarding those choices from a client each of said garment attributes being identified by a task code; processing said selections and requesting proposals from a plurality of garment producers for production of a specified garment that reflects said selections; accepting a proposal from a garment producer to produce said specified garment; authorizing said garment producer to produce said specified garment in accordance with said proposal; maintaining a master schedule that reflects the production of said specified garment; and maintaining a database containing information on the capacity of said plurality of garment producers to produce garments having at least some of said plurality of garment attributes.

In another preferred embodiment, the invention is an apparel production system comprising: means for accepting registration information from a client and assigning to the client a client number; means for interacting with the client, said interacting means comprising means for displaying to the client a product quality standard, means for displaying to the client a plurality of task codes that characterize the specification of a product, means for displaying to the client a textile materials inventory, means for accepting from the client a specification for a desired original textile, means for accepting from the client a specification for a desired garment, means for displaying to the client a simulated sample of a product, means for displaying to the client an estimate of the amount of material required to produce the desired garment, means for displaying to the client when capacity is available for production of the desired garment, means for displaying to the client information on the availability of accessories and accepting selections of desired accessories for the desired garment from the client, means for displaying to the client digital garment patterns, means for displaying to the client information on the availability of secondary processes and accepting selections of secondary processes for the desired garment from the client, means for displaying to the client information on the availability of product packaging and accepting selections of product packaging for the desired garment from the client, means for displaying to the client information on the availability of hung tags and badges and accepting selections of hug tags and badges for the desired garment from the client, means for displaying to the client information on the availability of hangers and accepting selections of hangers for the desired garment from the client, means for displaying to the client information on the availability of product transportation options and accepting selections of a product transportation option for the desired garment from the client, means for displaying to the client information on the availability of special inspection options and accepting selections of a special inspection option for the desired garment from the client, means for displaying to the client information on the availability of product finishing options and accepting selections of a product finishing option for the desired garment from the client, means for accepting from the client an order for the desired garment and displaying to the client an initial estimate of the cost of the ordered garment, means for displaying to the client information on the availability of replenishment stock, means for displaying to the client information on the availability of prepackaged products and accepting selections of a particular prepackaged product from the buyer, means for displaying to the client help information on use of the method, means for displaying to the client information on a selected order, and means for displaying to the client area block maps; means for interacting with a supplier of products and product components, said interacting with a supplier means comprising means for displaying to the supplier the plurality of task codes, means for accepting input from the supplier concerning the status of each order the supplier is producing, means for accepting input from a supplier of textile materials concerning the availability of the textile materials, means for accepting input from a supplier of accessories concerning the availability of the accessories, means for accepting input from a supplier of secondary processes concerning the availability of the secondary processes, means for accepting input from a supplier of hung tags and badges concerning the availability of the hung tags and badges, means for accepting input from a supplier of hangers concerning the availability of the hangers, means for accepting input from a supplier of packaging concerning the availability of the packaging, means for accepting input from a supplier of special inspection services concerning the availability and performance of the special inspection services, means for accepting input from a supplier of product transportation services concerning the availability and performance of the transportation services, and means for accepting input from a supplier of production services concerning the availability and performance of the production services; and means for performing central processing of information, said performing central processing means comprising means for managing information on the availability of production capacity, means for managing product quality standards, means for managing information in a supplier database, means for managing the production of each ordered product, means for managing information on raw materials and stock, means for managing information on the textile material inventory, means for managing accessories availability information, means for managing packaging availability information, means for managing hung tags and badges availability information, means for managing hangers availability information, means for managing secondary processes availability information, means for managing a master schedule, means for managing alterations and changes in each ordered product, means for managing prepackaged products information, means for managing product transportation information, means for managing cost information, means for managing client data, means for displaying a data screen, means for revising a production number, means for managing the schedule, means for creating a document, means for creating an invoice, means for confirming an order, means for announcing an order, means for calculating a local time, and means for managing production and means for creating a task completion report.

In another preferred embodiment, the invention is a computer-implemented system for operating an apparel production business, said system comprising: a first computer for displaying choices about a plurality of garment attributes to a client on one or more front-end windows and accepting selections regarding those choices from said client on said one or more front-end windows, each of said garment attributes being identified by a task code; a second computer for processing said selections within a central operation center, simulating the appearance of a specified garment that reflects said selections and displaying a simulated garment to said client on one of said front-end windows and, after said client confirms said selections, requesting proposals from a plurality of garment producers for production of said specified garment; a third computer for accepting from a garment producer on one or more back-end windows a proposal to produce said specified garment; means for authorizing said garment producer to produce said specified garment in accordance with said proposal; means for maintaining a master schedule that reflects the production of said specified garment; and means for maintaining on said second computer a database containing information on the capacity of said plurality of garment producers to produce garments having at least some of said plurality of garment attributes. Preferably, the system further comprises means for displaying to the client on said first computer each category of said apparel attributes on a different one of said one or more front-end windows. Preferably, said categories include thread spinning and weaving textiles, garments, accessories, secondary processes, hung tags/badges, hangers, packaging, transportation, inspection and product finish. Preferably, the system is implemented on a network. More preferably, the system is implemented on the Internet. Preferably, the system further comprises means for organizing said capacity information by area blocks. Preferably, the system further comprises means for displaying said capacity information to said client on another of said one or more front-end windows on said first computer.

In another preferred embodiment, the invention is a computer-implemented system for operating an apparel production business, said system comprising: means for displaying choices about a plurality of garment attributes and accepting selections regarding those choices from a client, each of said garment attributes being identified by a task code; means for processing said selections and requesting proposals from a plurality of garment producers for production of a specified garment that reflects said selections; means for accepting a proposal from a garment producer to produce said specified garment; means for authorizing said garment producer to produce said specified garment in accordance with said proposal; means for maintaining a master schedule that reflects the production of said specified garment; and maintaining a database containing information on the capacity of said plurality of garment producers to produce garments having at least some of said plurality of garment attributes.

In another preferred embodiment, the invention is a computer-readable medium containing a sequence of instructions that implements a method disclosed herein.

In another preferred embodiment, the invention is tailored for application in other make-to-order businesses, such as accessories, luggage, ornaments, trinkets, eyeglasses, shoes, interior decorations, etc.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings:

FIG. 61 is a schematic flow diagram for a preferred embodiment of an updated quality standards portal operation.

FIG. 62 is an example of an abbreviated table of unified task codes used to specify garment attributes.

FIG. 63 is an example of an abbreviated table of unified task codes used to identify garment faults.

Figure 1:
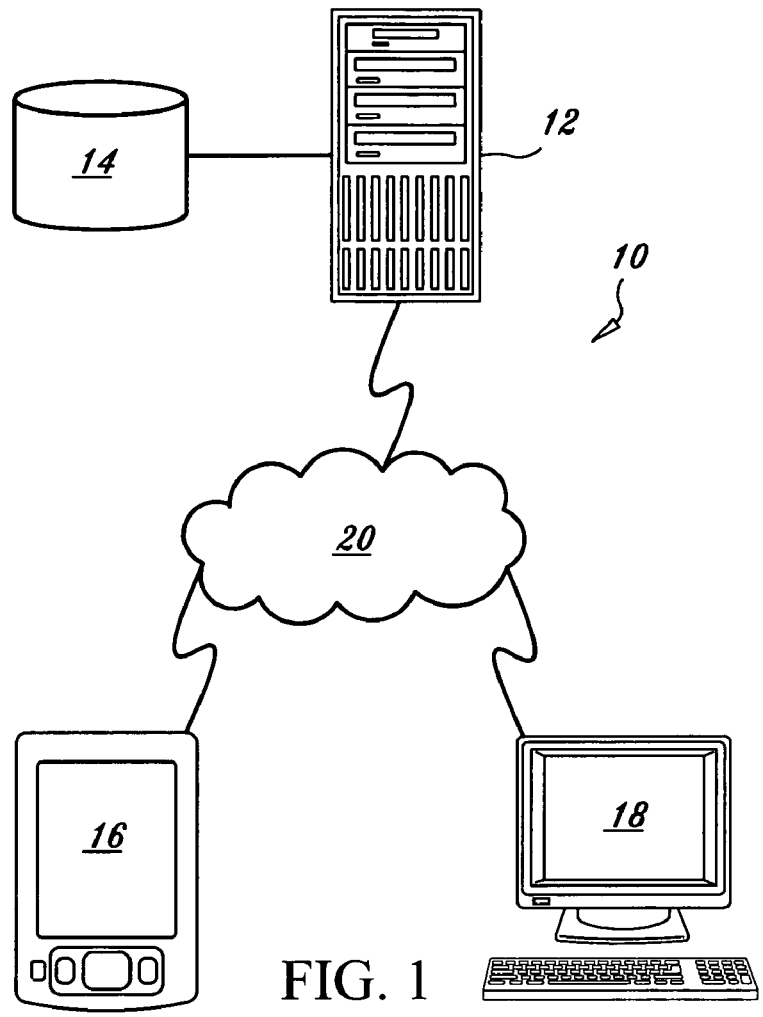
FIG. 1 is a schematic block diagram of a preferred embodiment of the invention.

The following reference numerals are used to indicate the parts and environment of the invention on the drawings:

| | |
|---|---|
| 10 | system |
| 12 | server, network server |
| 14 | database |
| 16 | mobile computing device |
| 18 | personal computer |
| 20 | Internet, network |
| 30 | front end, marketing channel |
| 31 | front end operations, marketing channel operations |
| 32 | central operation center |
| 33 | central operation center operations |
| 34 | back end, production channel |
| 36 | back end operations, production channel operations |
| 40 | administrative operations |
| 42 | reference operations |
| 44 | product configuration operations |
| 46 | product simulation operations |
| 48 | logistics operations |
| 50 | production capacity operation |
| 52 | display production capacity window step |
| 54 | obtain production capacity data step |
| 56 | set up production schedule step |
| 60 | ball park figure operation |
| 62 | display ball park window step |
| 64 | search for target information step |
| 66 | compute ball park estimate step |
| 70 | place order operation |
| 72 | display place order window step |
| 74 | perform production estimate operation step |
| 76 | produce contract documents step |
| 78 | perform payment operation step |
| 80 | accessories selection operation |
| 82 | display accessories selection window step |
| 84 | accept input of accessories selections step |
| 86 | update garment configuration database step |
| 88 | update garment accessories simulation step |
| 89 | go to accessories production capacity window step |
| 90 | hanger selection operation |
| 92 | display hanger selection window step |
| 94 | accept input of hanger selections step |
| 96 | create logo mark step |
| 98 | update garment hanger simulation step |
| 99 | go to hanger production capacity window step |
| 100 | registration operation |
| 101 | display client registration window step |
| 102 | obtain client registration number step |
| 104 | grant access to system step |
| 106 | download standards and codes step |
| 110 | basic simulation operation |
| 111 | display sample simulation window step |
| 112 | select textile design step |
| 114 | select pattern step |
| 120 | simulate garment step |
| 122 | new pattern simulation operation |
| 124 | import pattern step |
| 125 | import spinning and weaving step |
| 126 | import textile design step |
| 128 | select accessories step |
| 130 | original design simulation operation |
| 140 | pattern creation operation |
| 141 | display garment window step |
| 142 | check pattern production capacity step |
| 144 | depict pattern step |
| 146 | mark pattern step |
| 148 | set up synthetic procedure step |
| 150 | adjust size step |
| 152 | print copy of pattern step |
| 160 | original textile design operation |
| 161 | display original design textile material window step |
| 162 | check textile production capacity step |
| 164 | select raw material step |
| 166 | import design image step |
| 168 | select customization aspects step |
| 170 | print copy of textile step |
| 180 | textile material selection operation |
| 181 | display textile, material window step |
| 182 | check textile, material inventory step |
| 184 | select textile, material step |
| 190 | hung tag/badge selection operation |
| 191 | display hung tag/badge window step |

-continued

| | |
|---|---|
| 192 | check hung tag/badge inventory step |
| 194 | select hung tag/badge step |
| 196 | provide detailed configuration step |
| 198 | update garment hung tag/badge simulation step |
| 199 | check hung tag/badge capacity step |
| 200 | secondary processing operation |
| 201 | display secondary processing window step |
| 202 | check secondary processing capacity step |
| 204 | select secondary processing step |
| 206 | input detailed specifications step |
| 208 | update garment secondary processing simulation step |
| 210 | transportation operation |
| 211 | display transportation window step |
| 212 | input delivery date step |
| 214 | select transport method step |
| 216 | input supply location step |
| 218 | display transport estimates step |
| 220 | determine transport mode |
| 230 | quality and inspection operation |
| 231 | display quality and inspection window step |
| 232 | input special quality specification step |
| 234 | select special inspection step |
| 240 | product finish operation |
| 241 | display product finish window step |
| 242 | select product finish condition step |
| 244 | input product finish specification step |
| 250 | production estimate operation |
| 251 | display production estimate window step |
| 252 | receive production estimate request step |
| 254 | review cost management options step |
| 256 | produce estimate step |
| 260 | prepackaged product concept operation |
| 261 | display prepackaged product concept window step |
| 262 | select concept textile step |
| 264 | select concept accessories step |
| 266 | select packaging and hang tag/badge step |
| 268 | display garment window step |
| 270 | select secondary processing method step |
| 272 | select special inspection step |
| 274 | select product finish step |
| 276 | select delivery time step |
| 278 | produce estimate step |
| 280 | replenishment operation |
| 282 | enter client and production numbers step |
| 284 | display previous order information step |
| 290 | payment operation |
| 291 | display payment window step |
| 292 | select payment method step |
| 294 | approve payment step |
| 296 | manage payment step |
| 298 | revise master schedule step |
| 300 | issue production approval number step |
| 302 | inform production channel step |
| 306 | client order chart operation |
| 308 | display client order chart window step |
| 311 | enter client and production IDs step |
| 312 | display client order chart information step |
| 320 | production capacity management operation, capacity and inventory total management operation |
| 322 | receive production capacity information step |
| 324 | compute production capacity step |
| 326 | display production capacity window step |
| 328 | determine category production capacity step |
| 329 | revise inventory windows step |
| 330 | quality and inspection management operation |
| 332 | receive specifications step |
| 334 | distribute quality and inspection information step |
| 338 | notify outsourced inspection company step |
| 340 | notify manufacturer/supplier step |
| 350 | garment management operation |
| 352 | receive garment specification step |
| 354 | process garment documents step |
| 355 | technical specification check step |
| 356 | reconfirm garment specification step |
| 358 | start garment production step |
| 360 | reconfigure garment specification step |
| 370 | materials data and stock management operation |
| 372 | receive order step |
| 374 | process other documents step |
| 375 | reconfirm other specifications step |
| 376 | supply goods step |
| 378 | reselect options step |
| 380 | send to manufacturer step |
| 390 | original textile material production management operation |
| 392 | receive original textile specification step |
| 394 | process original textile documents step |
| 395 | technical specification check step |
| 396 | reconfirm original textile specification step |
| 398 | start textile production step |
| 400 | revise original textile specification step |
| 410 | component management operation |
| 412 | receive component specification step |
| 414 | process component specification documents step |
| 416 | reconfirm component specification step |
| 418 | start production of component step |
| 420 | revise component specification step |
| 422 | supply component step |
| 430 | master schedule management operation |
| 432 | receive order by category step |
| 434 | assemble schedule step |
| 436 | display data step |
| 438 | confirm order acceptance step |
| 440 | create documents step |
| 442 | create invoice step |
| 444 | announcement function step |
| 446 | execute task step |
| 450 | alteration management operation |
| 452 | receive alteration order step |
| 456 | notify production channel step |
| 458 | alter order step |
| 460 | reconfigure/reconsider/cancel order step |
| 470 | cost management operation |
| 472 | retrieve original estimate cost step |
| 474 | develop out-of-block costs step |
| 476 | maintain front-end cost file step |
| 478 | estimate production cost step |
| 480 | manage production cost step |
| 490 | transportation management operation |
| 492 | receive transport specification step 49 |
| 494 | determine route step |
| 496 | update transportation master schedule step |
| 498 | notify transport channel step |
| 500 | deliver product step |
| 502 | coordinate with customs agent step |
| 504 | coordinate with custom house step |
| 520 | garment report operation |
| 522 | access garment report step |
| 526 | update client order chart step |
| 528 | notify outsourced inspection company step |
| 530 | finish product step |
| 532 | notify distribution channel step |
| 540 | components report operation |
| 542 | display component report window step |
| 544 | communicate to product assembly location step |
| 550 | distribution report operation |
| 552 | display distribution report window step |
| 554 | report delivery of product step |
| 556 | prepare customs agent report step |
| 558 | prepare custom house report step |
| 600 | unified task code operation |
| 602 | display unified task code window step |
| 604 | search unified task code database step |
| 606 | present description of coded task step |
| 608 | download unified task codes step |
| 620 | quality standards operation |
| 622 | display quality standards window step |
| 624 | search quality standards database step |
| 626 | present quality standard step |
| 628 | download quality standards step |
| 640 | block maps operation |
| 642 | display block maps window step |
| 644 | identify client block areas step |
| 646 | perform logistics operation step |
| 660 | help operation |
| 662 | display help window |
| 664 | display help search results |
| 666 | display help contents step |
| 670 | packaging selection operation |

-continued

| | |
|---|---|
| 672 | display packaging selection window step |
| 674 | select or create packaging step |
| 676 | update garment packaging simulation step |
| 678 | go to packaging production capacity window step |
| 700 | general management operations |
| 710 | standards management operations |
| 720 | inventory management operations |
| 730 | production management operations |
| 740 | logistics management operations |
| 750 | spinning and weaving operation |
| 751 | display spinning and weaving window step |
| 752 | select raw material step |
| 753 | update spinning and weaving production capacity database step |
| 754 | update reference documents step |
| 755 | update pattern configuration database step |
| 756 | update product configuration database step |
| 757 | update textile production capacity window step |
| 760 | accessories data and stock management operation |
| 762 | display accessories data and stock management window step |
| 764 | display accessories data step |
| 766 | query accessories factory/supplier database step |
| 767 | update accessories master schedule operation step |
| 768 | update accessories cost management operation step |
| 769 | update quality standards operation step |
| 770 | hangers data and stock management operation |
| 772 | display hangers data and stock management window step |
| 774 | display hangers data step |
| 776 | query hangers factory/supplier database step |
| 777 | update hangers master schedule operation step |
| 778 | update hangers cost management operation step |
| 779 | update hangers quality standards operation step |
| 780 | secondary processing management operation |
| 782 | display secondary processing data and stock management window step |
| 784 | display secondary processing data step |
| 785 | query secondary processing factory/supplier database step |
| 786 | update secondary processing master schedule operation step |
| 787 | update secondary processing production management operation step |
| 788 | update secondary processing quality standards operation step |
| 789 | update secondary processing cost management operation step |
| 790 | prepackaged concept management operation |
| 792 | display prepackaged concept management window step |
| 794 | consolidate prepackaged concept orders step |
| 796 | manage consolidated orders step |
| 800 | spinning and weaving management operation |
| 802 | display spinning and weaving management window step |
| 803 | display spinning and weaving management data step |
| 804 | update spinning and weaving logistics management operation step |
| 805 | update spinning and weaving factory/supplier database management operation step |
| 806 | update spinning and weaving master schedule management operation step |
| 807 | update spinning and weaving production management operation step |
| 808 | update spinning and weaving quality standards management operation step |
| 809 | update spinning and weaving cost management operation step |
| 810 | client management operation |
| 812 | display client management window step |
| 814 | retrieve data for identified client step |
| 816 | present data for identified client step |
| 818 | provide service to identified client step |
| 820 | factory/supplier database management operation |
| 822 | display factory/supplier database management window step |
| 824 | display factory/suppler data by client step |
| 826 | update factory/supplier data step |
| 828 | update production capacity operation |
| 829 | produce weekly factory/supplier reports |
| 840A | front end payment management operation |
| 840B | back end payment operation |
| 841 | display front end payment management window step |
| 842 | confirm receipt of payment data from client step |
| 843 | communicate payment data to bank step |
| 844 | receive payment approval from bank step |
| 845 | release purchase order step |
| 846 | display back end payment management window 846 |
| 847 | receive client approval step |
| 848 | notify bank of client approval step |
| 849 | flag contract as completed step |
| 850 | unified task code management operation |
| 852 | display unified task code management window step |
| 854 | publish unified task codes step |
| 856 | create new task code step. |
| 858 | update unified task codes step |
| 860 | quality standards management operation |
| 862 | display quality standards management window step |
| 864 | publish quality standards step |
| 865 | create new quality standards step |
| 866 | update quality standards step |
| 870 | block management operation |
| 872 | display block area management window step |
| 874 | optimize block area maps for client base step |
| 876 | publish block area maps step |
| 880A | back end website management operation |
| 880B | front end website management operation |
| 881 | display back end website management window step |
| 882 | display overall status of back end web pages step |
| 883 | maintain logistics management operation web pages step |
| 884 | maintain capacity and inventory management web pages step |
| 885 | maintain master schedule web pages step |
| 886 | maintain central operation center web pages step |
| 887 | display front end website management window step |
| 888 | maintain administrative data web pages step |
| 889 | display overall status of front end web pages step |
| 900 | production capacity reporting operations |
| 910 | production progress reporting operations |
| 920 | fulfillment status reporting operations |
| 930 | standards update reporting operations |
| 940 | production capacity report operation |
| 942 | display production capacity report window step |
| 944 | accept input from factories step |
| 946 | produce production capacity report step |
| 948 | request delayed production capacity input step |
| 950 | stock information report operation |
| 952 | display stock information report window step |
| 954 | accept input from suppliers step |
| 956 | produce stock information report step |
| 958 | request delayed stock information input step |
| 960 | special inspection report operation |
| 962 | display special inspection report window step |
| 964 | accept input from special inspectors step |
| 966 | update master schedule management operation step |
| 968 | update order chart operation step |
| 970 | updated unified task code portal operation |
| 972 | display unified task code report window step |
| 976 | receive task code updates from front end step |
| 974 | receive task code updates from back end step |
| 980 | updated quality standards portal operation |
| 982 | display quality standards report window step |
| 986 | receive quality standards updates from front end step |
| 984 | receive quality standards updates from back end step |
| 990 | back end registration operation |
| 992 | display back end registration window step |
| 994 | obtain producer number step |
| 996 | display manual and agreement step |
| 998 | grant access to back end step |

DETAILED DESCRIPTION OF THE INVENTION

Referring to FIG. 1, a preferred embodiment of system 10 is presented. System 10 preferably comprises server 12 which is connected to database 14, and mobile computing device 16 and/or personal computer 18 which are connected to server 12 via Internet or network 20. A variety of data are stored in database 14, mobile computing device 16 and/or personal computer 18. These data have any appropriate form (e.g., relational database tables or records, object database objects, extensible markup language files, etc.), but preferably contain the data structures disclosed herein. Menus are used to facilitate navigation among windows. The state of each window is managed by means of flags that are stored in a database.

In a preferred embodiment, system 10 is implemented in JAVA or PHP language and a preferred database is PostgreSQL or MySQL. Correspondence is preferably supported in many national languages. A copy of correspondence is preferably saved according to a language in a database and managed it without writing in it to a static file on a WEB screen as a character string.

Figure 2A:
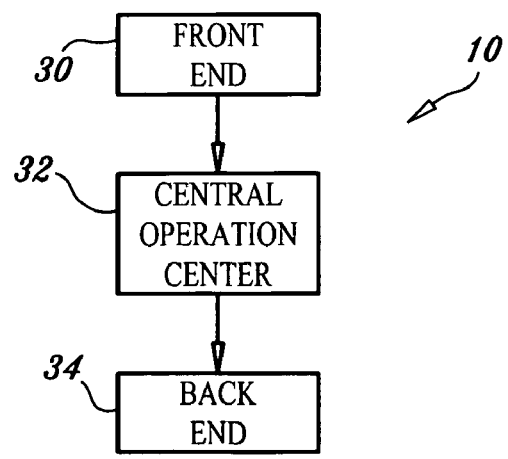
FIG. 2A is a schematic block diagram illustrating the components a preferred embodiment of the invention.

Referring to FIG. 2A, a schematic block diagram of the components of a preferred embodiment of system 10 is presented. In this embodiment, system 10 preferably comprises front end 30, central operation center 32 and back end 34. Preferably, front end 30 supports marketing channel operations 31 and back end 34 supports production channel operations 36.

Interaction by a client with system 10 is preferably accomplished by means of receiving output from and making input to system 10 in computer-implemented user-interface screens, termed "windows" herein, many of which are listed as operations on FIGS. 2B-2G. In this embodiment, each of the parameters for the client to select/specify is displayed on screen. Preferably, each such window displays three options: "Select," "Do Not Select" and "Put on Hold." If the client selects the "Put on Hold" option, the client is asked to supply a reason for making this selection. If a desired schedule cannot be met, central operation center 32 contacts the client with an alternative plan/counteroffer. The client confirms the selection/specification and then navigates to the next window. If an incorrect selection is made by the client, then a warning is communicated to the client, e.g., with a warning message box.

This operation coordinates the production structure to make it rational. Individual manufactures and suppliers have different tasks, product destinations and amounts of available capacity. By knowing that information beforehand, central operation center 32 can dispatch business to appropriate manufacturers and suppliers. The structure of the producers activities are monitored on the short and long term. The central operation center 32 is then able to combine one clients' order with other client's orders to optimize production and transportation operations.

After all the selections associated with required fields have been made, with a click of a button (e.g., a "sign business agreement and order" button), the order is preferably dispatched to central operation center 32 in place order operation 70. Then, in a preferred embodiment, central operation center 32 contacts the client via the Internet (e.g., via e-mail), confirming the contents of the order, price, production sample schedule, etc.

Figure 2B:
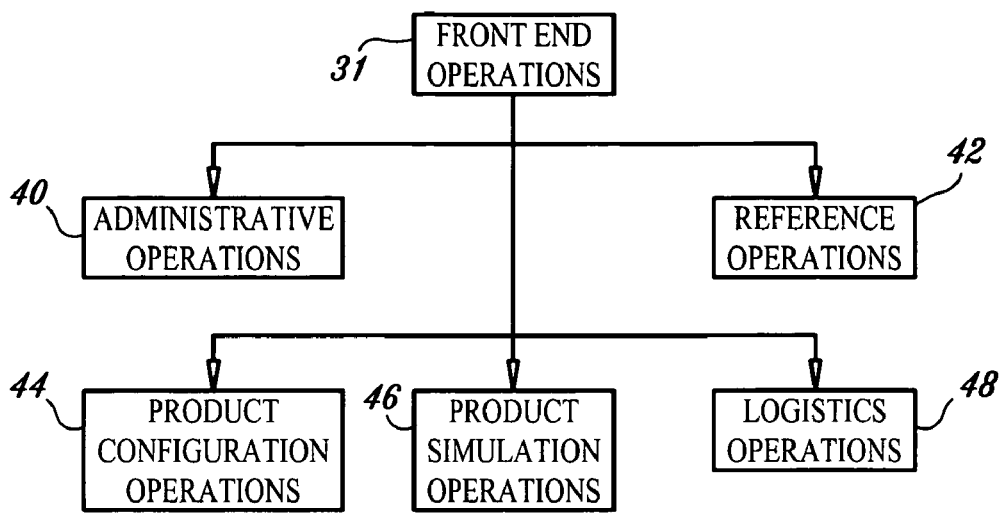
FIG. 2B is a schematic block diagram illustrating front end operations of a preferred embodiment of the invention.
Figure 2C:
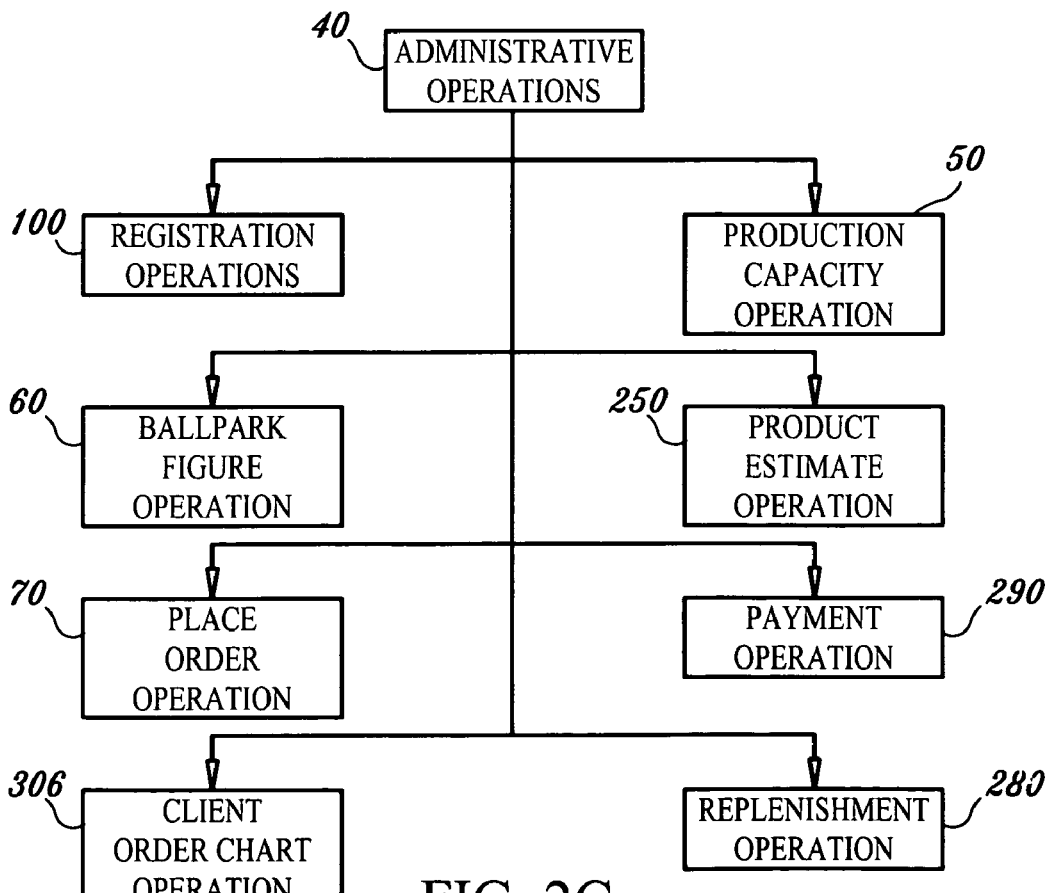
FIG. 2C is a schematic block diagram illustrating administrative operations of a preferred embodiment of the invention.
Figure 2D:
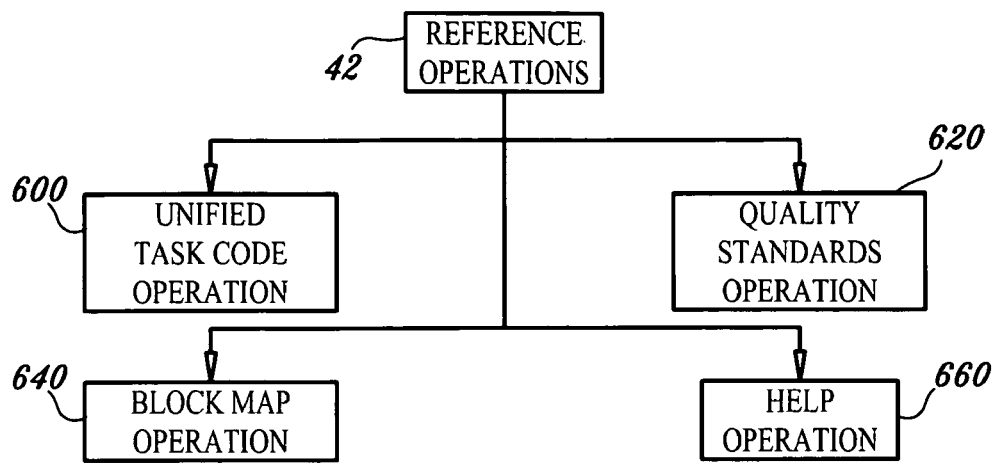
FIG. 2D is a schematic block diagram illustrating reference operations of a preferred embodiment of the invention.
Figure 2E:
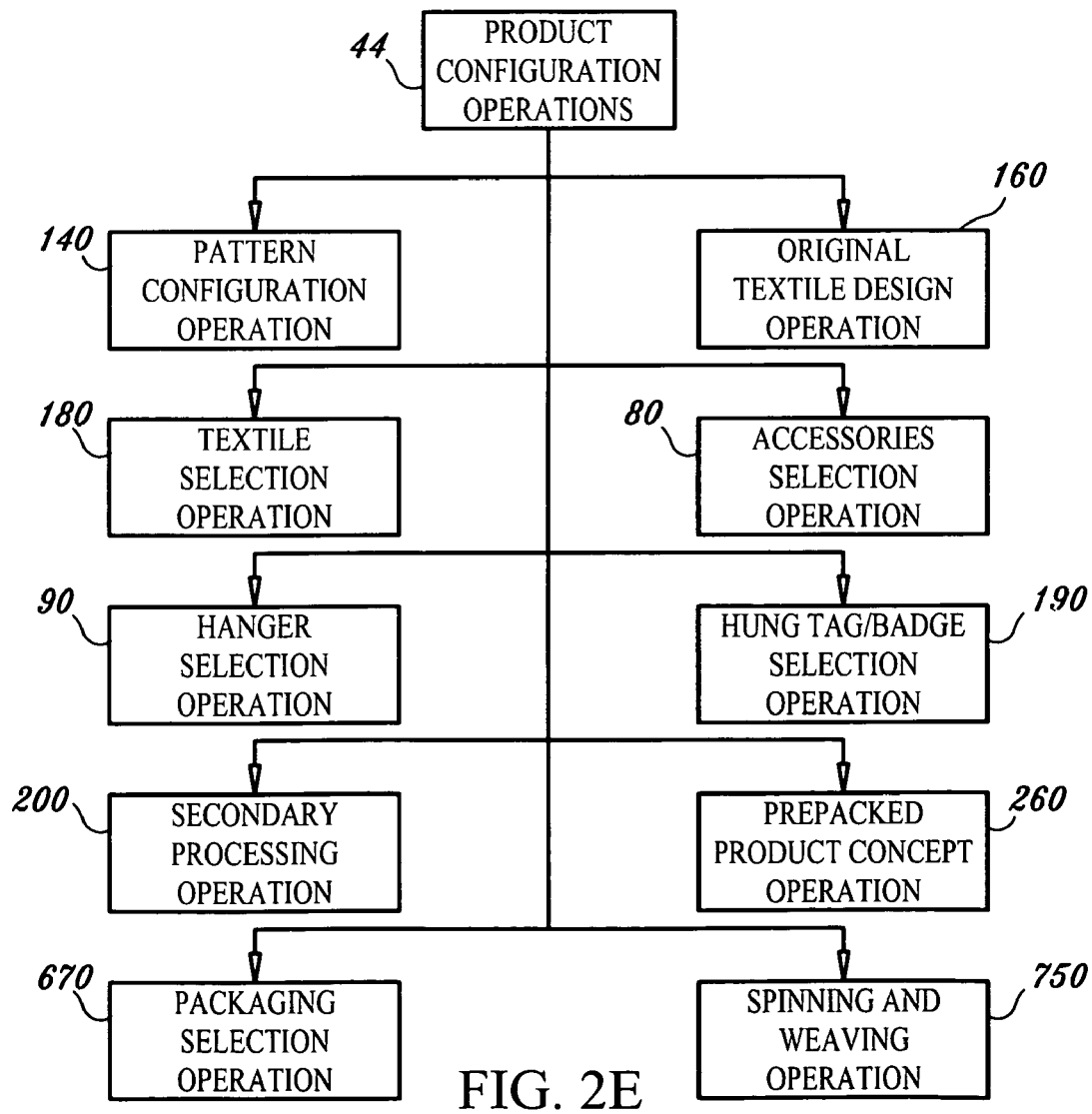
FIG. 2E is a schematic block diagram illustrating product configuration operations of a preferred embodiment of the invention.
Figure 2F:
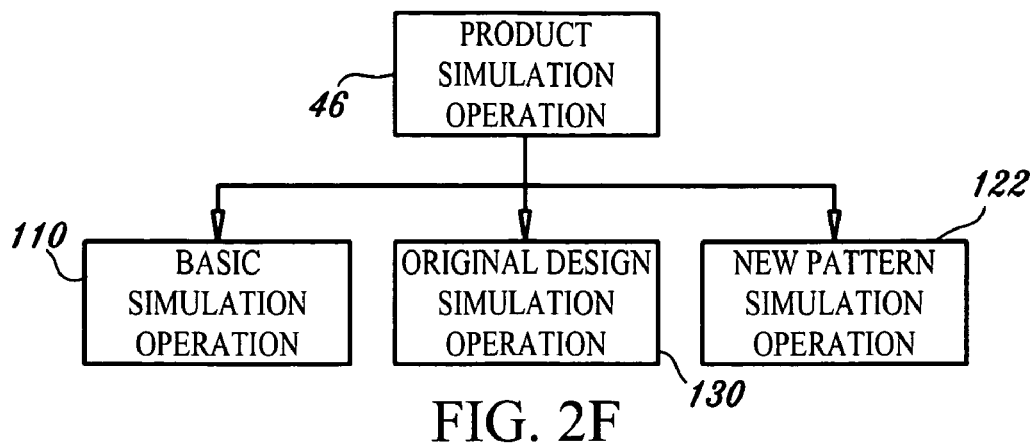
FIG. 2F is a schematic block diagram illustrating product simulation operations of a preferred embodiment of the invention.
Figure 2G:
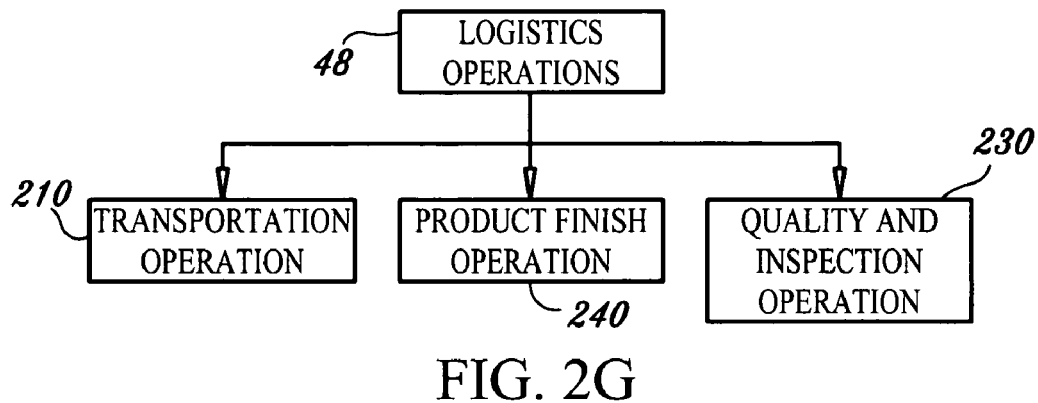
FIG. 2G is a schematic block diagram illustrating logistical operations of a preferred embodiment of the invention.

Individual operations comprise a sequence of process steps that are required to produce a result that is useful to the user of front end 30, central operation center 32 or back end 34 of system 10. Types of front-end operations 31, that is, those operations initiated by a person who is a client of system 10, are illustrated in FIG. 2B. Individual front-end operations 31 are illustrated in FIGS. 3-28. These operations 31 are implemented by front end 30 of system 10. Front-end operations 31 preferably comprise administrative operations 40, reference operations 42, product configuration operations 44, product simulation operations 46 and logistics operations 48. As illustrated in FIG. 2C, administrative operations 40 include registration operation 100, production capacity operation 320, ballpark figure operation 60, production estimate operation 250, place order operation 70, payment operation 290, client order chart operation 306, and replenishment operation 280. As illustrated in FIG. 2D, reference operations 42 include unified task code operation 600, quality standards operation 620, block maps operation 640 and help operation 660. As illustrated in FIG. 2E, product configuration operations 44 include pattern configuration operation 140, original textile design operation 160, textile (fabric) selection operation 180, accessories selection operation 80, hanger selection operation 90, hung tag/badge selection operation 190, secondary processing operation 200, packaging selection operation 670, prepackaged product concept operation 260 and spinning and weaving operation 750. As illustrated in FIG. 2F, product simulation operations 46 include basic simulation operation 110, new pattern simulation operation 122, and original design simulation operation 130. As illustrated in FIG. 2G, logistics operations 48 include transportation operation 210, quality and inspection operation 230, and product finish operation 240.

In a preferred embodiment, in each window that is displayed to a client there is an area for the client to mark "select" or "don't select" or "put on hold" as an option. The client may also choose which window to go to. When the client selects "put on hold", the client is asked to specify a reason, and if the desired schedule cannot be strictly met, then central operation center 32 subsequently contacts the client with an alternative plan/counter offer. At each window, when the selection made is a mismatch (e.g., a child's size is selected even though "Men's product" is being ordered), a mismatch warning message box preferably pops up.

Figure 3:
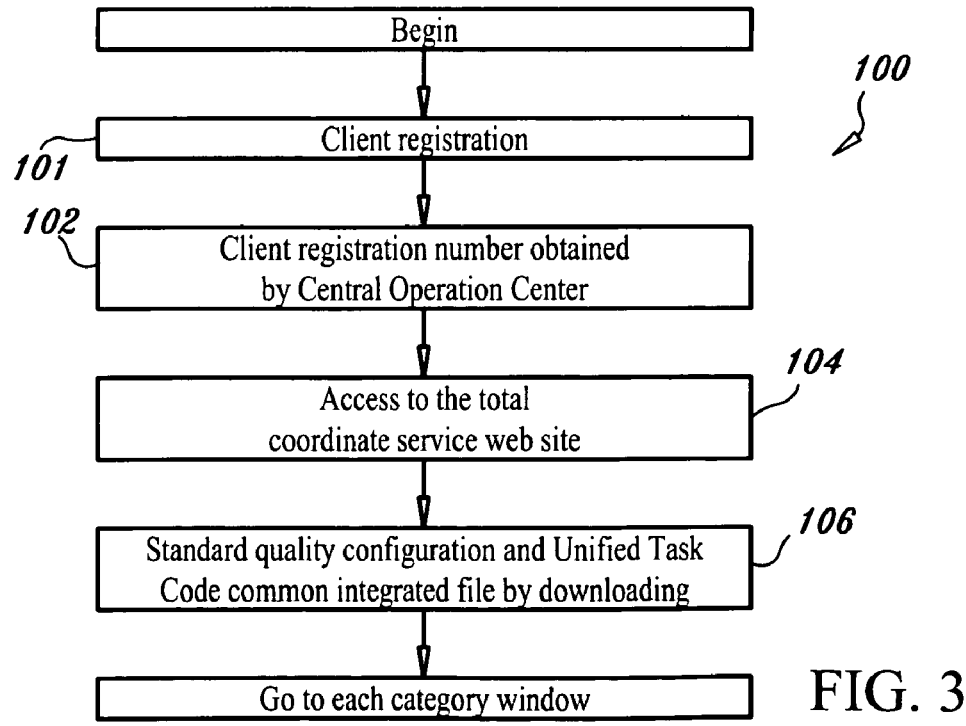
FIG. 3 is a schematic flow diagram for the registration operation of a preferred embodiment of the invention.

Referring to FIG. 3, a schematic flow diagram of registration operation 100 is presented. Registration operation 100 preferably comprises display client registration window step 101, obtain client number step 102, grant access to system step 104 and download standards and codes step 106. A client with a business license, upon completing the membership registration, obtains a client number (and system access privileges) from central operation center 32.

In a preferred embodiment, a client (user) initially registers basic information such as an e-mail address, business license number, etc. Central operation center 32 accepts the registration and sends a client number and a temporary password to the e-mail address. The user logs into a system using the temporary password in the first login, demands it setup his own password, then user is able to access to a system. A stored procedure is used to generate the client number. Even if multiple registration demands occur at the same time, a duplicate of client numbers is not generated.

In download standards and codes step 106, the client downloads a standard quality configuration (a common integrated file, to be shared by downloading). To ensure that both the production channel and the marketing channel share the same understanding of the tasks, unified task codes are also downloaded in download standards and codes step 106. Thus, system 10 preferably codifies sewing methods, color specifications, size specifications, names of the fabrics and raw materials, thread types, standard weave structures, etc. Quality standard and task code documents can be searched for and displayed on the user's screen. PDF file are preferably displayed as the result. Each PDF file is generated on the server and the user downloads it.

Figure 4A:
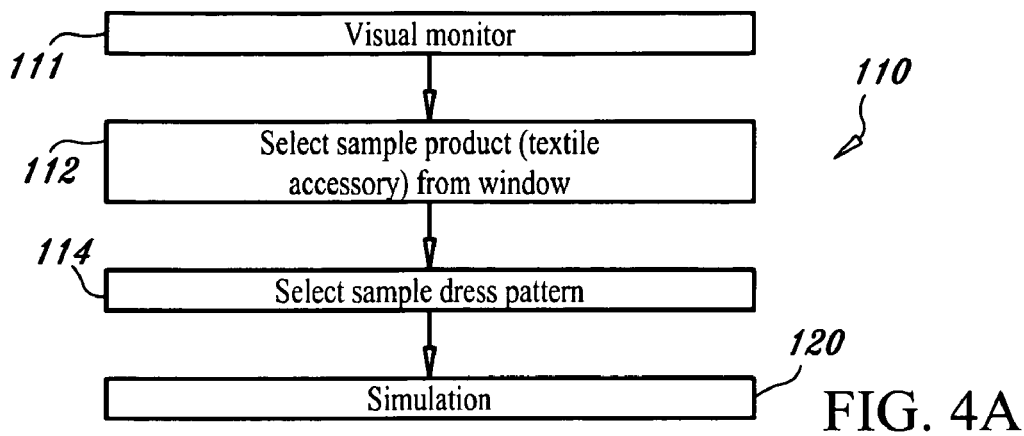
FIG. 4A is a schematic flow diagram for a preferred embodiment of a basic simulation operation.
Figure 4B:
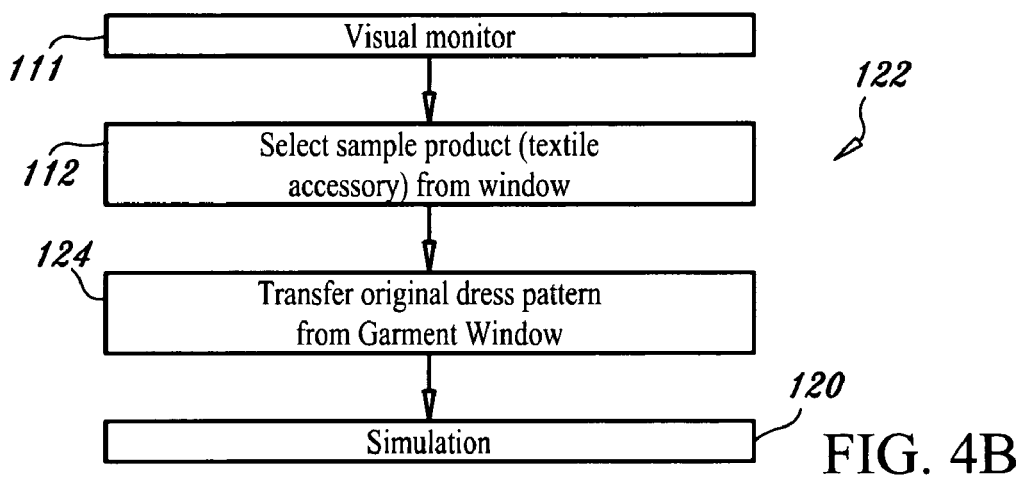
FIG. 4B is a schematic flow diagram for a preferred embodiment of a new pattern simulation operation.
Figure 4C:
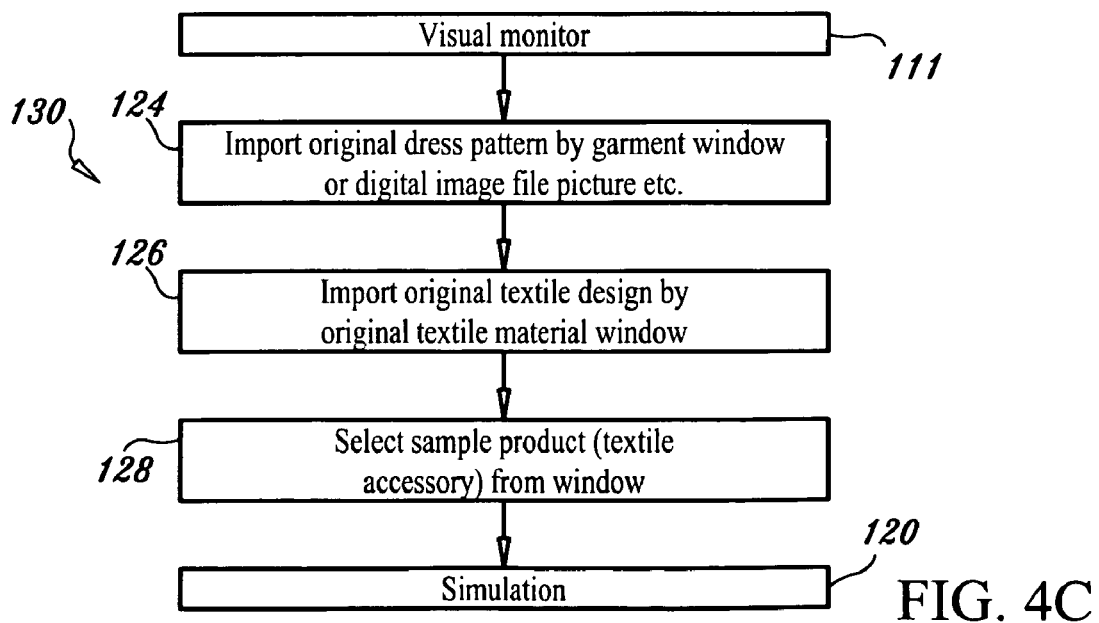
FIGS. 4C and 4D are schematic flow diagrams for preferred embodiments of an original design simulation operation.

Referring to FIGS. 4A-4C, schematic flow diagrams of a preferred embodiment of product simulation operations are presented. The sample simulation window graphically simulates a sample of a garment, based on the textile, design, color, garment style, accessories, spinning and weaving, etc. stipulated by the client. It is also capable of simulating a sample based on a client's original design.

Sample simulation, production schedule set-up and configuration of other details are preferably performed in separate windows. From the sample simulation window, the client selects the sample product number, colors, etc. From the textile material inventory and accessory window, the client selects a style and a pattern. Scanning can be used to input an original sample design. A picture of the original design is transmitted to server 12 and is displayed in the original textile window. From there, selections are made. For 3D modeling, one or more of the following technologies are used: Flash-Player and a combination of Swift 3D Active X control Open GL.

Referring to FIG. 4A, a schematic flow diagram of a preferred embodiment of basic simulation operation 110 is presented. Basic product simulation operation preferably comprises access sample simulation window 111, select textile design step 112, select pattern step 114 and simulate garment step 120. In this embodiment, the simulation operation coordinates the sample dress pattern with the textile design selected from the textile material inventory window. Simulate garment step 120 is accomplished using the digitized information that is developed as described below.

Referring to FIG. 4B, a schematic flow diagram of a preferred embodiment of new pattern simulation operation 122. New pattern simulation operation 122 preferably comprises access sample simulation window 111, select textile design step 112, import pattern step 124 and simulate garment step 120. In this embodiment, a simulation is run on an original dress pattern created in the garment window (described below).

Referring to FIG. 4C, a schematic flow diagram of a preferred embodiment of original design simulation operation 130. New pattern simulation operation 122 preferably comprises access sample simulation window 111, import pattern step 124, import textile design step 126, select accessories step 128 (if the client want to simulate the garment with accessories), and simulate garment step 120. In this embodiment, the simulation operation coordinates an original dress pattern created in the garment window with an original textile design created in the original design textile material window. Color-coordinating functionality is available with this simulation operation. Color coordination is accomplished using methods known to those skilled in the art.

Figure 4D:
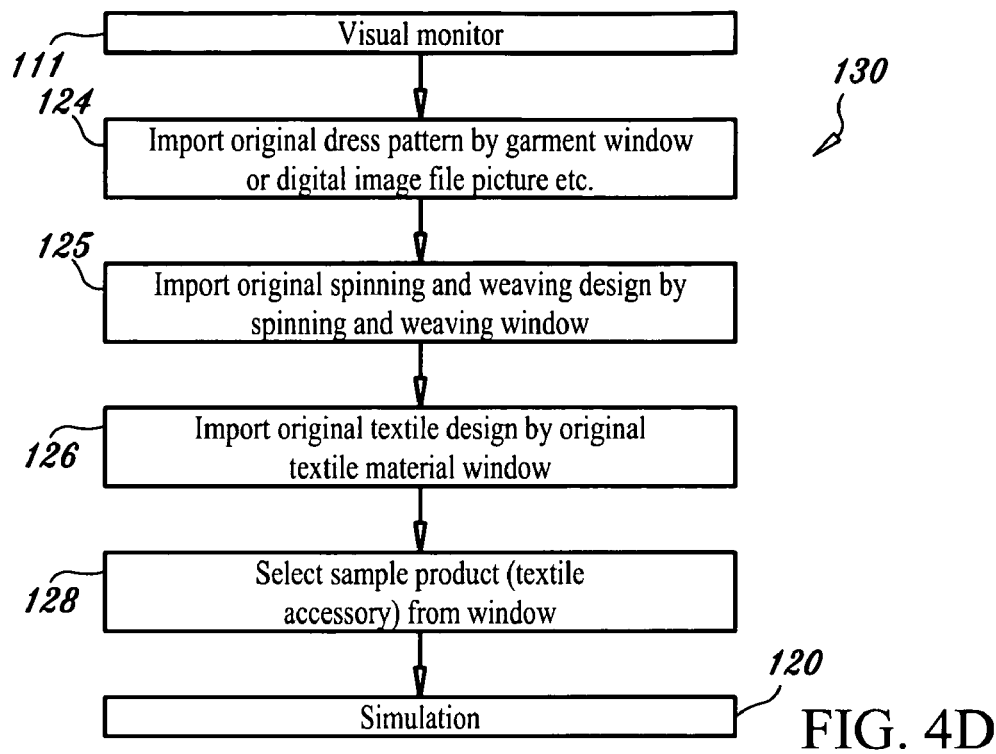

Referring to FIG. 4D, a schematic flow diagram of a preferred embodiment of original design simulation operation 130. New pattern simulation operation 122 preferably comprises access sample simulation window 111, import pattern step 124, import spinning and weaving step 125 import textile design step 126, select accessories step 128 (if the client want to simulate the garment with accessories), and simulate garment step 120. In this embodiment, the simulation operation coordinates an original dress pattern created in the garment window and a spinning and weaving pattern created in the spinning and weaving window with an original textile design created in the original design textile material window. Color-coordinating functionality is available with this simulation operation. Color coordination is accomplished using methods known to those skilled in the art.

Figure 5:
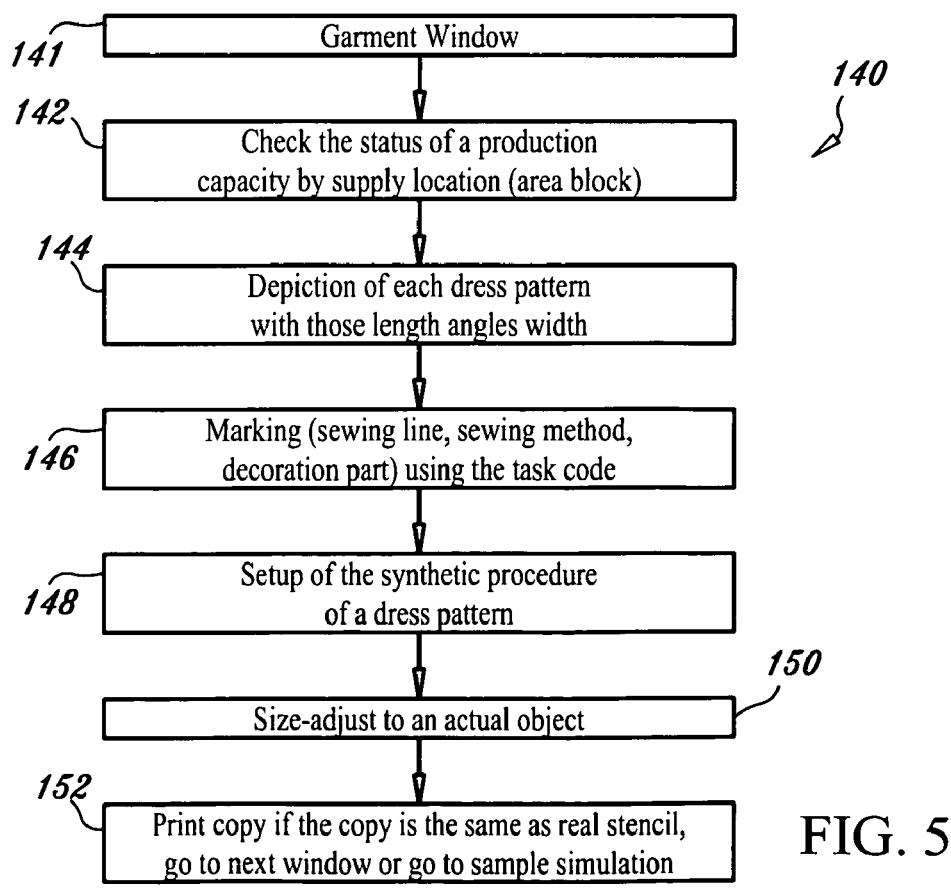
FIG. 5 is a schematic flow diagram for a preferred embodiment of a pattern creation operation.

Referring to FIG. 5, a schematic flow diagram of a preferred embodiment of pattern creation operation 140 is presented. This operation is carried out in the garment window. Pattern creation operation 140 preferably comprises access garment window 141, check pattern production capacity step 142, depict pattern step 144, mark pattern step 146, set up synthetic procedure step 148, adjust size step 150 and print copy of pattern step 152. Check pattern production capacity step 142 involves determining whether there is pattern production capacity available in the area block of the client. Depict pattern step 144 involves inputting the data required to depict each component of the pattern. Mark pattern step 146 involves marking the pattern with task codes to communicate production task details. Set up synthetic procedure step 148 is described below. Adjust size step 150 involves adjusting the size of the pattern. Print copy of pattern step 152 involves printing a copy of the pattern.

In a preferred embodiment, the garment window displays digitized dress-cut patterns (stencils). Each individual subpart of the pattern is preferably assigned a unified standard code. A common file of these patterns is maintained, which allows them to be shared, e.g., through downloading. The pattern prevents a dress or apparel item from being assembled and sewn together in the wrong way. The estimates are a function of the number of patterns per garment, the skill level needed to sew the garment together, etc. The garment window also displays questions about production for the client to answer (e.g., production due date, sewing method, number of the stencils, size quantity, etc.)

In a preferred embodiment, set up synthetic procedure step 148 involves digitizing the cut pattern (stencil), marking each stencil and adding a stencil code. Each stencil is sketched and the angles, inclines and lengths are configured in detail and the stencil is adjusted to actual size using a proportionate ratio-factor to verify stencil shape. Each stencil is also marked with a sewing method code, sewing lines, button locations, and pocket positions, etc. For each stencil, a stencil code (e.g., front body, rear body, collar, etc.) and a sewing method code (using a unified standard code) are input to define the stencil's processing procedure. A stencil with a defined processing procedure can be viewed as a 3-dimensional image, from the front and from the back. This gives a more true-to-life visualization. The completed dress pattern is merged with textile selection when the simulation is run. If the actual-sized stencil is oversized, a printout of it is output across multiple pages so that they can be patched together into one piece. If the garment pattern printed out matches the garment pattern desired by the client, (or with an image of the product) then the tasks associated with this operation are complete.

In a preferred embodiment, a tool is available to assist the client in drawing a paper pattern in 2D and to construct an image of the paper pattern. The client assigns unified task codes, sets marking points and cutting lines on the pattern. The client can also upload an image that he has scanned himself. Multiple images can be combined in 2D and by means of an editing function. Several pieces of paper can be printed out to produce a full sized paper pattern using WEB book vote technology.

Figure 6:
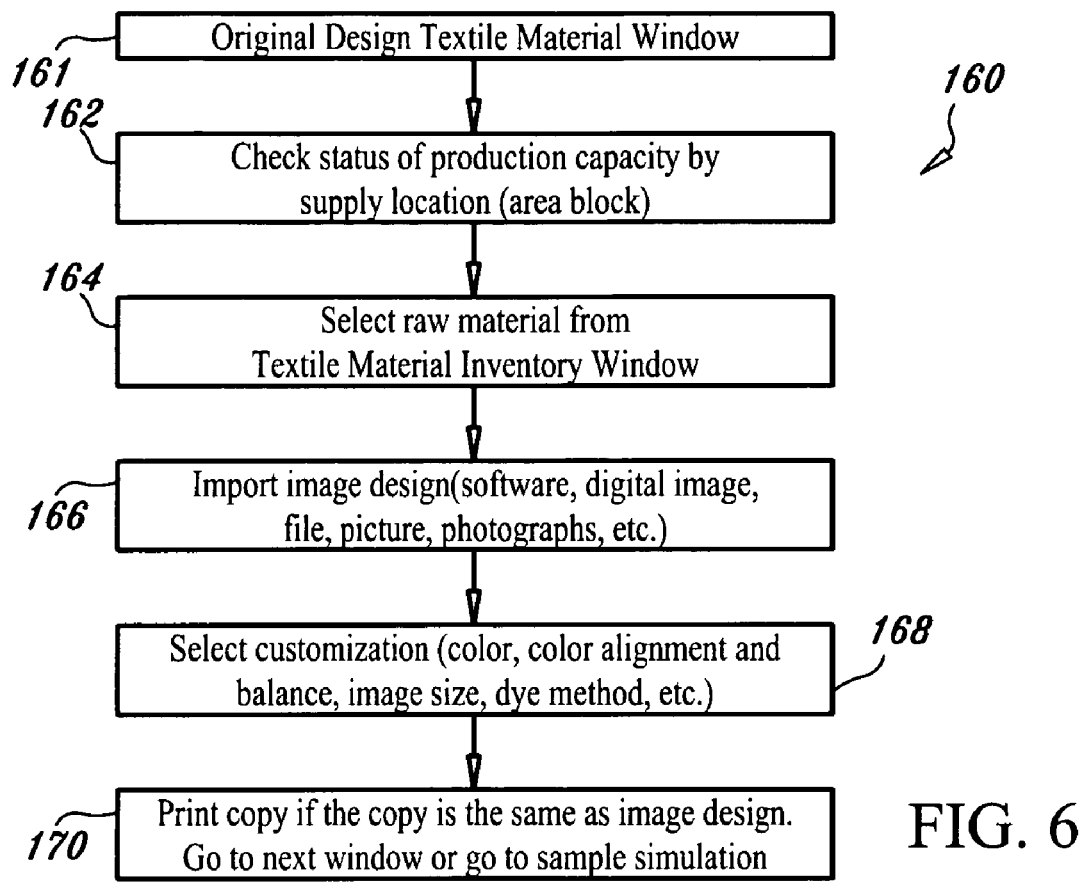
FIG. 6 is a schematic flow diagram for a preferred embodiment of an original textile design operation.

Referring to FIG. 6, a schematic flow diagram of a preferred embodiment of original textile design operation 160 is presented. This operation is preferably carried out in the original design textile material window. Original textile design operation 160 preferably includes access original design textile material window step 161, access check textile production capacity step 162, select raw material step 164, import design image step 166, selection customization aspects step 168 and print copy of textile step 170. In this operation, an image of the textile design can be imported (via the Internet) as a digital image file, picture, photograph, etc. The client selects the raw material from the textile material inventory window or provides detailed specifications on the raw material.

In a preferred embodiment, the client can select a plain textile from textile and material inventory window then customized an original using various processing tools and display it virtually. The client can also upload an image that he has scanned himself. Multiple images can be combined in 2D and by means of an editing function. Several pieces of paper can be printed out to produce a full sized paper pattern using WEB book vote technology.

If customization is desired, the client inputs color, color alignment and balance, image size (pixel size), print dye method, weave, composition, surface touch (texture), stitch type on the edge, secondary processing, finish method, etc. Embroidery is converted to a data format. When the client is satisfied that the image matches what he has envisioned, the operation is complete. Central operation center 32 subsequently sends out a product sample to the client, and produces ball park estimates (on pricing, lead-time, etc.)

Figure 7:
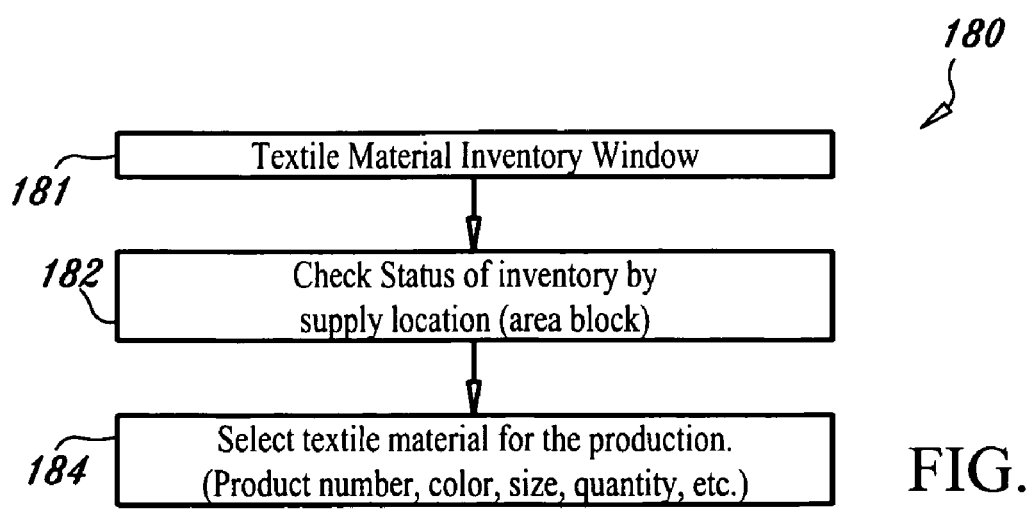
FIG. 7 is a schematic flow diagram for a preferred embodiment of a textile material inventory selection operation.

Referring to FIG. 7, a schematic flow diagram of a preferred embodiment of textile (fabric), materials selection operation 180 is presented. This operation is preferably carried out in the textile and materials inventory window. Textile and materials selection operation 180 preferably involves access textile materials inventory window step 181, check textile and materials inventory step 182 and select textile and materials step 184. In this operation, the client specifies the type, size, raw material, color, and supply location for the textile and materials.

The textile material inventory window preferably displays data on new textile material and inventory (items low in stock, etc.) and is updated weekly. Data on the raw fabric is provided (e.g., size, weave, material, etc.). A search function is preferably provided, so that information on a fabric that a client is looking for can be searched based on motif, material, etc.

Figure 8:
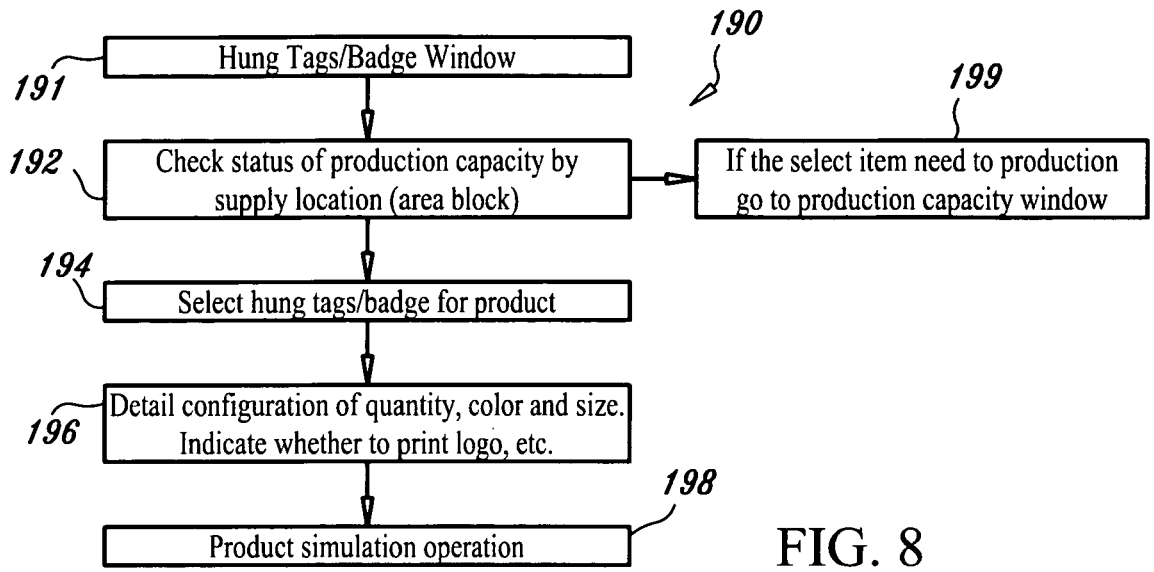
FIG. 8 is a schematic flow diagram for a preferred embodiment of a hung tag/badge selection operation.

Referring to FIG. 8, a schematic flow diagram of a preferred embodiment of hung tag/badge selection operation 190 is presented. This operation is preferably carried out in the hung tag/badge window. Hung tag/badge selection operation 190 preferably includes access hung tag/badge window step 191, check hung tag/badge inventory step 192, select hung tag/badge step 194 and provide detailed configuration step 196. In this operation, the client specifies the detailed configuration of the materials, quality, quantity color, size, style and logo design, etc. Update garment hung tag/badge simulation is step 198. Hung tag/badge production capacity window is step 199.

Figure 9:
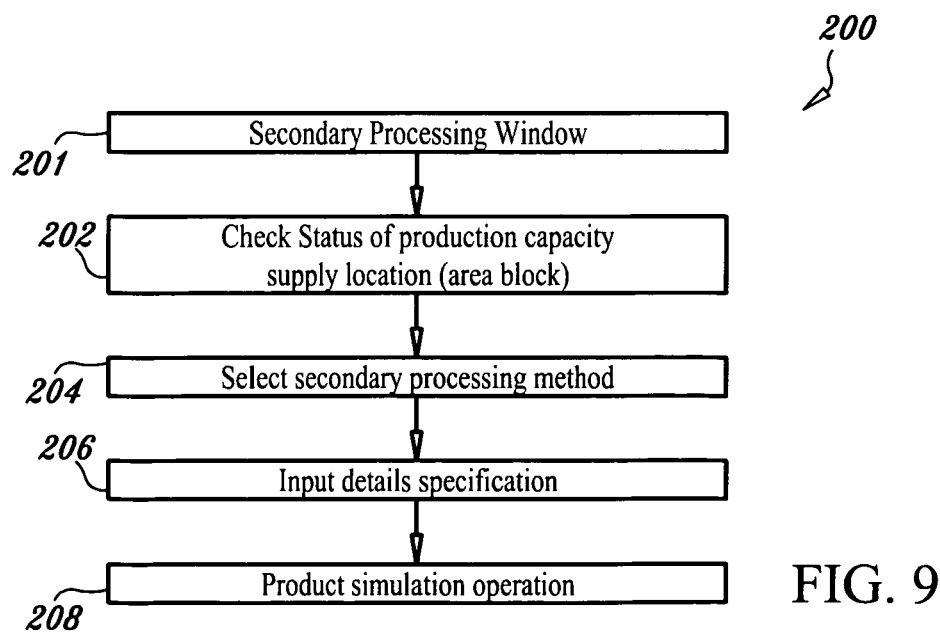
FIG. 9 is a schematic flow diagram for a preferred embodiment of a secondary processing operation.

Referring to FIG. 9, a schematic flow diagram of a preferred embodiment of secondary processing operation 200 is presented. This operation is preferably carried out in the secondary processing window. Secondary processing operation 200 preferably includes access secondary processing window step 201, check secondary processing capacity step 202, select secondary processing method step 204 and input detailed specifications step 206. Secondary processes include embroidery, second dyeing and other special treatments. In this operation, secondary processing methods, designs and colors are selected. Update garment hung tag/badge simulation is step 208.

Figure 10:
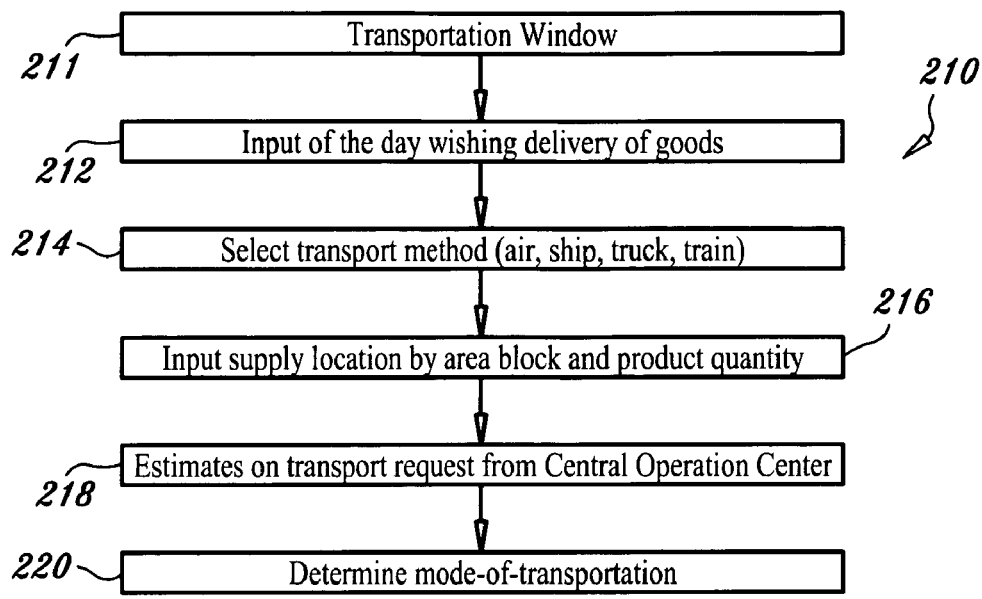
FIG. 10 is a schematic flow diagram for a preferred embodiment of a transportation operation.

Referring to FIG. 10, a schematic flow diagram of a preferred embodiment of transportation operation 210 is presented. This operation is preferably carried out in the transportation window. Transportation operation 210 preferably includes access transportation window step 211, input delivery date step 212, select transport method step 214, input supply location step 216, display transport estimates step 218 and determine transport mode step 220. In this operation, the client is given a choice of transport method (e.g., by air, ship, truck, train, etc). When the client enters the transport method, the region the garment is being shipped from (origination) and the region the garment is being delivered to (destination), a time estimate is displayed based on the area block. In this operation, the client may also designate specific delivery and packaging information, such as the supply location, delivery time frame, packaging requirements and insurance.

Figure 11:
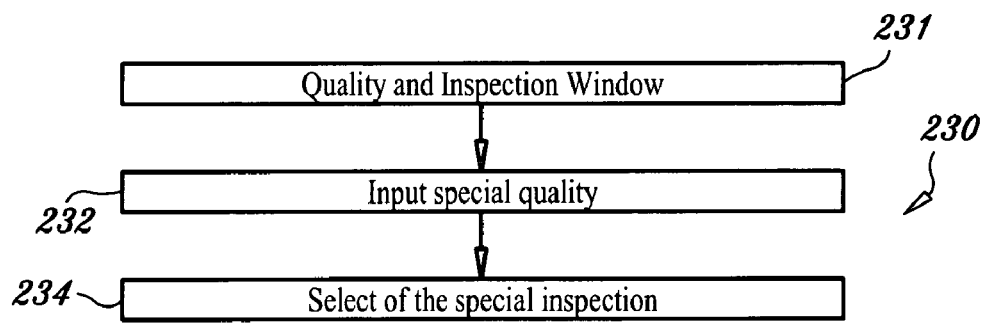
FIG. 11 is a schematic flow diagram for a preferred embodiment of a quality and inspection operation.

Referring to FIG. 11, a schematic flow diagram of a preferred embodiment of quality and inspection operation 230 is presented. This operation is preferably carried out in the quality and inspection window. Quality and inspection operation 230 preferably includes access quality and inspection window 231, input special quality step 232 and select special inspection step 234. Standard inspection is conducted as a matter of course, but if special inspection or a need to outsource to an independent inspection company may be specified by the client in this operation. The client may also download information on standardized inspection methods, select an inspection method and input special quality specifications.

Figure 12:
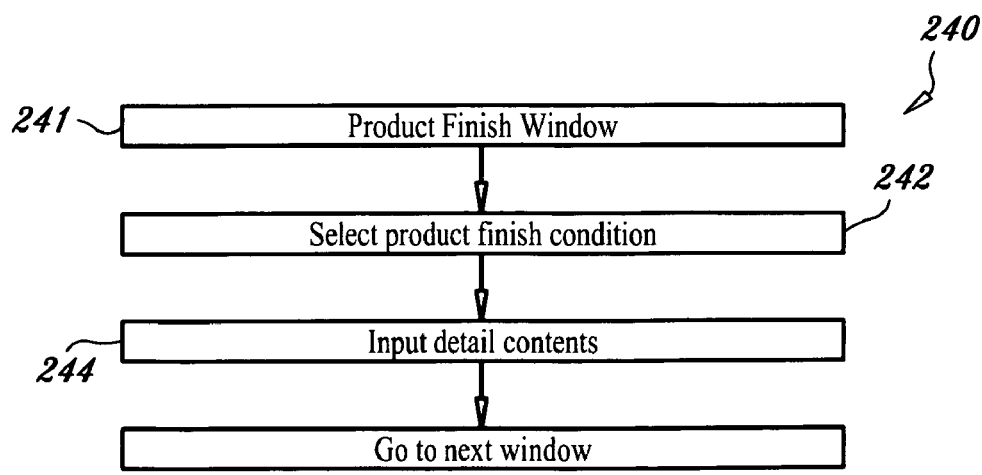
FIG. 12 is a schematic flow diagram for a preferred embodiment of a product finish operation.

Referring to FIG. 12, a schematic flow diagram of a preferred embodiment of product finish operation 240 is presented. This operation is preferably carried out in the product finish window. Product finish operation 240 preferably includes access product finish window step 241, select product finish condition step 242 and input product finish specifications step 244. How far the product is finished the product depends on the situation and the client's needs. As a possible alternative, the goods may be shipped as shelf-ready merchandise that can go straight to the retail floor. The client may also request temporary storage. In that case, the client is able to configure the price tag, barcode, etc. In a preferred embodiment, the client requests/indicates parameters not set down in the preceding windows a product supply final configuration window.

Figure 13:
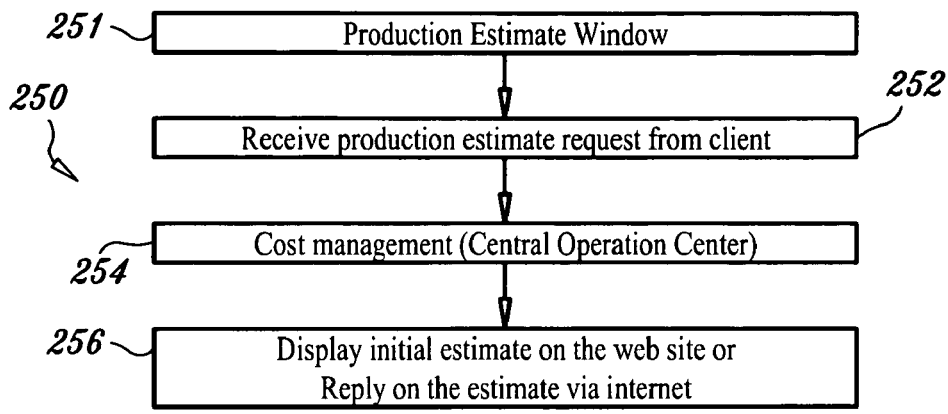
FIG. 13 is a schematic flow diagram for a preferred embodiment of a production estimate operation.

Referring to FIG. 13, a schematic flow diagram of a preferred embodiment of production estimate operation 250 is presented. This operation is preferably carried out in the production estimate window. Production estimate operation 250 preferably includes access production estimate window step 251, receive production estimate request step 252, review cost management options step 254 and produce estimate step 256. In this operation, a preliminary (initial) cost estimate, including a computation of customs tax, is provided to the client when the client fills in a prospective order form. The parameters to specify are preferably as follows: delivery/turnaround period, location to deliver to, quantity, material selection, size, quality, accessories, sewing method, number of cut patterns, shipment method, special instructions, etc.

Figure 14:
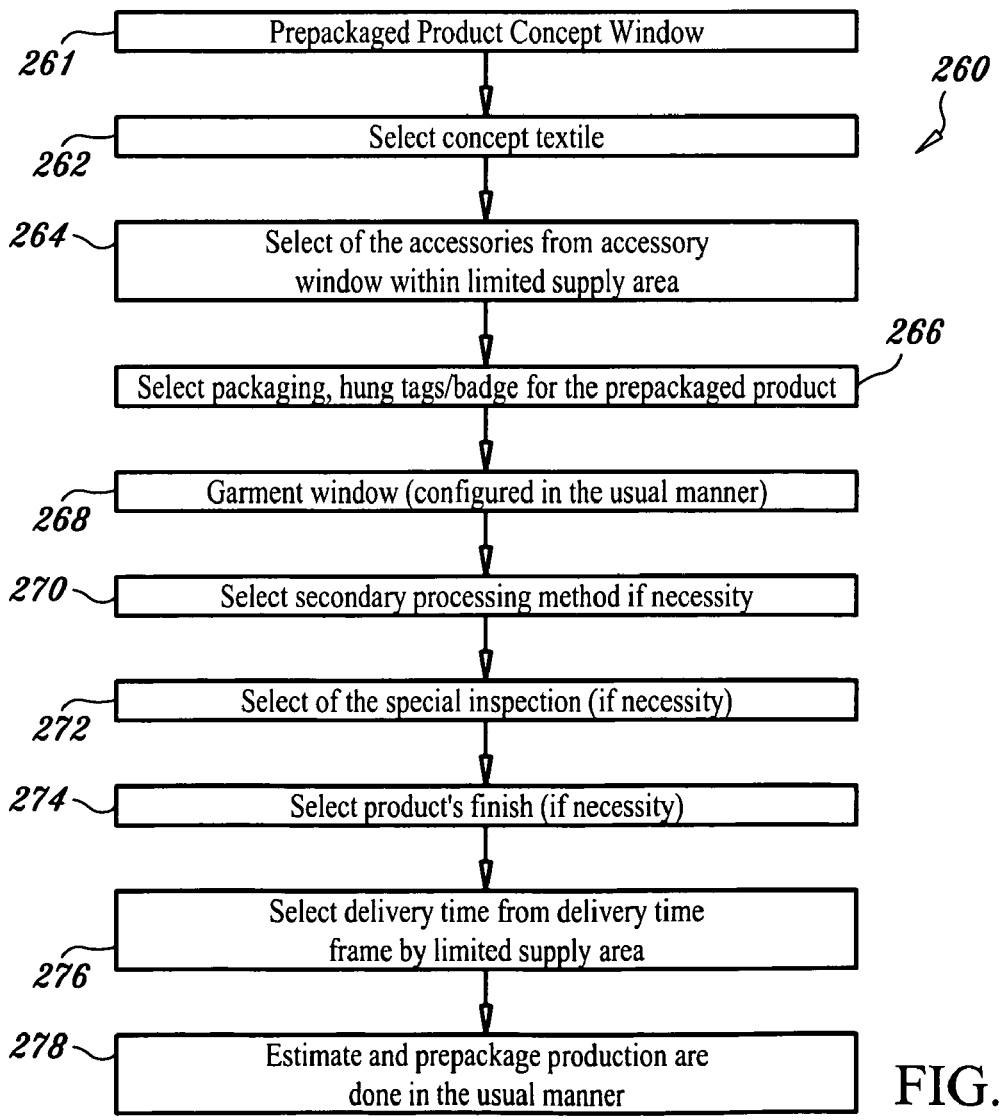
FIG. 14 is a schematic flow diagram for a preferred embodiment of a prepackaged product concept operation.

Referring to FIG. 14, a schematic flow diagram of a preferred embodiment of prepackaged product concept operation 260 is presented. This operation is preferably carried out in the prepackaged product concept window. Prepackaged product concept operation 260 preferably includes access prepackaged product concept window step 261, select concept textile step 262, select accessories step 264, select packaging and hang tag/badge step 266, access garment window step 268, select secondary processing method step 270, select special inspection step 272, select product finish step 274, select delivery time step 276 and produce estimate step 278. This operation allows the client to choose a prepackaged deal for concept/execution of the merchandise. Delivery time frame, supply areas and raw materials are already set. Some options are left open so that the client can arrange the design in the client's own customized way, and these are configured in the usual manner.

Figure 15:
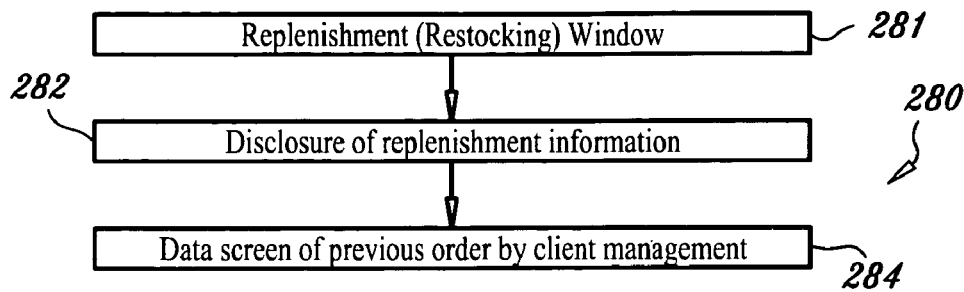
FIG. 15 is a schematic flow diagram for a preferred embodiment of a replenishment operation.

Referring to FIG. 15, a schematic flow diagram of a preferred embodiment of replenishment operation 280 is presented. This operation is preferably carried out in the replenishment (re-stocking) window. Replenishment operation 280 preferably includes access replenishment window step 281, enter client and production numbers step 282 and display replenishment information step 284. In this operation, when the client enters the client number and the production number, information regarding the replenishment of stock on that merchandise is displayed (e.g., lead time, stock, production capacity etc.).

Figure 16:
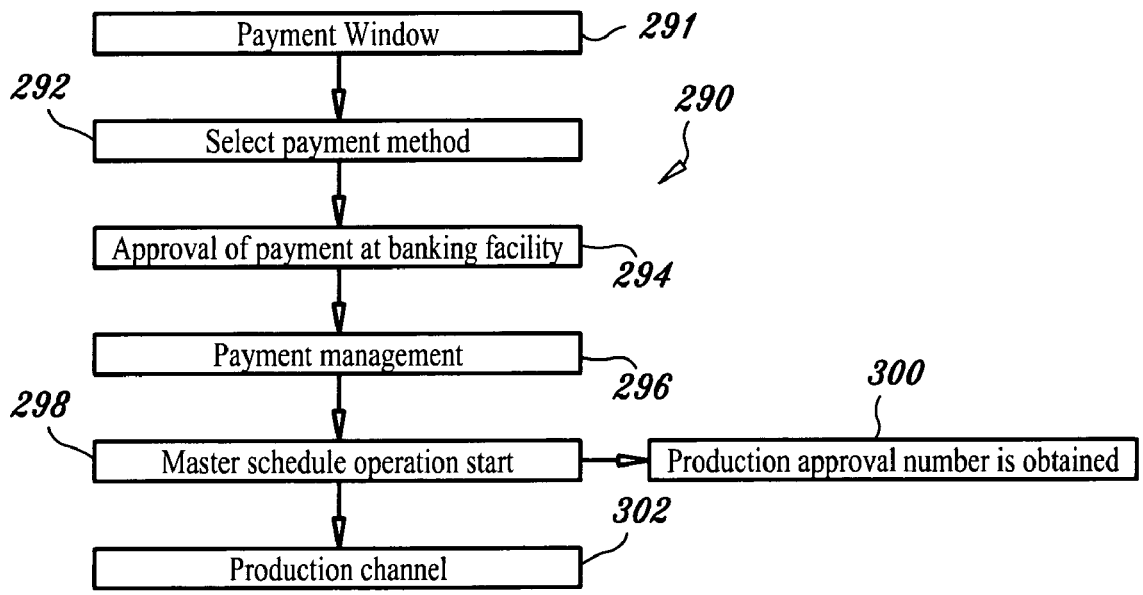
FIG. 16 is a schematic flow diagram for a preferred embodiment of a payment operation.

Referring to FIG. 16, a schematic flow diagram of a preferred embodiment of payment operation 290 is presented. This operation is preferably carried out in the payment window. Payment operation 290 preferably includes access payment window step 291, select payment method step 292, approve payment step 294, manage payment step 296, revise master schedule step 298, issue production number step 300 and inform production channel step 302. In this operation, the client selects the payment method, e.g., by credit card, direct bank deposit, etc. When payment is confirmed, the business operations are initiated. In a preferred embodiment, agreement documents are signed by client and the central operation center and changes in agreement clauses, e.g., cancellation clauses, changeover clauses, etc. must be approved in writing by both parties.

Figure 17:
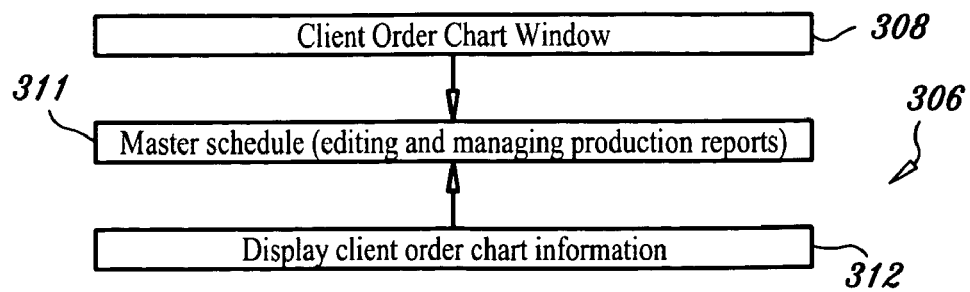
FIG. 17 is a schematic flow diagram for a preferred embodiment of a client order chart operation.

Referring to FIG. 17, a schematic flow diagram of a preferred embodiment of client order chart operation 306 is presented. This operation is preferably carried out in the client order chart window. Client order chart operation 310 preferably comprises access client order chart window step 308, enter client and production IDs step 311 and display (assembled) client order chart information step 312. Order status is preferably displayed in a client order chart window. When the client enters a client number and a production approval number, the client is able to retrieve and verify the order information on the production process online. The client order chart operation provides actual process information to the client.

Figure 18:
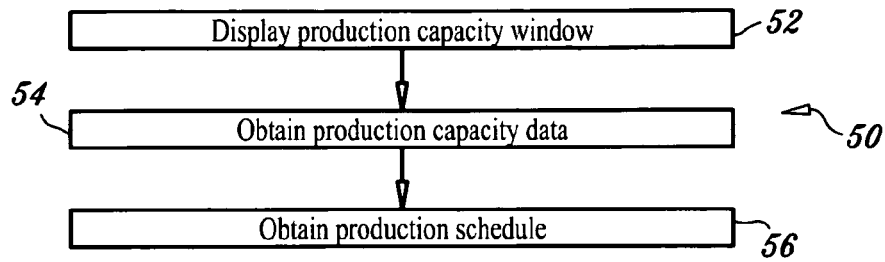
FIG. 18 is a schematic flow diagram for a preferred embodiment of a production capacity operation.

Referring to FIG. 18, the client can check on production capacity in the production capacity window in production capacity operation 50. This window displays production capacity information by production area or by product category (e.g., textiles, garments, accessories, secondary processes, hung tags/badges, hangers, packaging, etc.) and production channel blocks in display production capacity window step 52. The information is preferably updated on a weekly basis in obtain production capacity data step 54. Production schedule information is obtained in obtain production schedule step 56.

Figure 19:
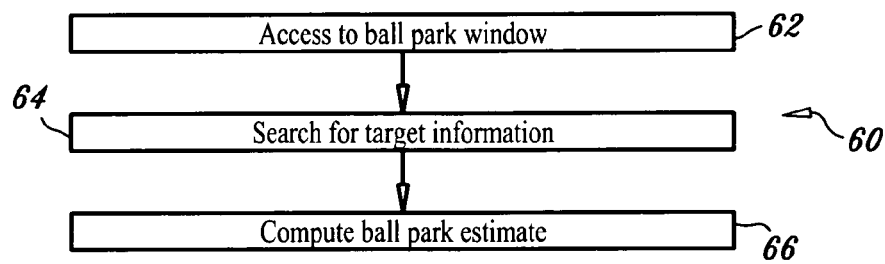
FIG. 19 is a schematic flow diagram for a preferred embodiment of a ball park figure operation.

Referring to FIG. 19, ballpark cost estimates are preferably displayed in a ballpark figure window which presents ballpark figures on the amount of material needed, weight for transport of product, customs taxation, etc., sorted/summarized by product category, size, etc. The steps of a preferred embodiment of ballpark estimate operation 60 include display ball park window step 62, search for target information step 64 and compute ball park estimate step 66. In the ballpark figure window, the client automatically receives a calculation on how many yards of cloth are needed for a planned product, approximately how many units will fit in a box, etc., based on the categories and sizes that the client has input. In providing approximate figures on weight, etc., the client is given a broad-viewed grasp of the situation and is spared the research time required to obtain such information. This reduces the risks and waste associated with making later changes.

Figure 20:
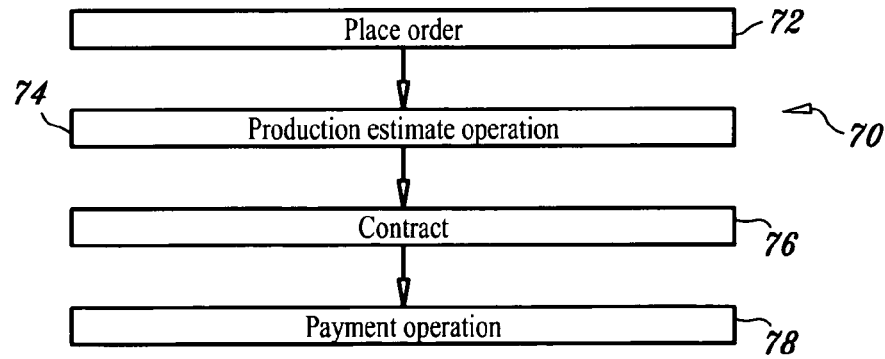
FIG. 20 is a schematic flow diagram for a preferred embodiment of a place order operation.

Referring to FIG. 20, after all the configurations are finished by the client, by clicking an approval button, the client preferably obtains an initial answer from central operation center 32 regarding the client's order, e.g., accepted/not accepted/adjustment in progress. When adjustments to the production channel side and the payment conditions are in working order, central operation center 32 gives the client the official production number. In a preferred embodiment, the steps of place order operation 70 include display place order window step 74, perform production estimate operation step 76, produce contract documents step 78 and perform payment operation step.

Figure 21:
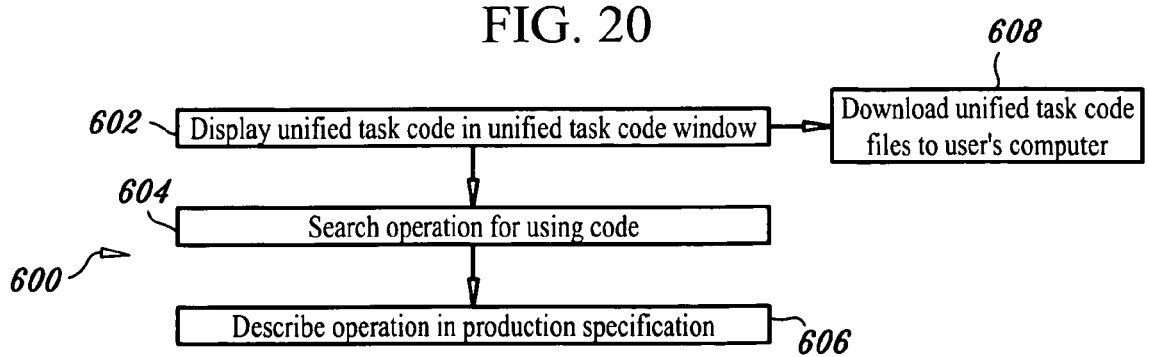
FIG. 21 is a schematic flow diagram for a preferred embodiment of a unified task order operation

Referring to FIG. 21, a preferred embodiment of unified task code operation 600 is presented. The unified task codes are written into a common unified file that is downloadable through the Internet to be shared by the parties involved. New information is updated into the common unified file each time the client uses system 10. A search function is preferably provided, so that information on a task code that a client is looking for can be searched based on categories, task, etc. In a preferred embodiment, the steps of unified task code operation 600 include display unified task code window step 602, search unified task code database step 604, present description of coded task step 606 and download unified task codes step 608.

Figure 22:
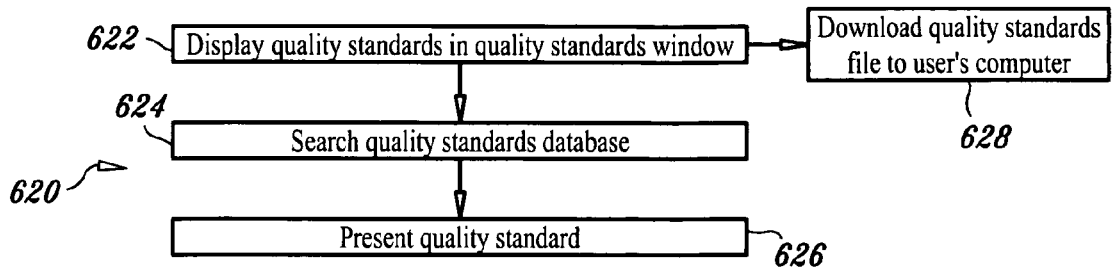
FIG. 22 is a schematic flow diagram for a preferred embodiment of a quality standards operation.

Referring to FIG. 22, the steps of a preferred embodiment of quality standards operation 620 are presented. In this embodiment, the steps include display quality standards window step 622, search quality standards database step 624, present quality standard step 626 and download quality standards step 628. Quality standards preferably address such quality aspects as sewing methods, materials, cuts, durability, prints, dyes, weaves, colors, product total condition, etc. Each quality standard is subject to variation, in compliance with the laws and regulations of the country of the client being served.

Figure 23:
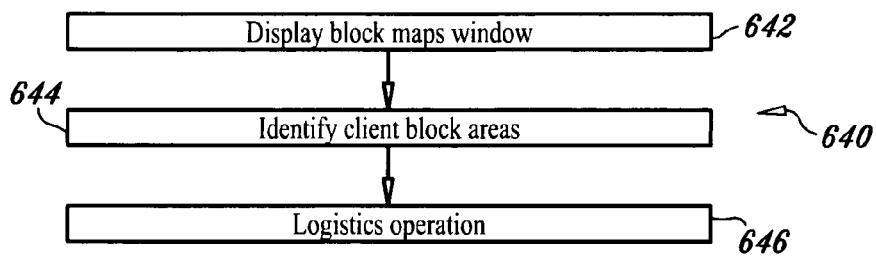
FIG. 23 is a schematic flow diagram for a preferred embodiment of a block map operation.

Referring to FIG. 23, the steps of a preferred embodiment of block map operation 640 are presented. In this embodiment, the steps include display block maps window step 642, identify client block areas step 644 and perform logistics operation step 646. Area block maps are preferably displayed in an area block window. Area maps show clients the regional blocks for the production channel and the market channel. This information is dispatched from the central operation center 32. Center 32 issues operational instructions to each channel based on verified orders and present capacity.

Figure 24:
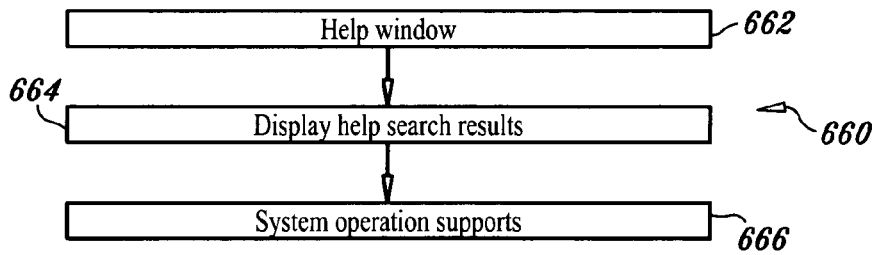
FIG. 24 is a schematic flow diagram for a preferred embodiment of a help operation.

In a preferred embodiment, front end 30 includes help operation 660. Referring to FIG. 24, the steps of a preferred embodiment of help operation 660 include display help window 662, display help search results 664 and display help contents step 666. The help window displays supplemental explanatory material on each of the other windows.

Figure 25:
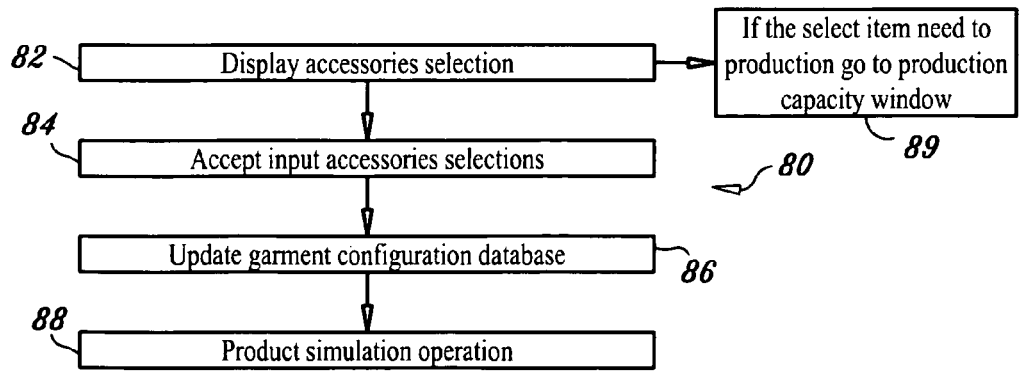
FIG. 25 is a schematic flow diagram for a preferred embodiment of a accessories selection operation.

Referring to FIG. 25, the steps of a preferred embodiment of accessories selection operation 80 are presented. These steps include display accessories selection window step 82, accept input of accessories selections step 84, update garment configuration database step 86, update garment accessories simulation step 88 and go to accessories production capacity window step 89. In a preferred embodiment, accessories (e.g., buttons, zippers, threads, etc.) are selected in the accessories selection window. In this operation, the client selects materials, quality, design, color and size, and obtains stock lead-time new products information. The window displays production capacity information by production area or by product category and production channel blocks. It is preferably updated weekly. Accessories may also be selected by category, product number, size, color, etc. A search function preferably provided, so that information on an accessory that the client is looking for can be searched based on motif, material, etc.

Figure 26:
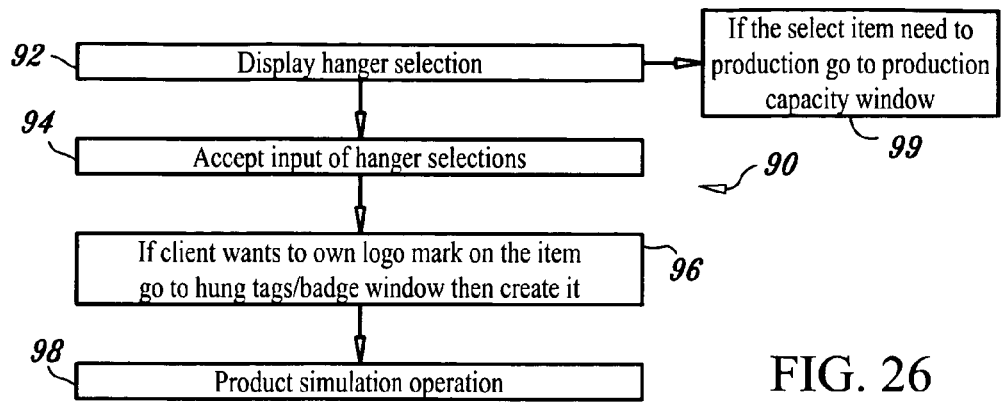
FIG. 26 is a schematic flow diagram for a preferred embodiment of a hanger selection operation.

Referring to FIG. 26, the steps of a preferred embodiment of hanger selection operation 90 are presented. These steps include display hanger selection window step 92, accept input of hanger selections step 94, create logo mark step 96, update garment hanger simulation step 98 and go to hanger production capacity window step 99.

Figure 27:
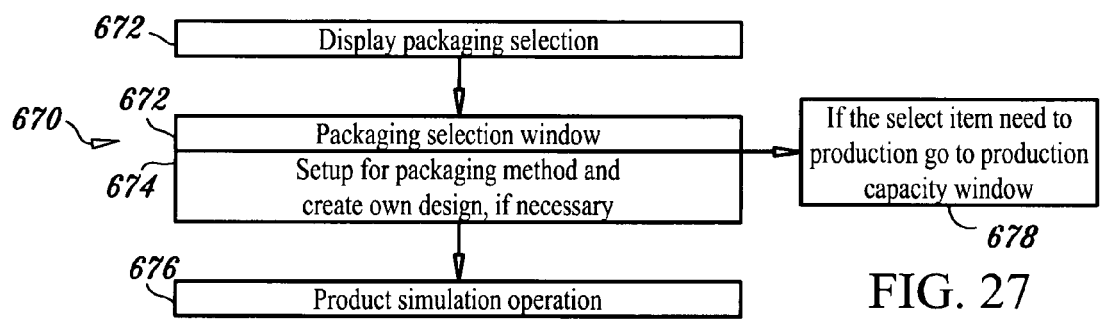
FIG. 27 is a schematic flow diagram for a preferred embodiment of a packaging selection operation.

Referring to FIG. 27, a schematic diagram illustrating the steps of a preferred embodiment of packaging selection operation 670 is presented. In this embodiment the steps include display packaging selection window step 672, select or create packaging step 674, update garment packaging simulation step 676 and go to packaging production capacity window step 678. In a preferred embodiment, packaging for the garment is selected in a packaging selection window. In this operation, the client makes detailed selections of the wrapping material, quality, the prints on the wrapping, accessory items, sizes, colors, etc.

Figure 28:
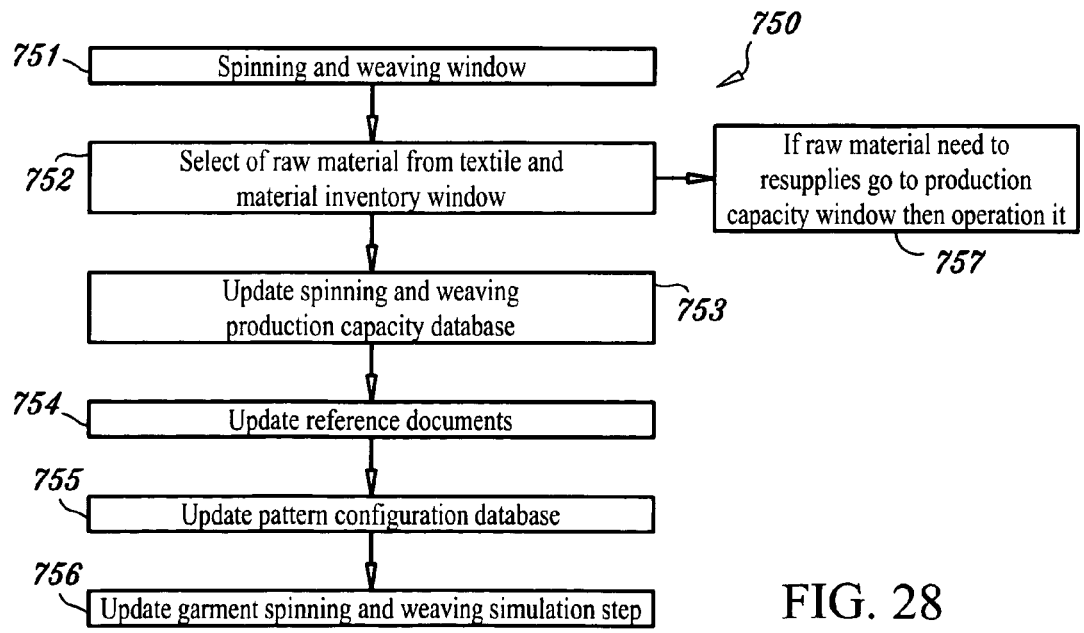
FIG. 28 is a schematic flow diagram for a preferred embodiment of a spinning and weaving operation.
Figure 29A:
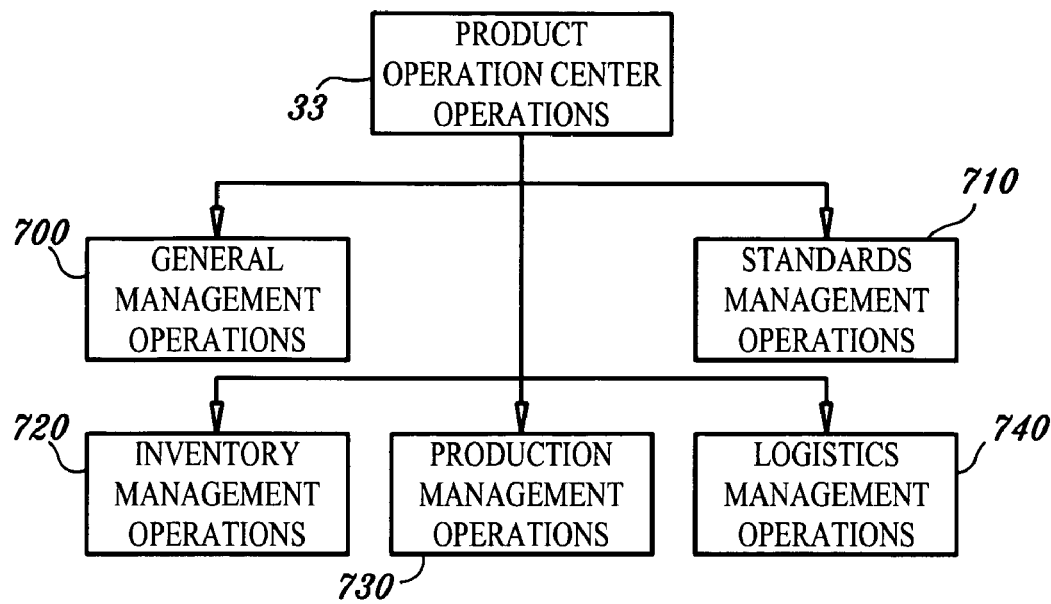
FIG. 29A is a schematic block diagram illustrating central operation center operations of a preferred embodiment of the invention.
Figure 29B:
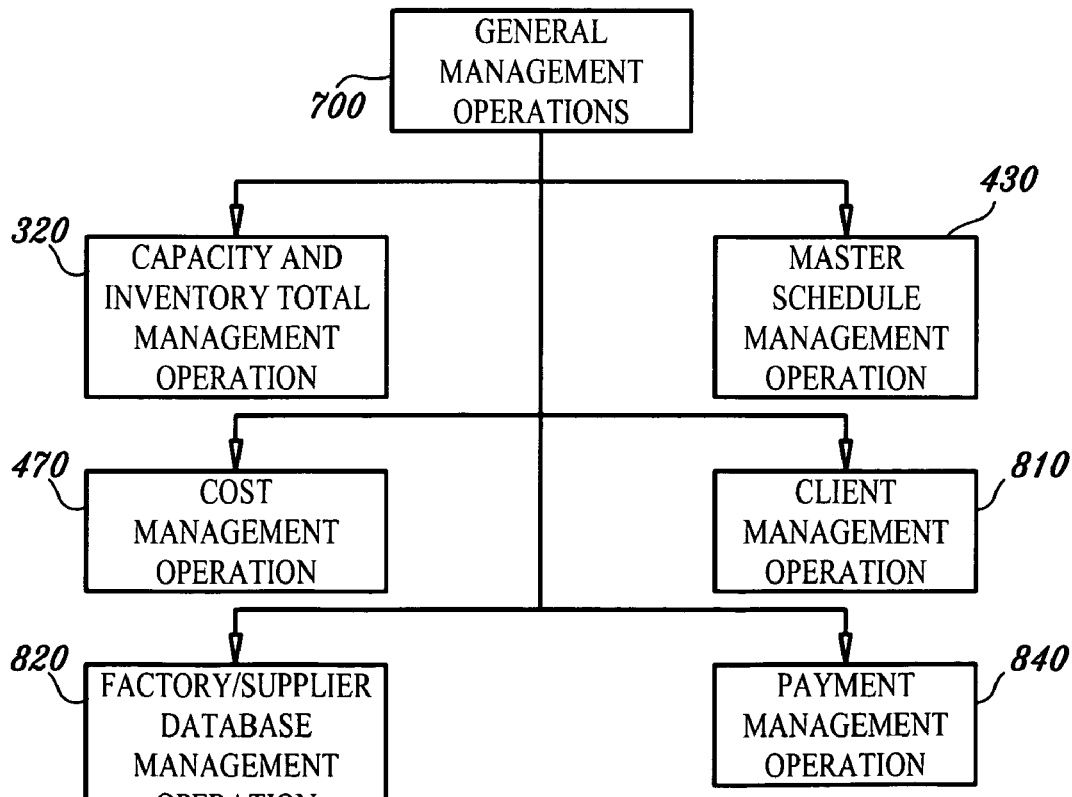
FIG. 29B is a schematic block diagram illustrating general management operations of a preferred embodiment of the invention.
Figure 29C:
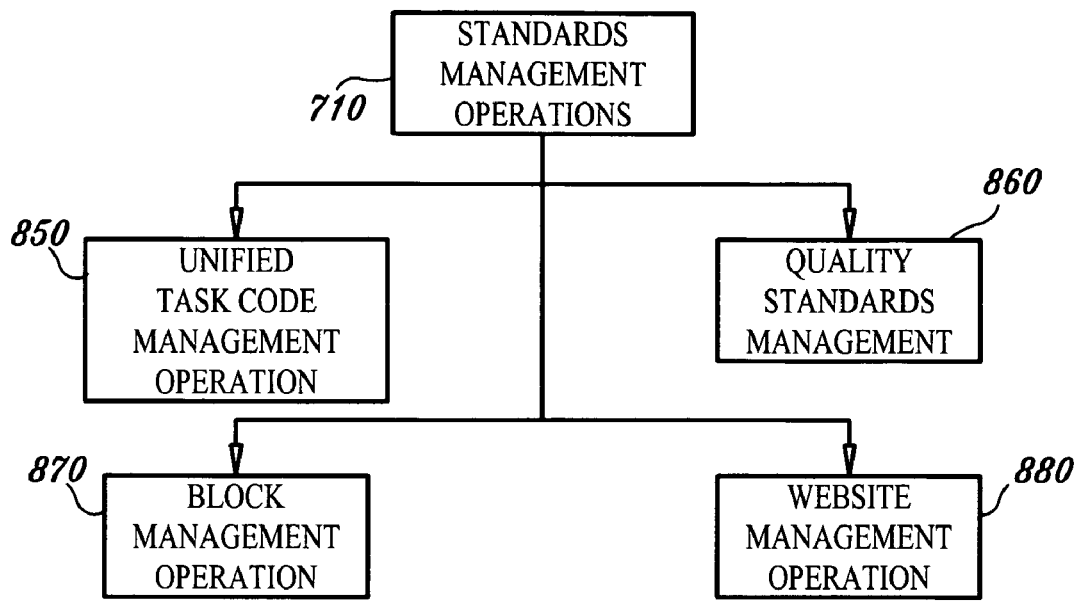
FIG. 29C is a schematic block diagram illustrating standards management operations of a preferred embodiment of the invention.
Figure 29D:
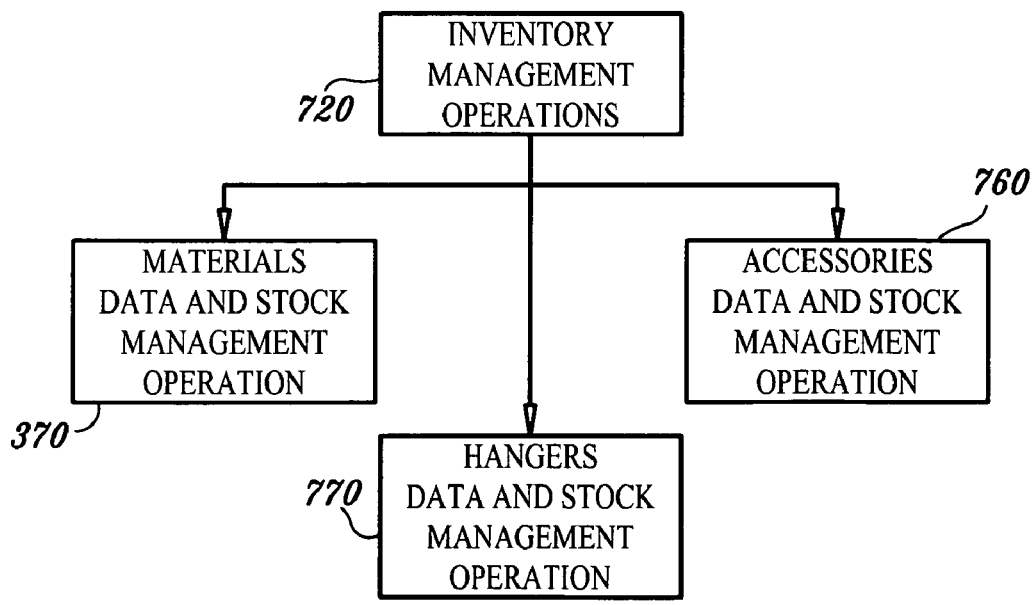
FIG. 29D is a schematic block diagram illustrating inventory management operations of a preferred embodiment of the invention.
Figure 29E:
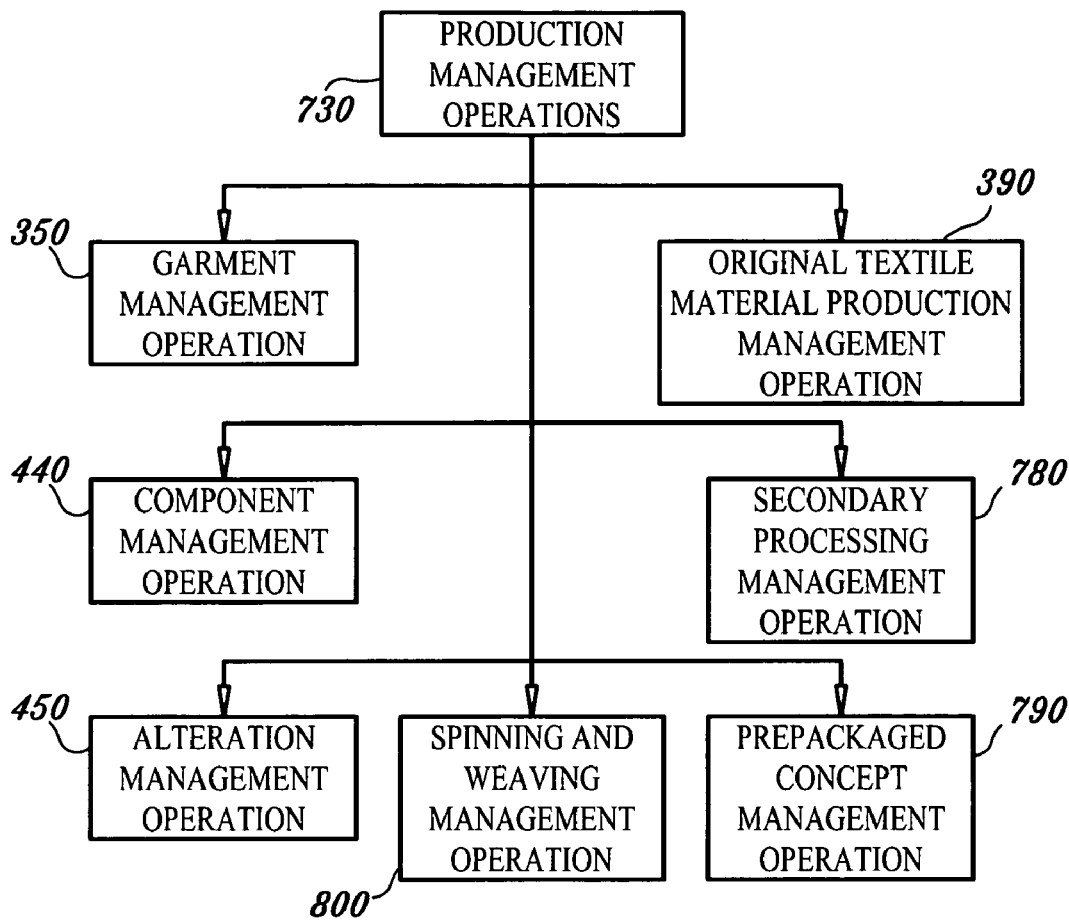
FIG. 29E is a schematic block diagram illustrating production management operations of a preferred embodiment of the invention.
Figure 29F:
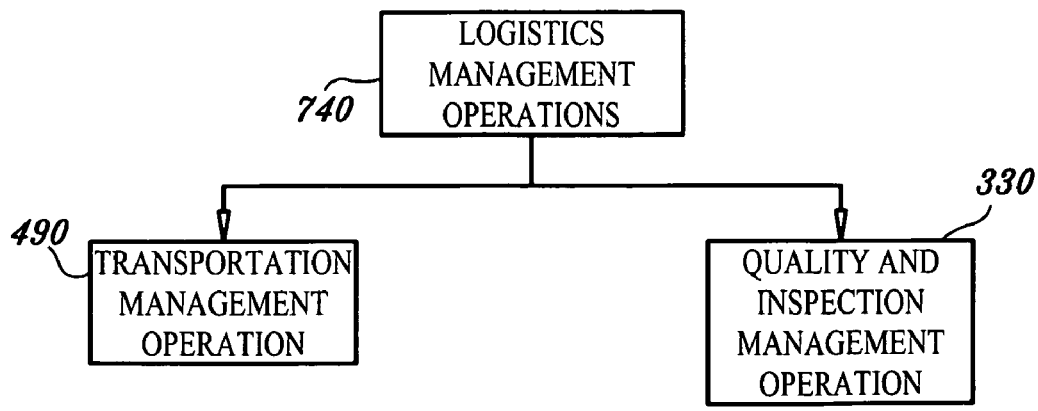
FIG. 29F is a schematic block diagram illustrating logistics management operations of a preferred embodiment of the invention.

Referring to FIG. 28, a schematic diagram illustrating the steps of a preferred embodiment of spinning and weaving operation 750 is presented. In this embodiment, the steps include display spinning and weaving window step 751, select raw material step 752, update spinning and weaving production capacity database step 753, update reference documents step 754, update pattern configuration database step 755, update garment spinning and weaving simulation step 756 and update raw material supplies capacity window step 757. This window is meant to allow the client to indicate how he wishes raw material (fabric, knit, etc.) to be manufactured into merchandise. Details such as selecting weaving construction of the thread (method of dye—before/after, double dying) are input. The client selects the raw materials on display, selecting a customized description of the process of manufacture, which covers such aspects as deciding on a size for the material, spinning process, balance, image size (e.g., in pixels), dying process, weaving structure surface, construction of the thread structure surface texture, method of finishing the outer skirts of the fabric, secondary processes, etc. The client may input instructions for how threads are to be knitted and system 10 will display a virtual 2D image of the resulting product. The angle, the warp, and the woof can be also specified.

Central operation center operations 33, that is, those directed by central operation center 32, are illustrated in FIGS. 29A-29F. Central operation center operations 33 include general management operations 700, standards management operations 710, inventory management operations 720, production management operations 730 and logistics management operations 740. General management operations 700 include capacity and inventory total management operation 320, master schedule management operation 430, cost management operation 470, client management operation 810, factory/supplier database management operation 820 and payment management operation 840. Standards management operations 710 include unified task code management operation 850, quality standards management 860, block management operation 870 and website management operation 880. Inventory management operations 720 include materials data and stock management operation 370, accessories data and stock management operation 760 and hangers data and stock management operation 770. Production management operations 730 include garment management operation 350, original textile material production management operation 390, component management operation 410, secondary processing management operation 780, alteration management operation 450, prepackaged concept management operation 790 and spinning and weaving management operation 800. Logistics management operations 740 include transportation management operation 490 and quality and inspection management operation 330. The individual operations that are implemented by central operation center 32 of system 10 are illustrated in FIGS. 30-51.

The central operation center is responsible for establishing standards for quality and for defining unified task codes and for performing each management operation. It must also ensure that the marketing channel, the central operation center and the production channel have a unified understanding of these concepts.

Figure 30:
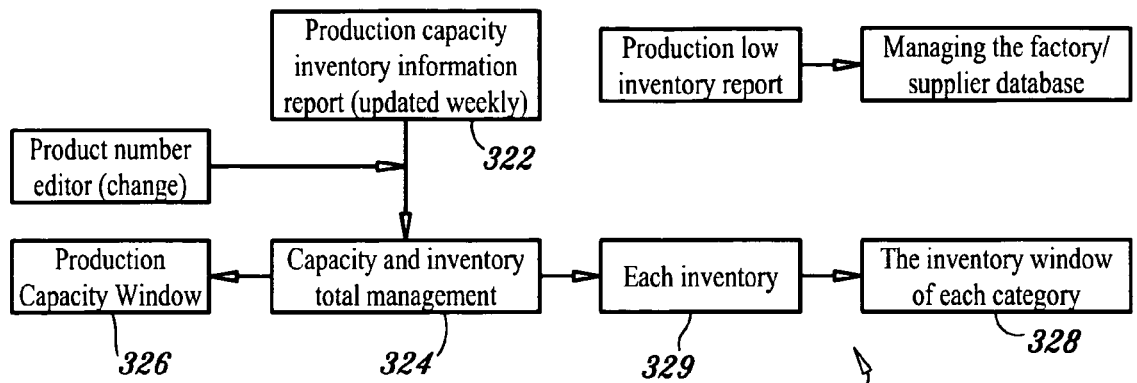
FIG. 30 is a schematic flow diagram for a preferred embodiment of a production capacity management operation.

Referring to FIG. 30, a schematic flow diagram of a preferred embodiment of capacity and inventory total management operation 320 is presented. The result of this operation is preferably displayed in the production capacity management window for review by the operator of system 10. Production capacity management operation 320 preferably includes receive production capacity information step 322, compute production capacity step 324, display production capacity window step 326, determine category production capacity step 328, revise inventory windows step 329. This operation preferably results in the data for each component category in the production capacity window being updated on a weekly basis. It provides information management for decision-making on the feasibility of filling orders, based on such data as production capacity, lead-time, stock information, etc. that is received from the production channel. System 10 automatically computes production capacity, determines which area blocks to assign it to and determines stock quantities. Such statistical information is displayed in front-end windows, by category. A production low inventory report is prepared that comprises an inventory status report on material and fabric to be used by each factory/supplier (e.g., material, dyestuff, thread, etc.) whose stock is running low.

Figure 31:
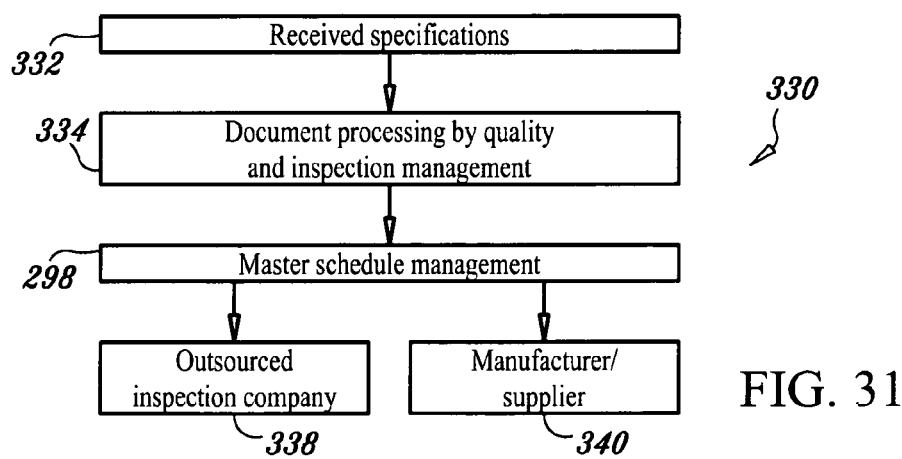
FIG. 31 is a schematic flow diagram for a preferred embodiment of a quality and inspection management operation.

Referring to FIG. 31, a schematic flow diagram of a preferred embodiment of quality and inspection management operation 330 is presented. The result of this operation is preferably displayed in the quality and inspection management window for review by the operator of system 10. Quality and inspection management operation 330 preferably includes receive specifications step 332, distribute quality and inspection information step 334, revise master schedule step 298, notify outsourced inspection company step 338 and notify manufacturer/supplier step 340. In this operation, production details from the front-end windows are sorted by category in the form of a specification and sent to back end 34 (for use by each manufacturer and supplier). This operation provides management of the specific tasks within the steps, such as task-delegation management (distribution of labor), production efficiency tracking, defect-prevention mechanisms (referencing past examples of incidents and foreseeable issues) (these data are reflected in factories/suppliers database 820) and quality and inspection certificate issues management.

Figure 32:
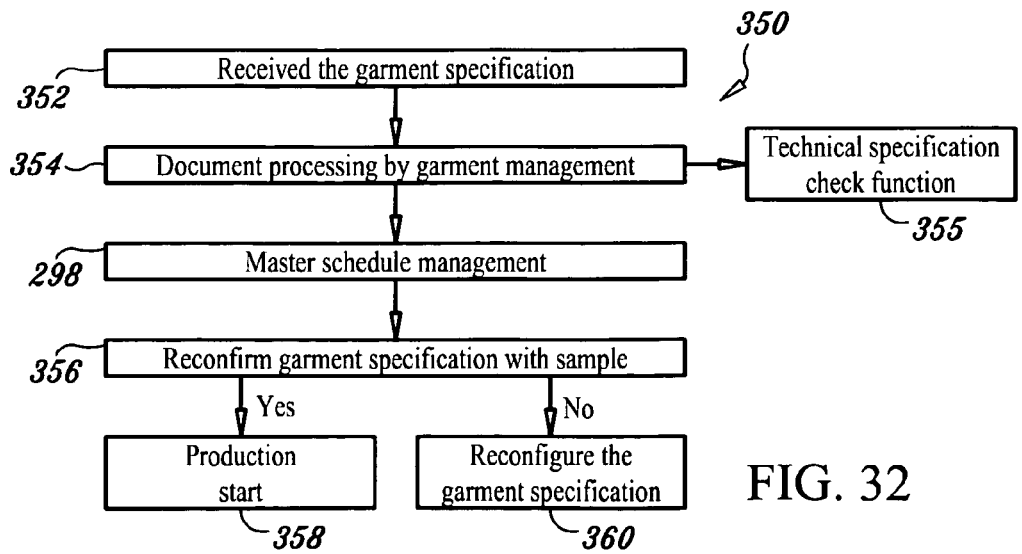
FIG. 32 is a schematic flow diagram for a preferred embodiment of a garment management operation.

Referring to FIG. 32, a schematic flow diagram of a preferred embodiment of garment management operation 350 is presented. The result of this operation is preferably displayed in the garment management window for review by the operator of system 10. Garment management operation 350 preferably includes receive garment specification step 352, process garment documents step 354, technical specification check step 355, revise master schedule step 298, reconfirm garment specification step 356, start garment production step 358 and reconfigure garment specification step 360. In a preferred embodiment, this operation manages the production and documents the process at the garment window (from material marking, cutting and sewing until the finished product is produced).

Figure 33:
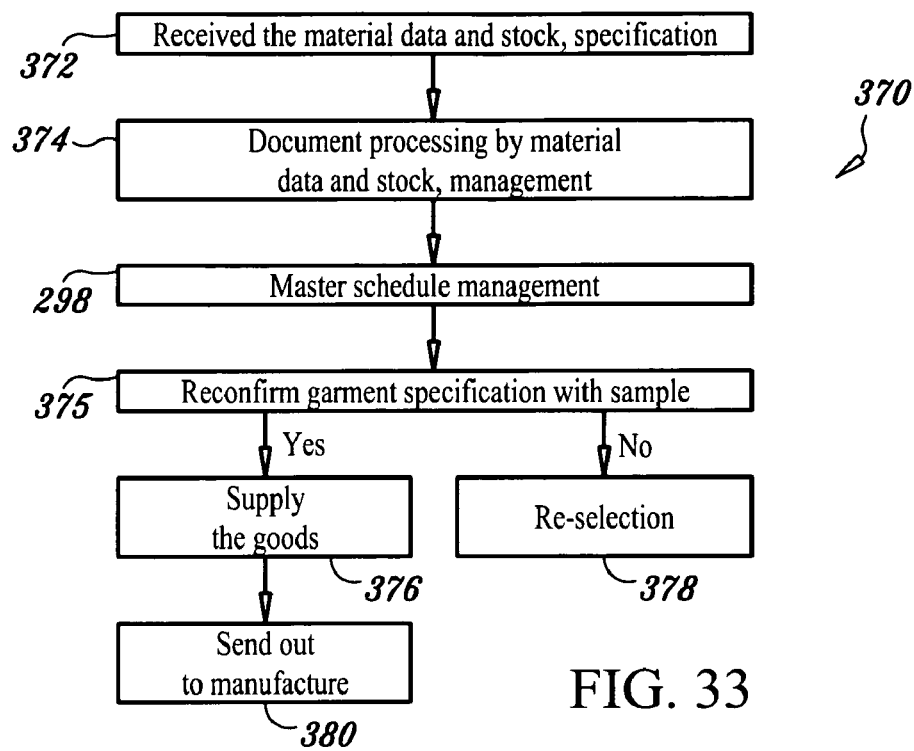
FIG. 33 is a schematic flow diagram for a preferred embodiment of a materials data and stock management operation.

Referring to FIG. 33, a schematic flow diagram of a preferred embodiment of materials data and stock management operation 370 is presented. The result of this operation is preferably displayed in the materials data and stock management window for review by the operator of system 10. Materials data and stock management operation 370 preferably includes receive order step 372, process other documents step 374, revise master schedule step 298, reconfirm other specifications step 375, supply goods step 376, reselect options step 378 and send to manufacturer step 380. This operation also allows multi-variable complex searches by factory, raw material, design, similar substitutes, resource procurement area, secondary processing, etc. The orders taken from the client are processed by the textiles data and stock, the task is assigned to the production channel. Textile information is disclosed in the textile material inventory window on the front-end. Also textile material report information from back-end 34 is transferred to this window.

Figure 34:
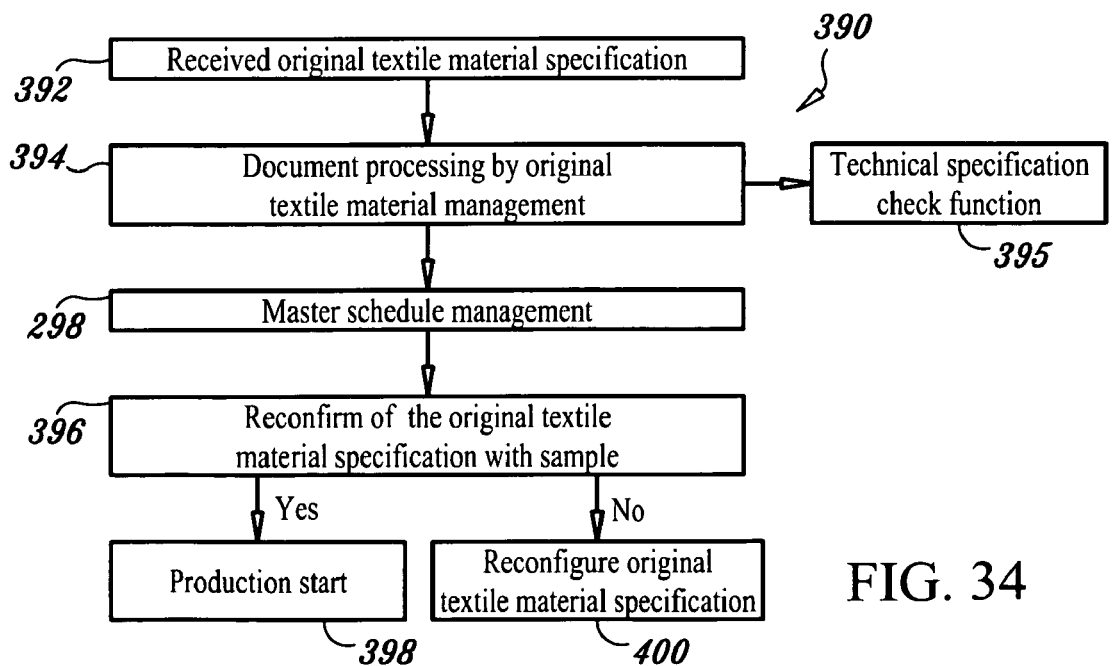
FIG. 34 is a schematic flow diagram for a preferred embodiment of an original textile material production management operation.

Referring to FIG. 34, a schematic flow diagram of a preferred embodiment of original textile material production management operation 390 is presented. The result of this operation is preferably displayed in the original textile material production management window for review by the operator of system 10. Original textile material production management operation 390 preferably includes receive original textile specification step 392, process original textile documents step 394, technical specification check step 395, revise master schedule step 298, reconfirm original textile specification step 396, start textile production step 398 and revise original textile specification step 400. After the specification defining such factors as design size, color, material, weave, composition, and quality is prepared, tasks are assigned to the textile material channel. After the specification is confirmed with sample, actual production of the original textile begins.

Figure 35:
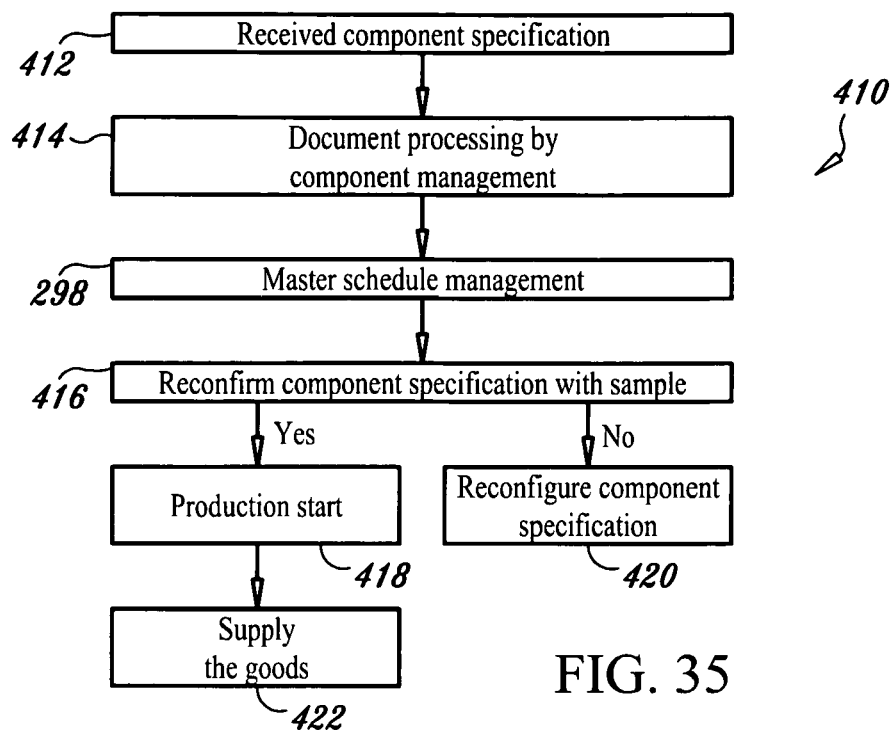
FIG. 35 is a schematic flow diagram for a preferred embodiment of a component management operation.

Referring to FIG. 35, a schematic flow diagram of a preferred embodiment of component (hung tag/badge, packaging) management operation 410 is presented. This same sequence of steps is involved in hung tag/badges management, and packaging management. The results of these operations are preferably displayed in the hung tag/badges management window and packaging management window for review by the operator of system 10. Component management operation 410 preferably includes receive component specification step 412, process component specification documents step 414, revise master schedule step 298, reconfirm component specification step 416, start production of component step 418, revise component specification step 420 and supply component step 422. In the component management operation, the operator of system 10 manages the component product suppliers. This operation allows multi-variable complex searches by factory, raw material, design, similar substitutes, resource procurement area, etc. The operation illustrated in FIG. 34 differs from the operation illustrated in FIG. 35 in that the operation of FIG. 34 preferably involves only the selection of materials, but the operation of FIG. 35 involves selection and input of specifications for materials (e.g., a hung tag/badge may be specified to include a certain brand name or logo, or a product explanation may be provided on the tag.)

Figure 36:
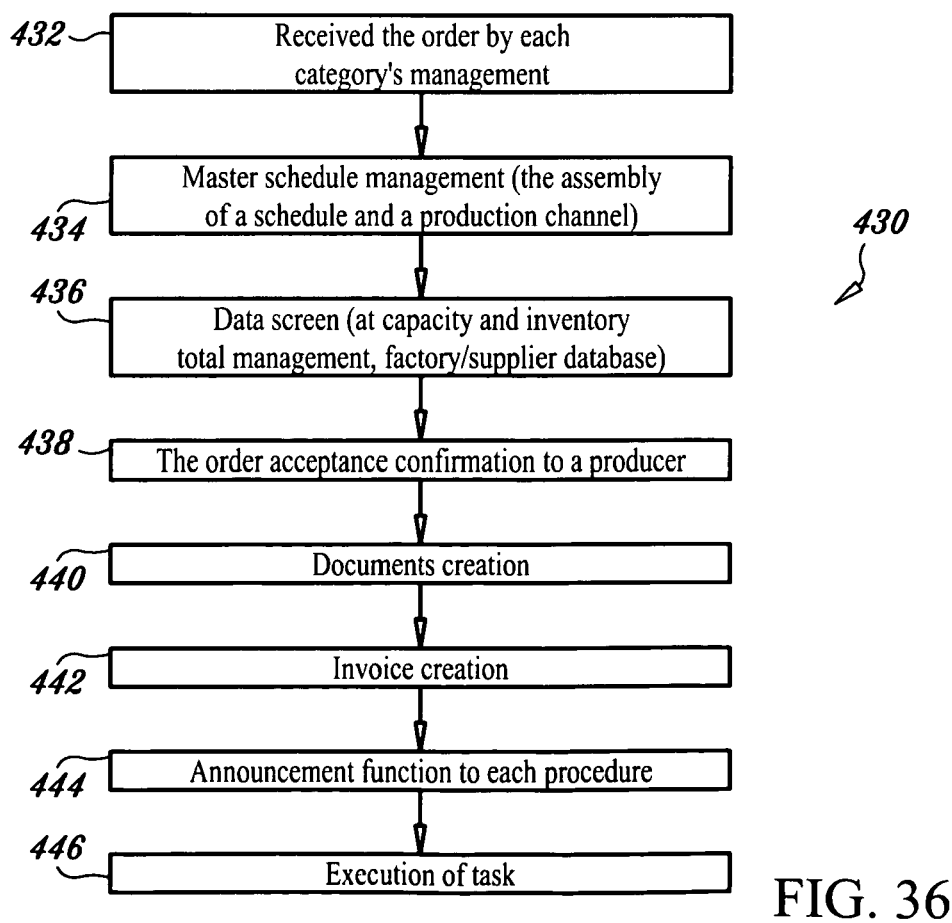
FIG. 36 is a schematic flow diagram for a preferred embodiment of a master schedule management operation.

Referring to FIG. 36, a schematic flow diagram of a preferred embodiment of master schedule management operation 430 is presented. The result of this operation is preferably displayed in the master schedule management window for review by the operator of system 10. Master schedule management operation 430 preferably includes receive order by category step 432, assemble schedule step 434, display data step 436, confirm order acceptance step 438, create documents step 440, create invoice step 442, announce function step 444 and execute task step 446. In the master schedule (material handling) management operation, a master schedule management list is maintained that incorporates everything from procurement of each raw material to the delivery of the product, managing the confirmation of the receipt of each of the accessory parts from the suppliers. The conditions are displayed on the specification form by each management window and are available to the client on the client order chart window as well as being provided to each production channel supplier. In a preferred embodiment, the system operator can verify the overall flow of production by viewing the master schedule management graph, because the progress/status reported by each production channel is reflected on this graph. The master schedule is revised after assignment of a production channel is finalized.

In a preferred embodiment, a variety of steps are involved in the master schedule (material handling) management operation. In display data step 436, for a particular order sent from the client, this window displays a matching list of potential manufacturers that are capable of accepting the job operation, based on the profiles in the production channel database. On the data screen, multivariate search by category, area block or skill can be performed. In step 444, a product number editor (change number) function is accomplished. If the product number displayed on a front-end window should for some reason be different from that used by the factory/supplier or the central operation center, production number editor (change number) functionality can be used to reassign the number, so that the front-end and back-end are in sync. In step 434, a schedule-structuring service function provides for structuring all production-related tasks into a project. In step 440, each production instruction document is displayed onscreen. Based on data from the client order chart, the system drafts sample production order letters, full production order letters, documents for procurement of parts, arrangement of transportation, supplying the products, etc., as are necessary in order to fill the order. In step 442, an invoice creation function involves confirming the substance of each business and issuing the invoices. In step 438, a confirm function involves confirmation that the order is finalized and an authorization to proceed can be given to the production channel listed on the data screen. In step 444, an announcement (time management) function is involved in reminding the production channel to execute particular tasks. The central operation center dispatches to each assigned person reminder notes to urge completion of the task and notes to double-check the contents. These dispatches are timed according to the scheduled dates.

For the client who wishes to monitor the status of an order, project status is viewable from the client order chart window in accordance with a preferred embodiment of client order chart operation 306. A time calculation function includes a time conversion function in which a time computation is made to adjust for regions with time-zone differences that must be accounted for when executing a schedule and a time calculation function in which computing an overall schedule for execution is accomplished, including determining lead-time, transport time, production time, inspection time, etc.

Figure 37:
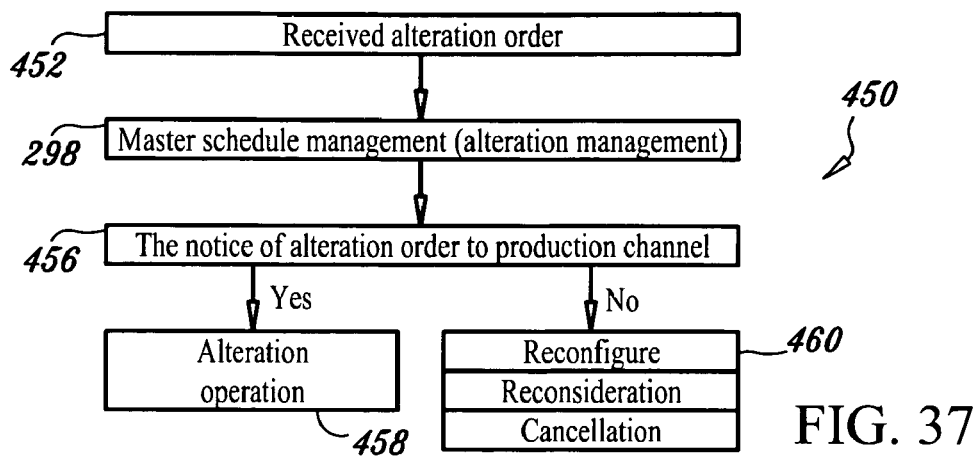
FIG. 37 is a schematic flow diagram for a preferred embodiment of an alteration management operation.

Referring to FIG. 37, a schematic flow diagram of a preferred embodiment of alteration management operation 450 is presented. The result of this operation is preferably displayed in the alteration management window for review by the operator of system 10. Alteration management operation 450 preferably includes receive alteration order step 452, revise master schedule step 298, notify production channel step 456, alter order step 458 and reconfigure/reconsider/cancel order step 460. In the alteration management operation, any alterations and changes are managed, such tracking the dates on which the alterations/changes were made, the substance of the changes, implementation date, assignment of alteration number and version, and assignments to the back-end.

Figure 38:
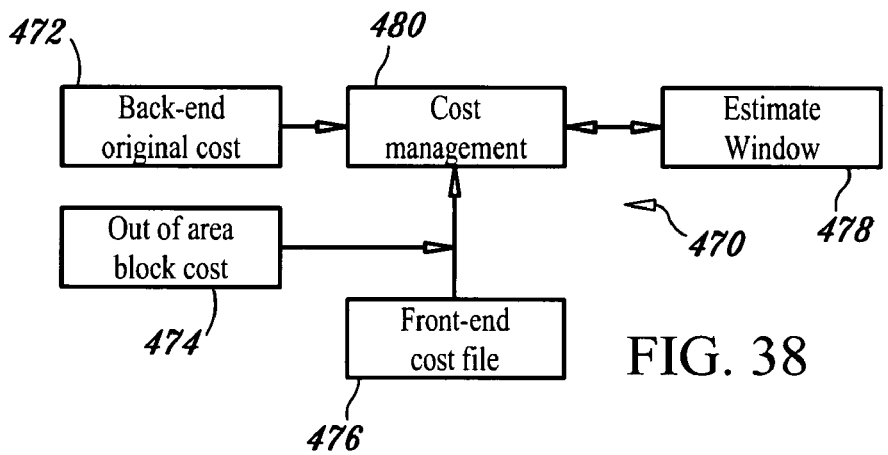
FIG. 38 is a schematic flow diagram for a preferred embodiment of a cost management operation.

Referring to FIG. 38, a schematic flow diagram of a preferred embodiment of cost management operation 470 is presented. The result of this operation is preferably displayed in the cost management window for review by the operator of system 10. Cost management operation 470 preferably includes review original costs step 472, develop out-of-block costs step 472, maintain front-end cost file step 476, estimate production cost step 478 and manage production cost step 480. The cost management operation accomplishes production-related cost-planning and bottom-line cost-management. Extra costs over the area block pricing are developed. Although each of the orders is priced by area block, other costs (price-quotes) are also set, according to client needs, quality standards and scheduling.

Figure 39:
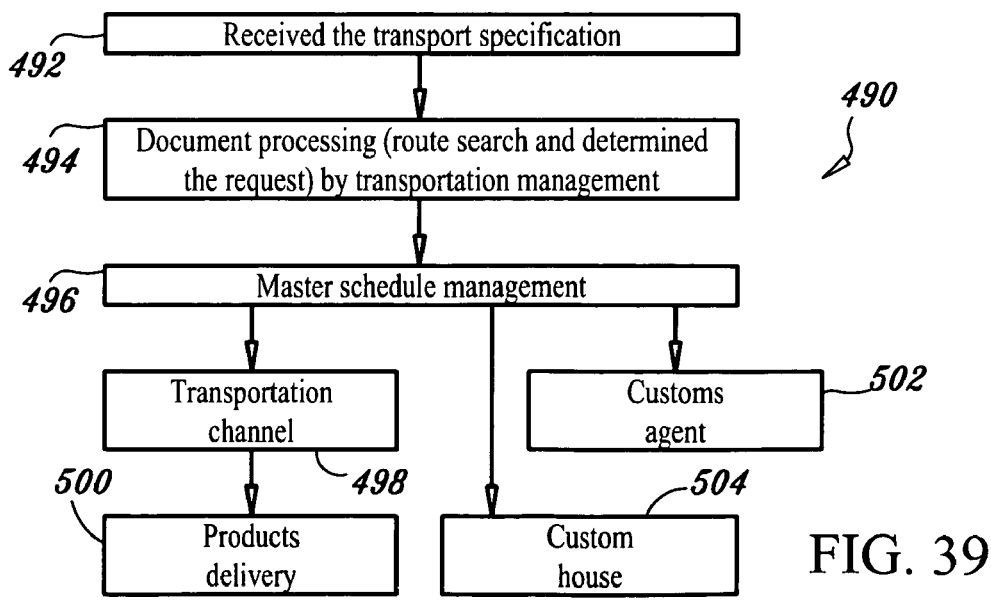
FIG. 39 is a schematic flow diagram for a preferred embodiment of a transportation management operation.

Referring to FIG. 39, a schematic flow diagram of a preferred embodiment of transportation management operation 490 is presented. The result of this operation is preferably displayed in the transportation management window for review by the operator of system 10. Transportation management operation 490 preferably includes receive transport specification step 492, determine route step 494, manage transportation schedule step 496, notify transport channel step 498, deliver product step 500, coordinate with customs agent step 502 and coordinate with custom house step 504. In a preferred embodiment, if the total merchandise value is over a certain value (e.g., $3,000) coordinate custom agent step 520 is performed, but if a smaller value is involved, step 504 is performed.

In transport management operation 490, management of routes and schedules for the transport of products is accomplished. Customs formalities are also processed by this operation. When the client's preferred route and dates are entered in a search function, a list of matches is displayed. After the details are determined, the master schedule is revised.

Figure 40:
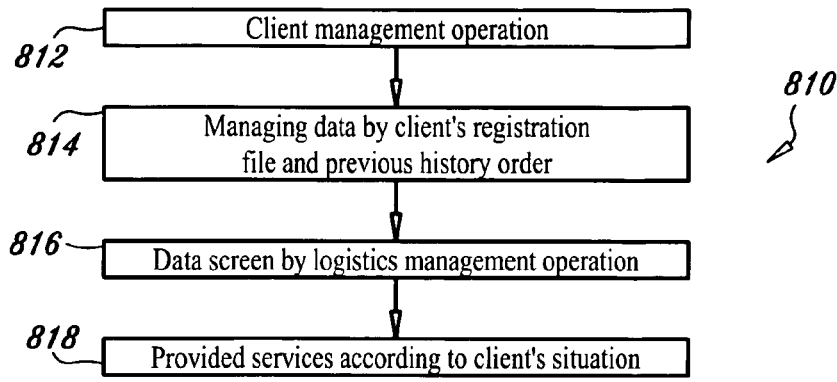
FIG. 40 is a schematic flow diagram for a preferred embodiment of a client management operation.

Referring to FIG. 40, a schematic diagram of a preferred embodiment of client management operation 810 is presented. In client management operation 810, after care is accomplished. In this embodiment, the steps of client management operation 810 include display client management window step 812, retrieve data for identified client step 814, present data for identified client step 816 and provide service to identified client step 818. After the goods are delivered, the system operator checks with the client to determine if the client is satisfied with the products produced for the client. If something is missing from a product or if a product is defective in some way, the production channel is dealt with immediately and required to take remedial action. Client data are also maintained in this operation. Such data may include location, business structure, assignees (assigned personnel in charge), product cycle, product categories, client taste, previous order, etc.

Figure 41:
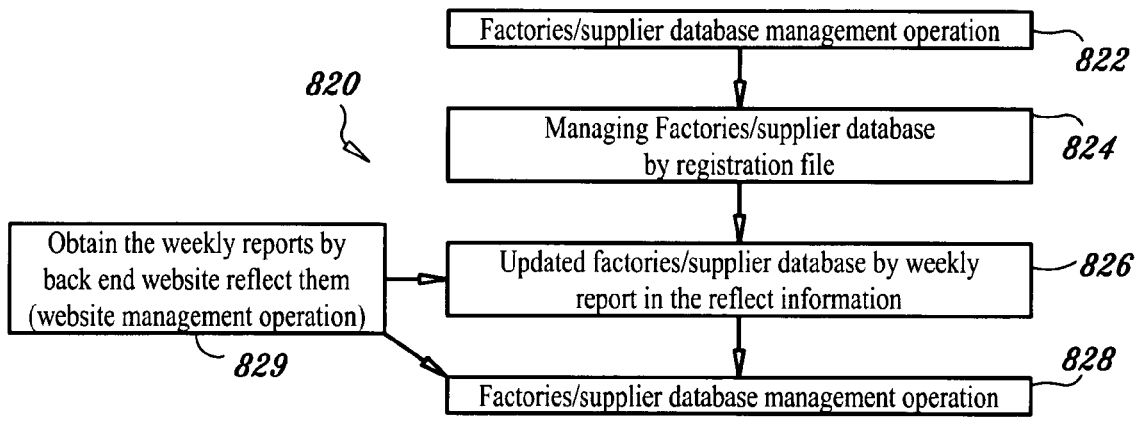
FIG. 41 is a schematic flow diagram for a preferred embodiment of a factory/supplier database management operation.

Referring to FIG. 41, a schematic flow diagram of a preferred embodiment of factory/supplier database management operation 820 is presented. The result of this operation is preferably displayed in the factory/supplier database management window for review by the operator of system 10. Factories/supplier database management operation 820 preferably includes display factory/supplier database management window step 822, display factory/suppler data by client step 824, update factory/supplier data step 826, update production capacity operation 828 and produce weekly factory/supplier reports 829.

Figure 42A:
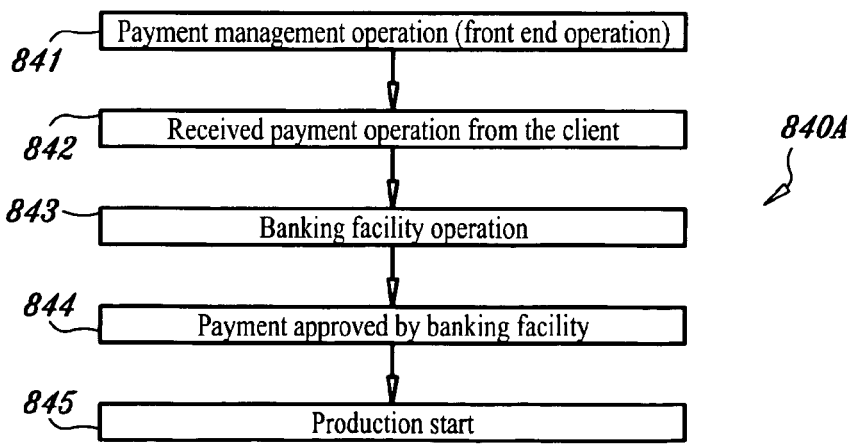
FIGS. 42A and 42B are schematic flow diagrams for preferred embodiment of a payment management operation.

Referring to FIG. 42A, a schematic flow diagram of a preferred embodiment of front end payment management operation 840A is presented. The result of this operation is preferably displayed in the front end payment management window for review by the operator of system 10. Front end payment management operation 840A preferably includes display front end payment management window step 841, confirm receipt of payment data from client 842, communicate payment data to bank step 843, receive payment approval from bank step 844 and release purchase order step 845.

Figure 42B:
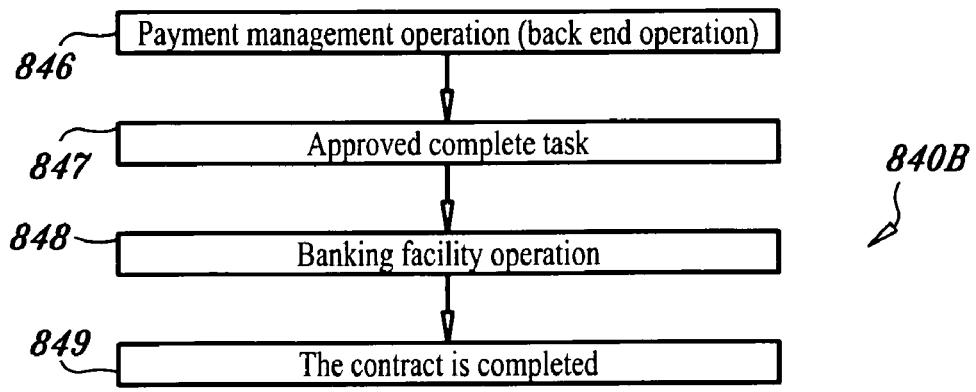

Referring to FIG. 42B, a schematic flow diagram of a preferred embodiment of back end payment management operation 840B is presented. The result of this operation is preferably displayed in the back end payment management window for review by the operator of system 10. Back end payment management operation 840B preferably includes display back end payment management window 846, receive client approval step 847, notify bank of client approval step 848 and flag contract as completed step 849.

Figure 43:
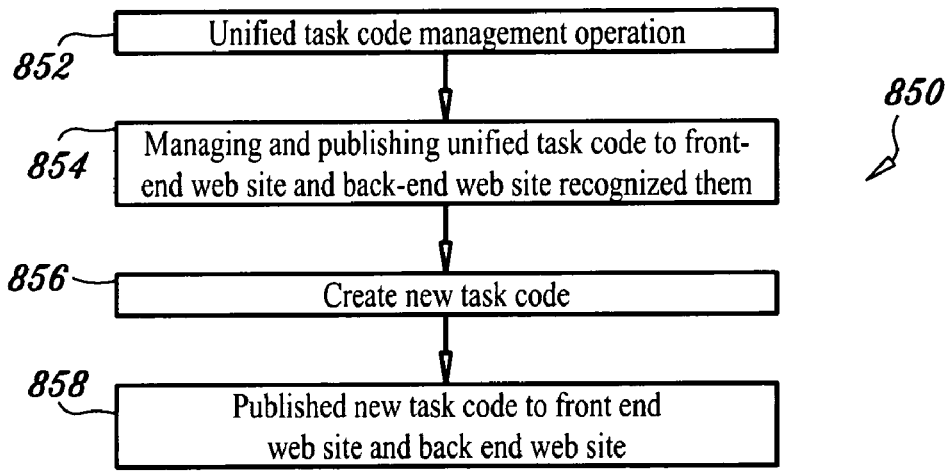
FIG. 43 is a schematic flow diagram for a preferred embodiment of a) unified task code management operation.

Referring to FIG. 43, a schematic flow diagram of a preferred embodiment of unified task code management operation 850 is presented. The result of this operation is preferably displayed in the unified task code management window for review by the operator of system 10. Unified task code management operation 850 preferably includes display unified task code management window step 852, publish unified task codes step 854, create new task code step 856 and update unified task codes step 858. This operation allows multivariable complex searches by categories, task, etc.

Figure 44:
FIG. 44 is a schematic flow diagram for a preferred embodiment of a quality standards management operation.

Referring to FIG. 44, a schematic flow diagram of a preferred embodiment of quality standards management operation 860 is presented. The result of this operation is preferably displayed in the quality standards management window for review by the operator of system 10. Quality standards management operation 860 preferably includes display quality standards management window step 862, publish quality standards step 864, create new quality standards step 865 and update quality standards step 866.

Figure 45:
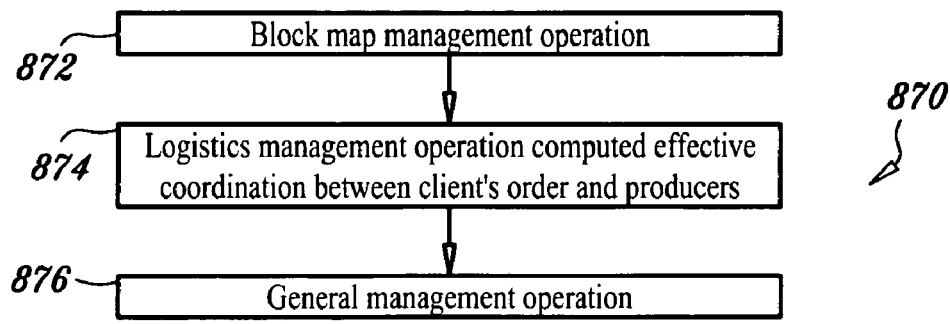
FIG. 45 is a schematic flow diagram for a preferred embodiment of a block management operation.

Referring to FIG. 45, a schematic flow diagram of a preferred embodiment of block map management operation 870 is presented. The result of this operation is preferably displayed in the block map management window for review by the operator of system 10. Block map management operation 870 preferably includes display block area management window step 872, optimize block area maps for client base step 874 and publish block area maps step 876.

Figure 46A:
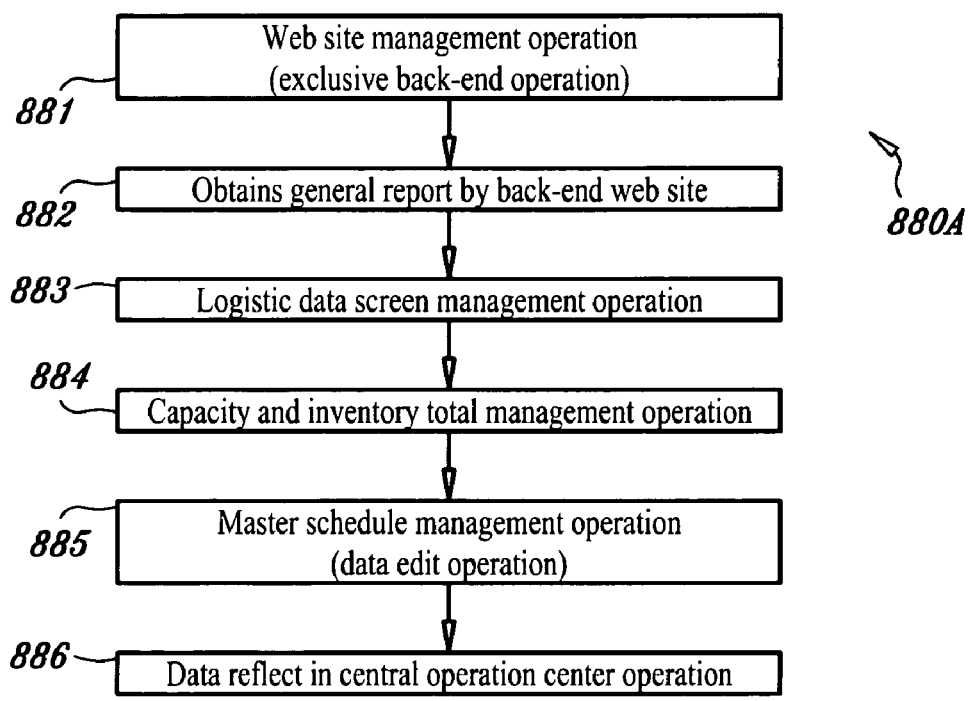
FIGS. 46A and 46B are schematic flow diagrams for preferred embodiments of a website management operation.

Referring to FIG. 46A, a schematic flow diagram of a preferred embodiment of back end website management operation 880A is presented. The result of this operation is preferably displayed in the back end website management window for review by the operator of system 10. Back end website management operation 880A preferably includes display back end website management window step 881, display overall status of back end web pages step 882, maintain logistics management operation web pages step 883, maintain capacity and inventory management web pages step 884, maintain master schedule web pages step 885 and maintain central operations center web pages step 886.

Figure 46B:
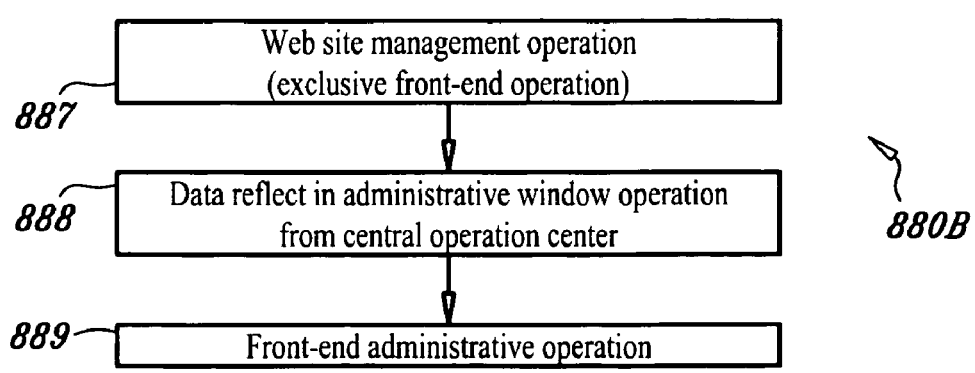

Referring to FIG. 46B, a schematic flow diagram of a preferred embodiment of front end website management operation 880B is presented. The result of this operation is preferably displayed in the front end website management window for review by the operator of system 10. Front end website management operation 880B preferably includes display front end website management window step 887, maintain administrative data web pages step 888, and display overall status of front end web pages step 889.

Figure 47:
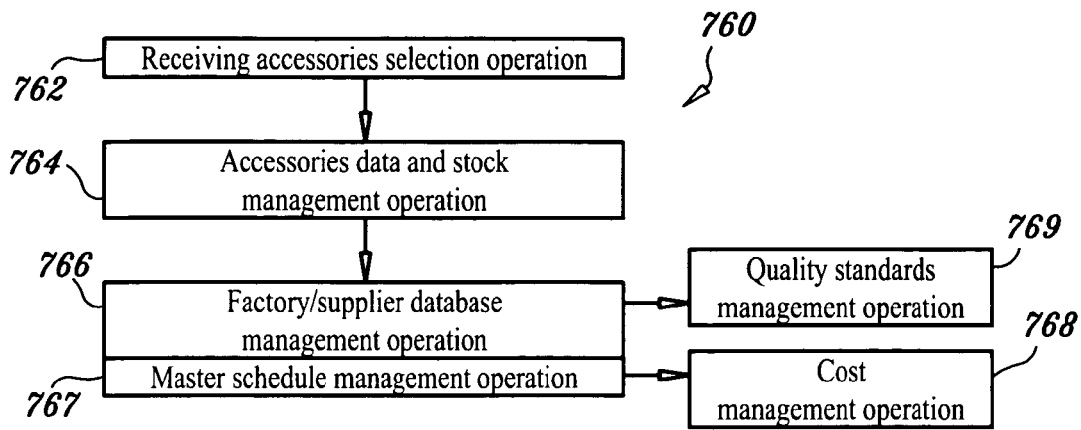
FIG. 47 is a schematic flow diagram for a preferred embodiment of an accessories data and stock management operation.

Referring to FIG. 47, a schematic flow diagram of a preferred embodiment of accessories data and stock management operation 760 is presented. The result of this operation is preferably displayed in the accessories data and stock management window for review by the operator of system 10. Accessories data and stock management operation 760 preferably includes display accessories data and stock management window step 762, display accessories data step 764, query accessories factory/supplier database step 766, update accessories master schedule operation step 767, update accessories cost management operation step 768, and update quality standards operation step 769. This operation allows multi-variable complex searches by factory, raw material, design, similar substitutes, resource procurement area, etc.

Figure 48:
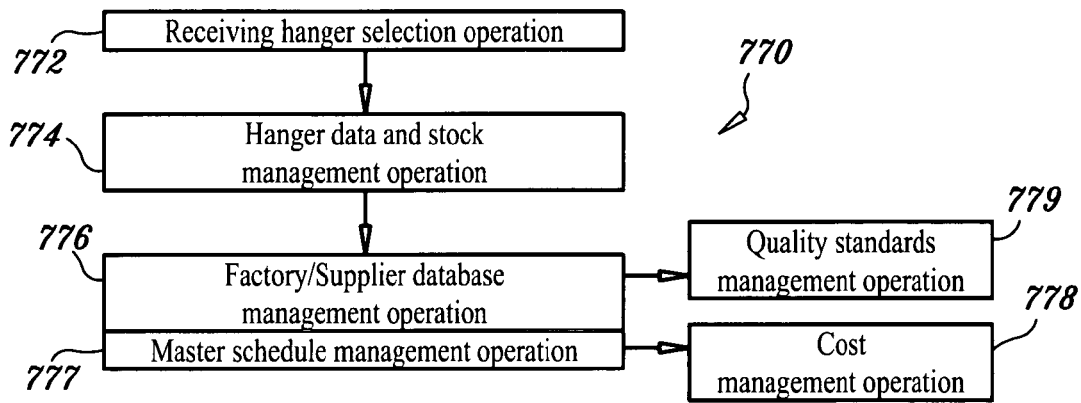
FIG. 48 is a schematic flow diagram for a preferred embodiment of a hangers data and stock management operation.

Referring to FIG. 48, a schematic flow diagram of a preferred embodiment of hangers data and stock management operation 770 is presented. The result of this operation is preferably displayed in the hangers data and stock management window for review by the operator of system 10. Hangers data and stock management operation 770 preferably includes display hangers data and stock management window step 772, display hangers data step 774, query hangers factory/supplier database step 776, update hangers master schedule operation step 777, update hangers cost management operation step 778 and update hangers quality standards operation step 779. This operation allows multi-variable complex searches by factory, material, design, similar substitutes, resource procurement area, etc.

Figure 49:
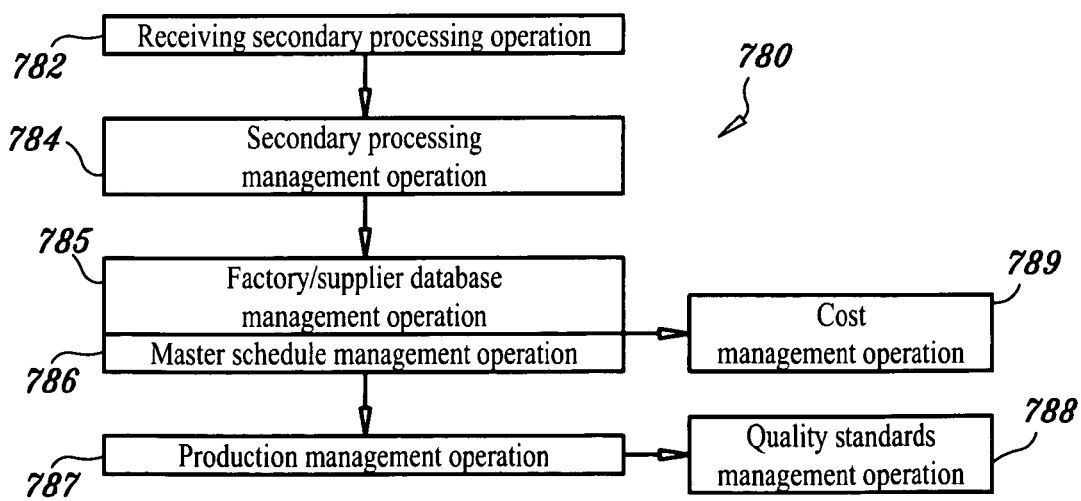
FIG. 49 is a schematic flow diagram for a preferred embodiment of a secondary processing management operation.

Referring to FIG. 49, a schematic flow diagram of a preferred embodiment of secondary processing management operation 780 is presented. The result of this operation is preferably displayed in the secondary processing management window for review by the operator of system 10. Secondary processing management operation 780 preferably includes display secondary processing data and stock management window step 782, display secondary processing data step 784, query secondary processing factory/supplier database step 785, update secondary processing master schedule operation step 786, update secondary processing production management operation step 787, update secondary processing quality standards operation step 788 and update secondary processing cost management operation step 789.

Figure 50:
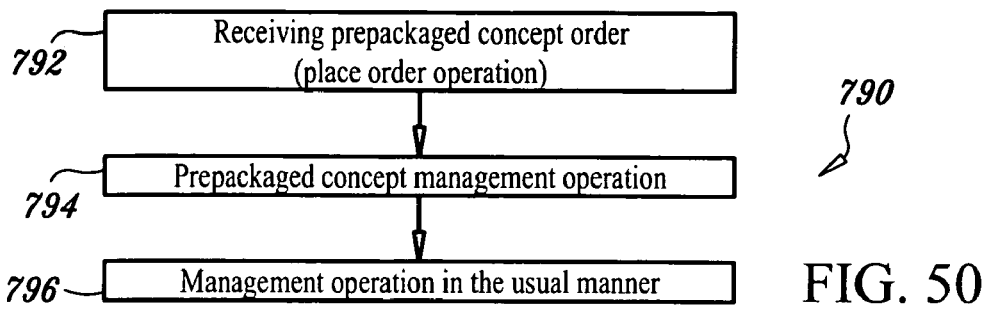
FIG. 50 is a schematic flow diagram for a preferred embodiment of a prepackaged concept management operation.

Referring to FIG. 50, a schematic flow diagram of a preferred embodiment of prepackaged concept management operation 790 is presented. The result of this operation is preferably displayed in the prepackaged concept management window for review by the operator of system 10. Prepackaged concept management operation 790 preferably includes display prepackaged concept management window step 792, consolidate prepackaged concept orders step 794 and manage consolidated orders step 796. In prepackaged product concept management operation 790 production of prepackaged products is managed. Management, production reporting, etc. for prepackaged products is similar to that for conventional products.

Figure 51:
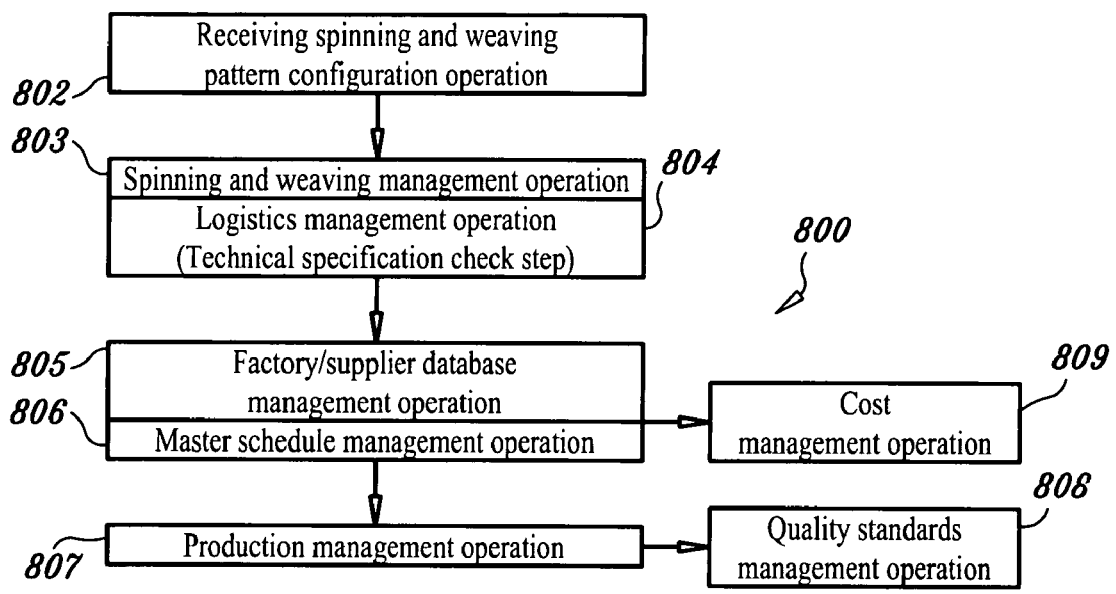
FIG. 51 is a schematic flow diagram for a preferred embodiment of a spinning and weaving management operation.
Figure 52A:
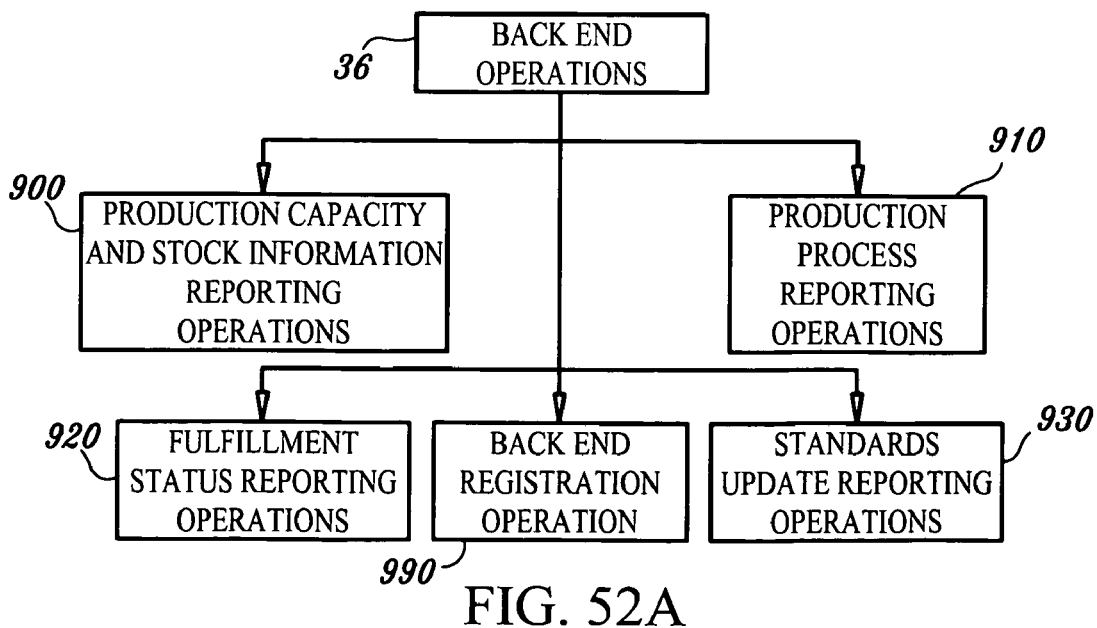
FIG. 52A is a schematic block diagram illustrating back end operations of a preferred embodiment of the invention.
Figure 52B:
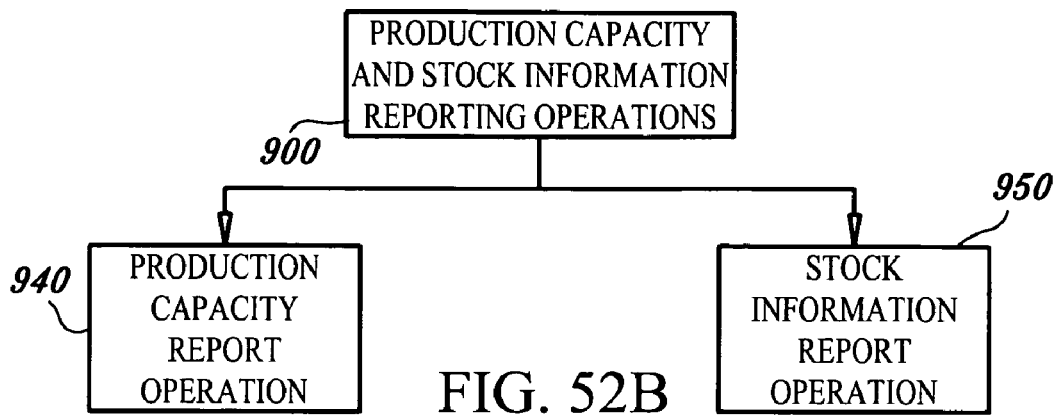
FIG. 52B is a schematic block diagram illustrating production capacity and stock information reporting operations of a preferred embodiment of the invention.
Figure 52C:
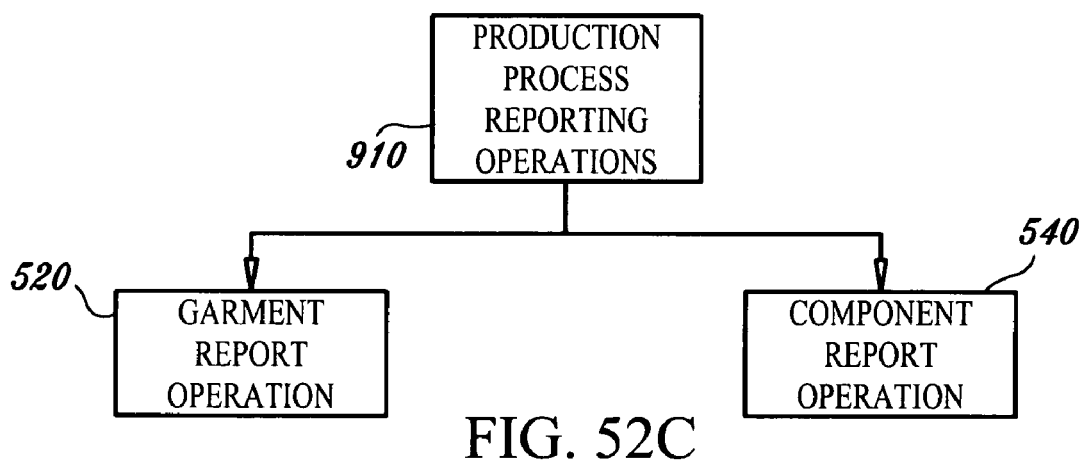
FIG. 52C is a schematic block diagram illustrating production progress reporting operations of a preferred embodiment of the invention.
Figure 52D:
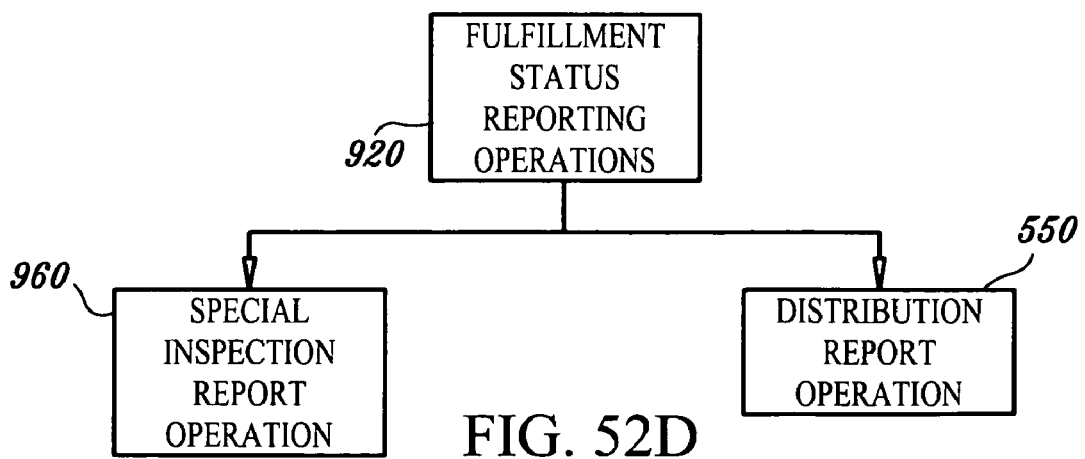
FIG. 52D is a schematic block diagram illustrating fulfillment status reporting operations of a preferred embodiment of the invention.
Figure 52E:
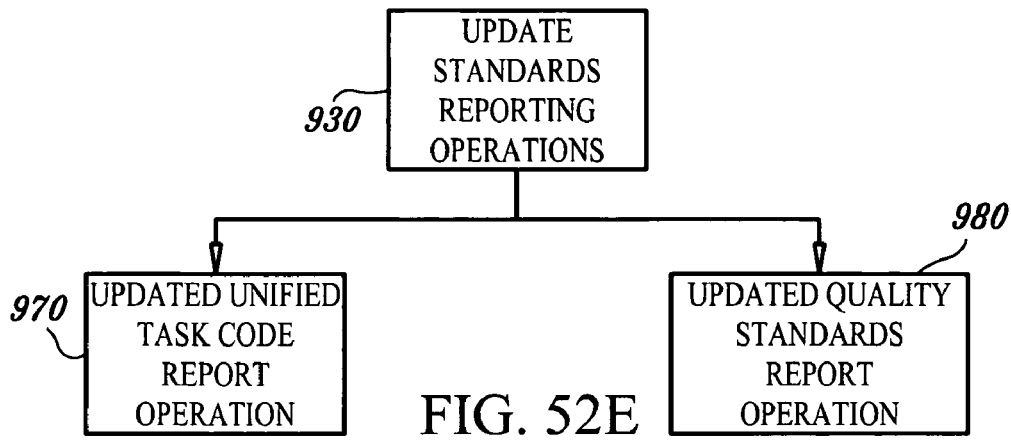
FIG. 52E is a schematic block diagram illustrating updated standards reporting operations of a preferred embodiment of the invention.

Referring to FIG. 51, a schematic flow diagram of a preferred embodiment of spinning and weaving management operation 800 is presented. The result of this operation is preferably displayed in the spinning and weaving management window for review by the operator of system 10. Spinning and weaving management operation 800 preferably includes display spinning and weaving management window step 802, display spinning and weaving management data step 803, update spinning and weaving logistics management (technical specification check) operation step 804, update spinning and weaving factory/supplier database management operation step 805, update spinning and weaving master schedule management operation step 806, update spinning and weaving production management operation step 807, update spinning and weaving quality standards management operation step 808 and update spinning and weaving cost management operation step 809.

Back end operations 36, that is, those directed by production channel 34, are illustrated in FIGS. 52A-52E. Back end operations 36 include production capacity and stock information reporting operations 900, production progress reporting operations 910, fulfillment status reporting operations 920, standards update reporting operations 930 and a single back end registration operation 990. Production capacity and stock information reporting operations 900 include production capacity report operation 940 and stock information report operation 950. Production progress reporting operations 910 include garment report operation 520 and components report operation 540. Fulfillment status reporting operations 920 include special inspection report operation 960 and distribution report operation 550. Updated standards reporting operation 930 includes updated unified task code report operation 970 and updated quality standards report operation 980.

Individual operations implemented by back end 34 of system 10 are illustrated in FIGS. 53-61. Reports by each producer in the production channel are sent to central operation center 32. The reports are summarized by the central operation center 32, and the summaries forwarded to the clients. In the production reporting operation, for example, the system operator is involved in editing and management of production reports. In this operation, production reports from production channel are edited, managed and submitted to the client.

Figure 53:
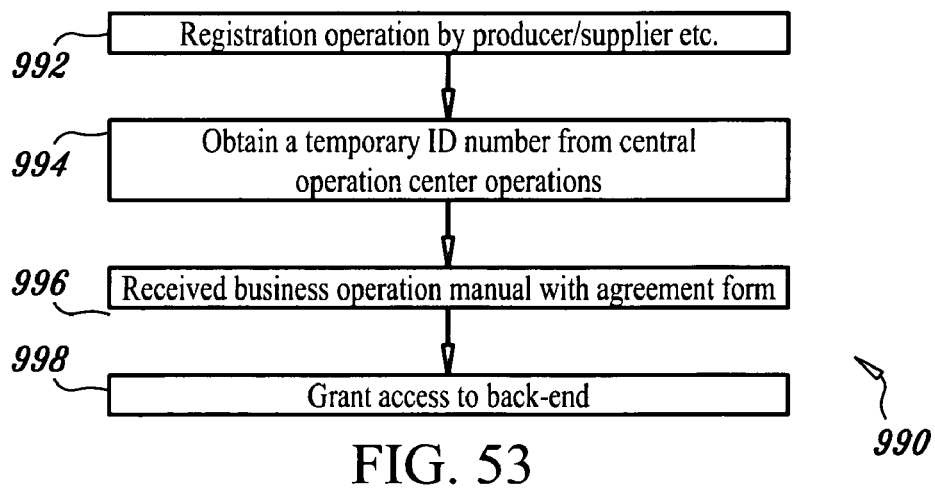
FIG. 53 is a schematic flow diagram for a preferred embodiment of a back-end website registration operation.

Referring to FIG. 53, a schematic flow diagram of a preferred embodiment of exclusive back end registration operation 990 is presented. The result of this operation is preferably displayed in the exclusive back end registration window for updating by the manufacturers and suppliers that use system 10. Back end registration management operation 990 preferably includes display back end registration window step 992, obtain producer number step 994, display manual and agreement step 996 and grant access to back end step 998.

Figure 54:
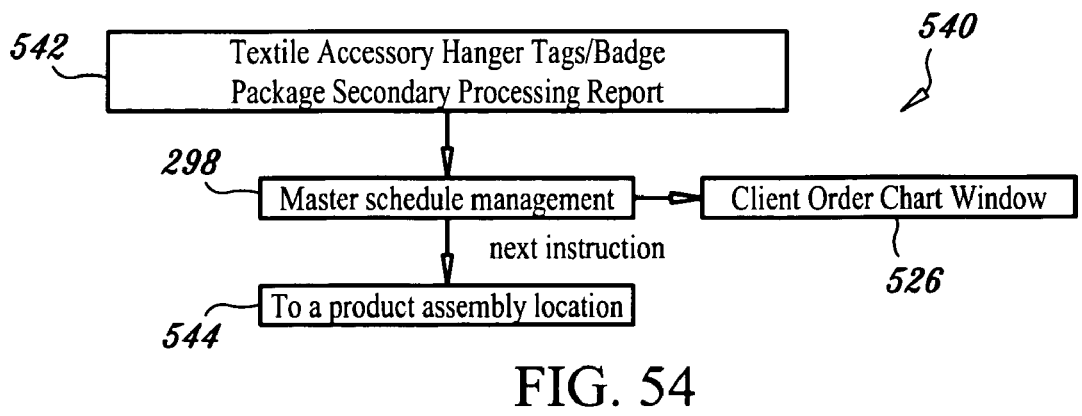
FIG. 54 is a schematic flow diagram for a preferred embodiment of a garment report operation.

Referring to FIG. 54, a schematic flow diagram for components report operation 540 is presented. This same sequence of steps is preferably involved in textile reporting, accessory reporting, secondary processing reporting, hung tag/badges reporting, hanger reporting, packaging reporting. The results of these operations are preferably displayed in the textile report window, accessory report window, secondary processing report window, hung tag/badges report window, hanger report window and packaging report window for updating by the manufacturers and suppliers that use system 10. Components report operation 540 preferably include access component report window step 542, revise master schedule step 298, update client order chart window step 526 and communicate to product assembly location step 544. The textile material report low supply/scarce textile material, or on original design textiles, etc. and presents a production process report. The accessory report preferably covers buttons, zippers, and other ornamental accessories to clothing and presents a production process report. The secondary processing report covers secondary processing and presents a production process report. The hung tags/badges report preferably covers hung tags and badges, describing the quantities, what to print on them, sizes and quality and presents a production process report. The hanger report describes hangers, preferably describing the quantities, color, sizes and quality and presenting a production process report. The packaging report covers packaging, preferably describing the quantities, what to print on them, sizes and quality and presents a production process report. A quality and inspection report is preferably prepared by the inspection companies and relates to the inspection of merchandise.

Figure 55:
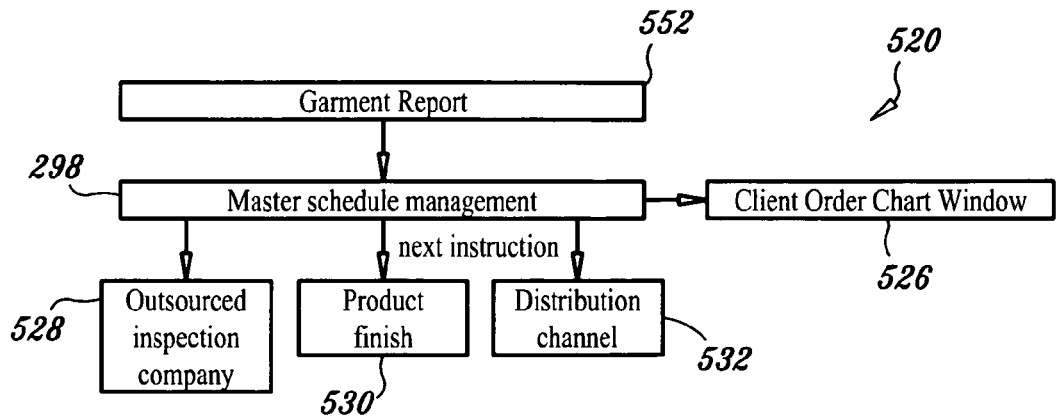
FIG. 55 is a schematic flow diagram for a preferred embodiment of a components report operation.

Referring to FIG. 55, a schematic flow diagram for garment report operation 520 is presented. The result of this operation is preferably displayed in the garment report window for updating by the manufacturers and suppliers that use system 10. Garment report operation 520 preferably includes access garment report step 522, revise master schedule step 298, update client order chart step 526, notify outsourced inspection company step 528, finish product step 530 and notify distribution channel step 532. The garment report preferably covers all aspects of production, from material marking, cutting and sewing until the product is finished. This report is also used to confirm the receipt of each of the accessory part from its supplier.

Figure 56:
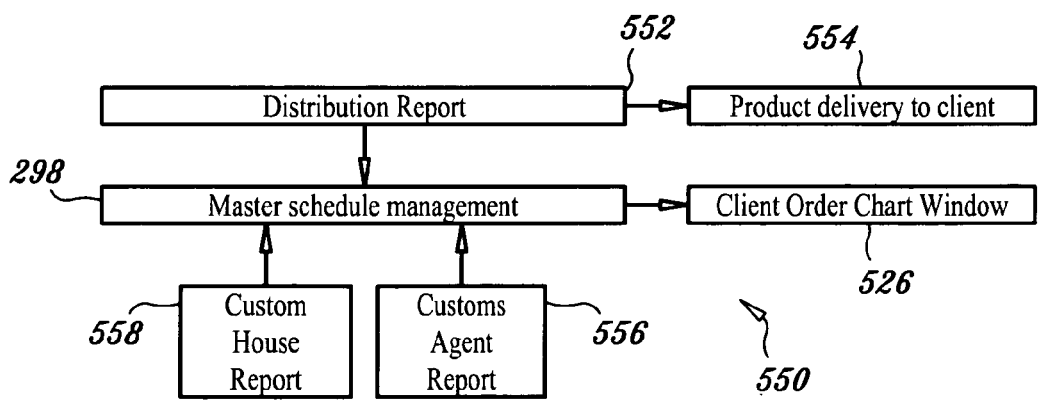
FIG. 56 is a schematic flow diagram for a preferred embodiment of a distribution report operation.

Referring to FIG. 56, a schematic flow diagram for distribution report operation 550 is presented. The result of this operation is preferably displayed in the distribution report window for updating by the manufacturers, suppliers and all transporters that use system 10. Distribution report operation 550 preferably includes access distribution report window step 552, report delivery of product step 554, revise master schedule step 298, update client order chart window step 526, prepare customs agent report step 556 and prepare custom house report step 558. The distribution report preferably covers transport of the product and customs/tariffs from both domestic and overseas transportation companies that cooperate with system 10. Customs reports are also input via this window.

Figure 57:
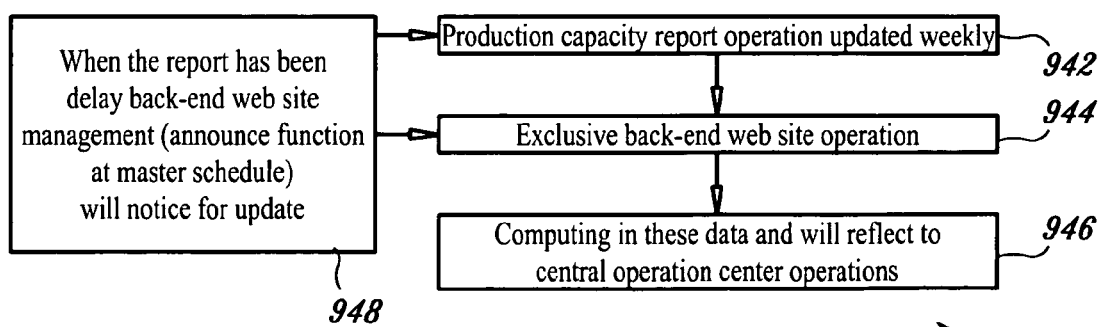
FIG. 57 is a schematic flow diagram for a preferred embodiment of a production capacity report operation.

Referring to FIG. 57, a schematic flow diagram of a preferred embodiment of production capacity report operation 940 is presented. The result of this operation is preferably displayed in the production capacity report window for updating by the manufacturers and suppliers that use system 10. Production capacity report operation 940 preferably includes display production capacity report window step 942, accept input from factories step 944, produce production capacity report step 946 and request delayed production capacity input step 948.

In production channel report operation 940, each producer in the production channel fills out a production channel report that is on a standardized proprietary form and is customizable by production category. In a preferred embodiment, the production report covers at least the following items: date the order was received, date the work was begun, staffing/work-hour structure, interim reports, expected completion date, assignee/foreman, production details, quality, quantity, inspection method and product delivery method. This information from the production channel is reported to central operation center 32.

Figure 58:
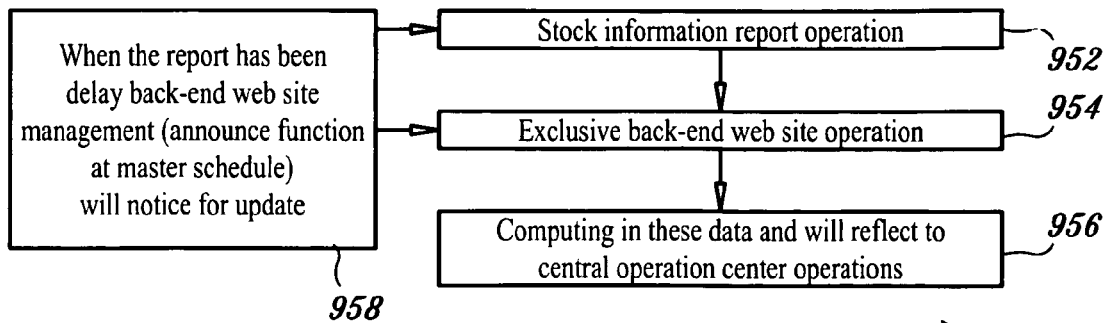
FIG. 58 is a schematic flow diagram for a preferred embodiment of a stock information report operation.

Referring to FIG. 58, a schematic flow diagram of a preferred embodiment of stock information report operation 950 is presented. The result of this operation is preferably displayed in the stock information report window for updating by the manufacturers and suppliers that use system 10. Stock information report operation 950 preferably includes display stock information report window step 952, accept input from suppliers step 954, produce stock information report step 956 and request delayed stock information input step 958. A stock information report covers stocked inventory information and new product information.

Figure 59:
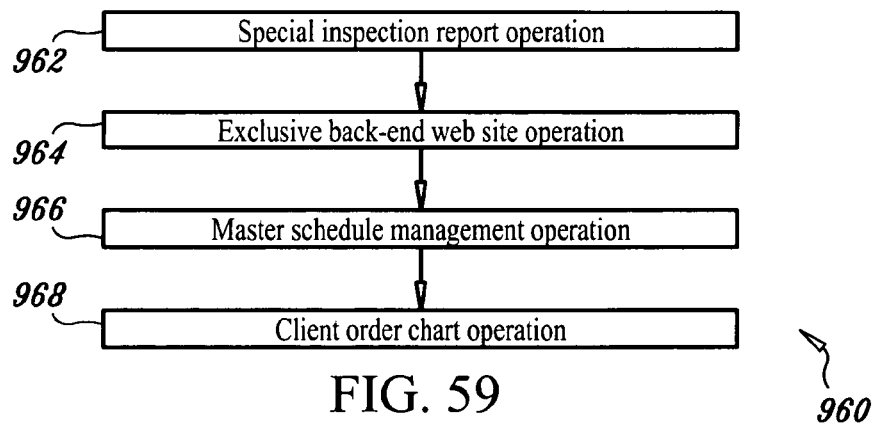
FIG. 59 is a schematic flow diagram for a preferred embodiment of a special inspection report operation.

Referring to FIG. 59, a schematic flow diagram of a preferred embodiment of special inspection report operation 960 is presented. The result of this operation is preferably displayed in the special inspection report window for updating by the manufacturers and suppliers that use system 10. Special inspection report operation 960 preferably includes display special inspection report window step 962, accept input from special inspectors step 964, update master schedule management operation step 966 and update order chart operation step 968.

In order to ensure that both the production channel and the marketing channel have the same understanding/attitude regarding production tasks, system 10 preferably employs unified task codes. Codes are provided for sewing method, color, size, names of fabrics and materials, type of thread, standard weave composition, etc. These unified task codes are maintained on a commonly shared file, which is downloadable via the internet. When new information is obtained, the file is updated and the new information is reflected in the file.

Figure 60:
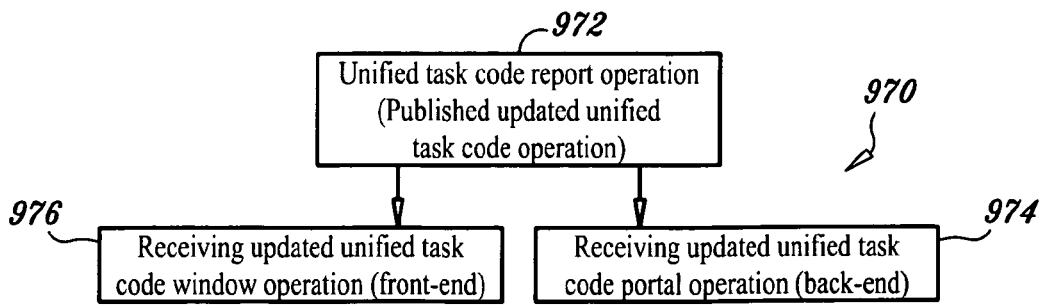
FIG. 60 is a schematic flow diagram for a preferred embodiment of an updated unified task code portal operation.

Referring to FIG. 60, a schematic flow diagram of a preferred embodiment of unified task code portal operation 970 is presented. The result of this operation is preferably displayed in the unified task code portal window for updating by the manufacturers and suppliers that use system 10. Unified task code portal operation 970 preferably includes display unified task code portal window step 972, receive task code updates from front end step 976 and receive task code updates from back end step 974.

Referring to FIG. 61, a schematic flow diagram of a preferred embodiment of quality standard portal operation 980 is presented. The result of this operation is preferably displayed in the quality standard portal window for updating by the manufacturers and suppliers that use system 10. Quality standard portal operation 980 preferably includes display quality standard portal window step 982, receive quality standard updates from front end step 986 and receive quality standard updates from back end step 984.

In an alternative embodiment, the task completion report operation is accomplished via the Internet. A completion report is submitted to each party when a business task is completed. This operation also involves managing the factory/supplier database which addresses the following for each factory: the scale of facilities, production quality, number of workers, operation system, organizational structure (awareness of direct supervisor), production, regular hours and off-days, local manners and customs, method of handling problems when they arise, maintenance of facilities/equipment and transportation situation of the vicinity. Information from the client is transmitted to the managing the factory database, and there, the production channels that meet the conditions are listed. Next, the specifics of the orders are prepared and sent to each candidate producer.

Referring to FIG. 62, an abbreviated example of a unified task code table is presented. Table headings and cell text are preferably expressed in multiple languages. Preferably, both a drawing and a sketch of the finished item are presented. Each task code specifies a garment attribute.

Referring to FIG. 63, an abbreviated example of a table of unified task codes used to identify common garment faults is presented. Table headings and cell text are preferably expressed in multiple languages. Each of these fault codes describes a common garment fault.

From the foregoing, it will be apparent to a person skilled in the art that preferred embodiments of system 10 provides a variety of services. Based on potentially usable information disclosed by the production channel (concerning capacity, stock, material delivery time, transportation method, ballpark cost figure, etc.), system 10 offers a way for the client to construct a matrix (profile) of all decisions, through the ultimate delivery of products. This choice-based task is preferably performed over the Internet by the client. In this embodiment, the client can view test-sample (simulated) images for confirmation purposes. System 10 also prepares a production specification document for each order that represents the client's decision matrix. This document is sent out to each eligible manufacturer satisfying the client's conditions, with a request that the manufacturer submit a proposal. In this embodiment, system 10 also accomplishes business execution management services and provides operating execution management to the production channel.

In a preferred embodiment, each client is able to view the progress of the client's production process online. System 10 preferably supplies (delivers) information over the Internet. By assuring a continuous flow of value-added information, system 10 provides sustained support to the client's efforts to replenish (re-stock) products in a way that is abreast with consumer trends. System 10 is capable of handling small quantity orders and a wide variety of products and is capable of quick responses to changes.

After the goods are delivered, system 10 check with the client to determine if the client is satisfied with the products produced for the client. If a product is defective in some way, the production channel is dealt with immediately.

In a preferred embodiment, system 10 removes the up-stream down-stream barriers that are typical of the background art in the apparel industry, so that the client can assemble an entire apparel production project (from specification to delivery) in one session over the Internet. That is to say, system 10 establishes a new business model, which uses the Internet to conduct the coordination of services involved in the planning and production of apparel goods.

By using system 10, the client can use the Internet to specify all of the requirements for each of the steps from the start to the finished product. Furthermore, the process of production can be verified online. As a final result, the client is able to procure the product on or before the desired date, and thereby efficiently executing the business plan the client had in mind. Meanwhile, the production channel (comprised of manufacturers) is able to pick up new clients through this Internet business model. Central operation center 32 (as the coordinator) is also able to develop new business opportunities and new markets.

In a preferred embodiment, central operation center 32 asks each manufacturer with sufficient capacity to bid on producing each desired garment, i.e., to submit a production proposal. Central operation center 32 is able to optimize each transaction because its communications capability and confidential relationship with each manufacturer gives it additional negotiating power.

Many variations of the invention will occur to those skilled in the art. Some variations include handling or original designs for textiles and garments. Other variations call for handling prepackaged products. All such variations are intended to be within the scope and spirit of the invention.

Although some embodiments are shown to include certain features, the applicant specifically contemplate that any feature or step disclosed herein may be used together or in combination with any other feature or step on any embodiment of the invention. It is also contemplated that any feature or step may be specifically excluded from any embodiment of an invention.

What is claimed is:

1. A computer-implemented method for operating an apparel production business, said method comprising:
    operating one or more computers that have been programmed with software to perform a process comprising:
    accepting registration information from a client in one or more front end windows and assigning to the client a client number;
    interacting with the client, said interacting step comprising generating displays for the client in said one or more front end windows comprising a product quality standard, generating displays for the client in said one or more front end windows comprising a plurality of task codes that characterize the features of a product, generating displays for the client in said one or more front end windows comprising a textile materials inventory, accepting from the client in said one or more front end windows a specification for a desired original textile, accepting from the client in said one or more front end windows a specification for a desired garment, generating displays for the client in said one or more front end windows comprising a simulated sample of the desired garment, generating displays for the client in said one or more front end windows comprising an estimate of the amount of material required to produce the desired garment, generating displays for the client in said one or more front end windows comprising when capacity is available for production of the desired garment, generating displays for the client in said one or more front end windows comprising information on the availability of accessories and accepting selections of desired accessories for the desired garment from the client, generating displays for the client in said one or more front end windows comprising digital garment patterns, generating displays for the client in said one or more front end windows comprising information on the availability of secondary processes and accepting selections of secondary processes for the desired garment from the client in said one or more front end windows, generating displays for the client in said one or more front end windows comprising information on the availability of product packaging and accepting selections of product packaging for the desired garment from the client in said one or more front end windows, generating displays for the client in said one or more front end windows comprising information on the availability of hung tags and badges and accepting selections of hug tags and badges for the desired garment from the client in said one or more front end windows, generating displays for the client in said one or more front end windows comprising information on the availability of hangers and accepting selections of hangers for the desired garment from the client in said one or more front end windows, generating displays for the client in said one or more front end windows comprising information on the availability of product transportation options and accepting selections of a product transportation option for the desired garment from the client in said one or more front end windows, generating displays for the client in said one or more front end windows comprising information on the availability of special inspection options and accepting selections of a special inspection option for the desired garment from the client in said one or more front end windows, generating displays for the client in said one or more front end windows comprising information on the availability of product finishing options and accepting selections of a product finishing option for the desired garment from the client in said one or more front end windows, accepting from the client an order for the desired garment in said one or more front end windows and generating displays for the client in said one or more front end windows comprising an initial estimate of the cost of the ordered garment, generating displays for the client in said one or more front end windows comprising information on the availability of replenishment stock, generating displays for the client in said one or more front end windows comprising information on the availability of prepackaged products and accepting a specification from the client to add a distinctive feature to the desired garment in said one or more front end windows, generating displays for the client in said one or more front end windows comprising help information on use of the method, generating displays for the client in said one or more front end windows comprising information on a selected order, and generating displays for the client in said one or more front end windows comprising block maps;

interacting with a supplier of products and product components, said interacting with a supplier step comprising generating displays for the supplier in one or more back end windows comprising the plurality of task codes, accepting input from the supplier concerning the status of each order the supplier is producing in said one or more back end windows, accepting input from a supplier of textile materials concerning the availability of the textile materials in said one or more back end windows, accepting input from a supplier of accessories concerning the availability of the accessories in said one or more back end windows, accepting input from a supplier of secondary processes concerning the availability of the secondary processes in said one or more back end windows, accepting input from a supplier of hung tags and badges concerning the availability of the hung tags and badges in said one or more back end windows, accepting input from a supplier of hangers concerning the availability of the hangers in said one or more back end windows, accepting input from a supplier of packaging concerning the availability of the packaging in said one or more back end windows, accepting input from a supplier of special inspection services concerning the availability and performance of the special inspection services in said one or more back end windows, accepting input from a supplier of product transportation services concerning the availability and performance of the transportation services in said one or more back end windows, and accepting input from a supplier of production services concerning the availability and performance of the production services in said one or more back end windows; and performing central processing of information with said one or more computers, said performing central processing step comprising managing information on the availability of production capacity, managing product quality standards, managing information in a supplier database, managing the production of each ordered product, managing information on raw materials and stock, managing information on the textile material inventory, managing accessories availability information, managing packaging availability information, managing hung tags and badges availability information, managing hangers availability information, managing secondary processes availability information, managing a master schedule, managing alterations and changes in each ordered product, managing prepackaged products information, managing product transportation information, managing cost information, and managing client data.

2. A tangible computer-readable medium containing a sequence of instructions that implements a method for operating an apparel production business, said method comprising:

accepting registration information from a client in one or more front end windows and assigning to the client a client number;

interacting with the client, said interacting step comprising generating displays for the client in said one or more front end windows comprising a product quality standard, generating displays for the client in said one or more front end windows comprising a plurality of task codes that characterize the features of a product, generating displays for the client in said one or more front end windows comprising a textile materials inventory, accepting from the client in said one or more front end windows a specification for a desired original textile, accepting from the client in said one or more front end windows a specification for a desired garment, generating displays for the client in said one or more front end windows comprising a simulated sample of the desired garment, generating displays for the client in said one or more front end windows comprising an estimate of the amount of material required to produce the desired garment, generating displays for the client in said one or more front end windows comprising when capacity is available for production of the desired garment, generating displays for the client in said one or more front end windows comprising information on the availability of accessories and accepting selections of desired accessories for the desired garment from the client, generating displays for the client in said one or more front end windows comprising digital garment patterns, generating displays for the client in said one or more front end windows comprising information on the availability of secondary processes and accepting selections of secondary processes for the desired garment from the client in said one or more front end windows, generating displays for the client in said one or more front end windows comprising information on the availability of product packaging and accepting selections of product packaging for the desired garment from the client in said one or more front end windows, generating displays for the client in said one or more front end windows comprising information on the availability of hung tags and badges and accepting selections of hug tags and badges for the desired garment from the client in said one or more front end windows, generating displays for the client in said one or more front end windows comprising information on the availability of hangers and accepting selections of hangers for the desired garment from the client in said one or more front end windows, generating displays for the client in said one or more front end windows comprising information on the availability of product transportation options and accepting selections of a product transportation option for the desired garment from the client in said one or more front end windows, generating displays for the client in said one or more front end windows comprising information on the availability of special inspection options and accepting selections of a special inspection option for the desired garment from the client in said one or more front end windows, generating displays for the client in said one or more front end windows comprising information on the availability of product finishing options and accepting selections of a product finishing option for the desired garment from the client in said one or more front end windows, accepting from the client an order for the desired garment in said one or more front end windows and generating displays for the client in said one or more front end windows comprising an initial estimate of the cost of the ordered garment, generating displays for the client in said one or more front end windows comprising information on the availability of replenishment stock, generating displays for the client in said one or more front end windows comprising information on the availability of prepackaged products and accepting a specification from the client to add a distinctive feature to the desired garment in said one or more front end windows, generating displays for the client in said one or more front end windows comprising help information on use of the method, generating displays for the client in said one or more front end windows comprising information on a selected order, and generating displays for the client in said one or more front end windows comprising block maps;

interacting with a supplier of products and product components, said interacting with a supplier step comprising generating displays for the supplier in one or more back end windows comprising the plurality of task codes, accepting input from the supplier concerning the status of each order the supplier is producing in said one or more back end windows, accepting input from a supplier of textile materials concerning the availability of the textile materials in said one or more back end windows, accepting input from a supplier of accessories concerning the availability of the accessories in said one or more back end windows, accepting input from a supplier of secondary processes concerning the availability of the secondary processes in said one or more back end windows, accepting input from a supplier of hung tags and badges concerning the availability of the hung tags and badges in said one or more back end windows, accepting input from a supplier of hangers concerning the availability of the hangers in said one or more back end windows, accepting input from a supplier of packaging concerning the availability of the packaging in said one or more back end windows, accepting input from a supplier of special inspection services concerning the availability and performance of the special inspection services in said one or more back end windows, accepting input from a supplier of product transportation services concerning the availability and performance of the transportation services in said one or more back end windows, and accepting input from a supplier of production services concerning the availability and performance of the production services in said one or more back end windows; and performing central processing of information with said one or more computers, said performing central processing step comprising managing information on the availability of production capacity, managing product quality standards, managing information in a supplier database, managing the production of each ordered product, managing information on raw materials and stock, managing information on the textile material inventory, managing accessories availability information, managing packaging availability information, managing hung tags and badges availability information, managing hangers availability information, managing secondary processes availability information, managing a master schedule, managing alterations and changes in each ordered product, managing prepackaged products information, managing product transportation information, managing cost information, and managing client data.

* * * * *